US008769001B2

(12) United States Patent
Ohwada

(10) Patent No.: US 8,769,001 B2
(45) Date of Patent: Jul. 1, 2014

(54) TRANSMISSION TERMINAL, TRANSMISSION METHOD, TRANSMISSION SYSTEM, AND RECORDING MEDIUM STORING TRANSMISSION CONTROL PROGRAM

(75) Inventor: Toshikazu Ohwada, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 173 days.

(21) Appl. No.: 13/026,636

(22) Filed: Feb. 14, 2011

(65) Prior Publication Data

US 2011/0219060 A1 Sep. 8, 2011

(30) Foreign Application Priority Data

Mar. 3, 2010 (JP) ................................. 2010-046755
Oct. 29, 2010 (JP) ................................. 2010-244010

(51) Int. Cl.
*G06F 15/16* (2006.01)
(52) U.S. Cl.
USPC ........................................................ 709/203
(58) Field of Classification Search
USPC ...................................... 379/100.04; 709/203
See application file for complete search history.

(56) References Cited

U.S. PATENT DOCUMENTS

| 4,823,376 A * | 4/1989 | Takahashi ................ 379/100.04 |
| 7,974,849 B1 * | 7/2011 | Begole et al. .................. 705/1.1 |
| 2007/0263075 A1 | 11/2007 | Nimri et al. |
| 2009/0177631 A1 | 7/2009 | Ohwada |
| 2011/0081011 A1 * | 4/2011 | Gavita et al. ............. 379/201.02 |

FOREIGN PATENT DOCUMENTS

JP 2009-54139 3/2009

* cited by examiner

*Primary Examiner* — Kevin Bates
*Assistant Examiner* — Ronak Patel
(74) *Attorney, Agent, or Firm* — Oblon, Spivak, McClelland, Maier & Neustadt, L.L.P.

(57) ABSTRACT

A transmission terminal, which displays information of a candidate counterpart transmission terminal through a display coupled to the transmission terminal, receives state information of the candidate counterpart transmission terminal through a communication network, suppresses the display from displaying the information of the candidate counterpart transmission terminal until specific state information of a specific transmission terminal is received, and causes the display to display the information of the candidate counterpart transmission terminal in a manner that reflects the state information of the candidate counterpart transmission terminal that is received by the transmission terminal during a display suppressing time in which the display is suppressed from displaying the information of the candidate counterpart transmission terminal.

13 Claims, 29 Drawing Sheets

FIG. 11

DATA QUALITY MANAGEMENT TABLE

| TERMINAL IP ADDRESS | IMAGE DATA QUALITY |
|---|---|
| 1.3.2.4 | HIGH |
| 1.3.1.3 | LOW |
| 1.3.2.3 | MEDIUM |
| ... | ... |

FIG. 12

RELAY TERMINAL MANAGEMENT TABLE

| RELAY TERMINAL ID | OPERATION STATE | DATE AND TIME RECEIVED | RELAY TERMINAL IP ADDRESS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG. 13

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 14

TERMINAL MANAGEMENT TABLE

| TERMINAL ID | TERMINAL NAME | OPERATION STATE | DATE AND TIME RECEIVED | TERMINAL IP ADDRESS |
|---|---|---|---|---|
| 01aa | JAPAN TOKYO OFFICE AA TERMINAL | ON-LINE (OK) | 2009.11.10.13:40 | 1.2.1.3 |
| 01ab | JAPAN TOKYO OFFICE AB TERMINAL | OFF-LINE | 2009.11.09.12:00 | 1.2.1.4 |
| ... | ... | ... | ... | ... |
| 01ba | JAPAN OSAKA OFFICE BA TERMINAL | ON-LINE (HOLD) | 2009.11.10.13:45 | 1.2.2.3 |
| 01bb | JAPAN OSAKA OFFICE BB TERMINAL | ON-LINE (OK) | 2009.11.10.13:50 | 1.2.2.4 |
| ... | ... | ... | ... | ... |
| 01ca | U.S. NY OFFICE CA TERMINAL | OFF-LINE | 2009.11.10.12:45 | 1.3.1.3 |
| 01cb | U.S. NY OFFICE CB TERMINAL | ON-LINE (COMMUNICATING) | 2009.11.10.13:55 | 1.3.1.4 |
| ... | ... | ... | ... | ... |
| 01da | U.S. WASH, D.C. OFFICE DA TERMINAL | ON-LINE (COMMUNICATING) | 2009.11.08.12:45 | 1.3.2.3 |
| 01db | U.S. WASH, D.C. OFFICE DB TERMINAL | ON-LINE | 2009.11.10.12:45 | 1.3.2.4 |
| ... | ... | ... | ... | ... |

FIG. 15

CANDIDATE LIST MANAGEMENT TABLE

| REQUEST TERMINAL ID | COUNTERPART TERMINAL ID |
|---|---|
| 01aa | 01ab,···,01ba,01bb,···,01ca,01cb,01da,01db,··· |
| 01ab | 01aa,01ca,01cb |
| 01ba | 01aa,01ab,01ca,01cb,01da,01db |
| ··· | ··· |
| 01db | 01aa,01ab,01ba,···,01da,01ca,01cb,···,01da |

FIG. 16

SESSION MANAGEMENT TABLE

| SESSION ID | RELAY TERMINAL ID | REQUEST TERMINAL ID | COUNTERPART TERMINAL ID | DELAY TIME (ms) | DATE AND TIME RECEIVED |
|---|---|---|---|---|---|
| se1 | 111a | 01aa | 01db | 200 | 2009.11.10.14.00 |
| se2 | 111b | 01ba | 01ca | 50 | 2009.11.10.14.10 |
| se3 | 111d | 01bb | 01da | 400 | 2009.11.10.14.20 |
| ··· | | | | | ··· |

FIG. 17

ADDRESS PRIORITY MANAGEMENT TABLE

| DOT ADDRESS SIMILARITY | ADDRESS PRIORITY POINT |
|---|---|
| S. S. S. D | 5 |
| S. S. D. - | 3 |
| S. D. -. - | 1 |
| D. -. -. - | 0 |

FIG. 18

TRANSMISSION SPEED PRIORITY MANAGEMENT TABLE

| MAXIMUM DATA TRANSMISSION SPEED (Mbps) | TRANSMISSION SPEED PRIORITY POINT |
|---|---|
| 1000 ~ | 5 |
| 100 ~ 1000 | 3 |
| 10 ~ 100 | 1 |
| ~ 10 | 0 |

FIG. 19

QUALITY MANAGEMENT TABLE

| DELAY TIME (ms) | IMAGE DATA QUALITY |
|---|---|
| 0 ~ 100 | HIGH |
| 100 ~ 300 | MEDIUM |
| 300 ~ 500 | LOW |
| 500 ~ | (INTERRUPT) |

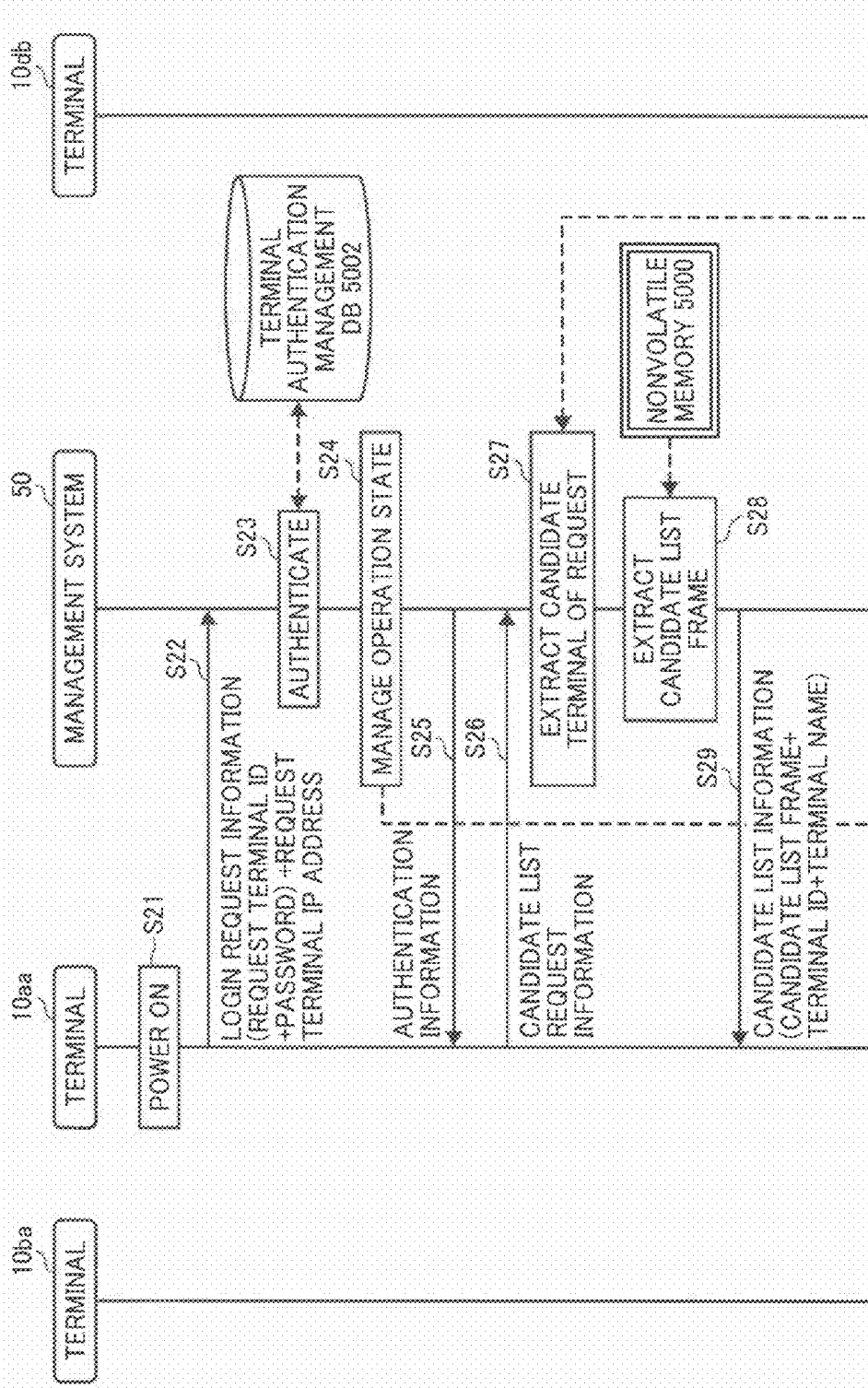

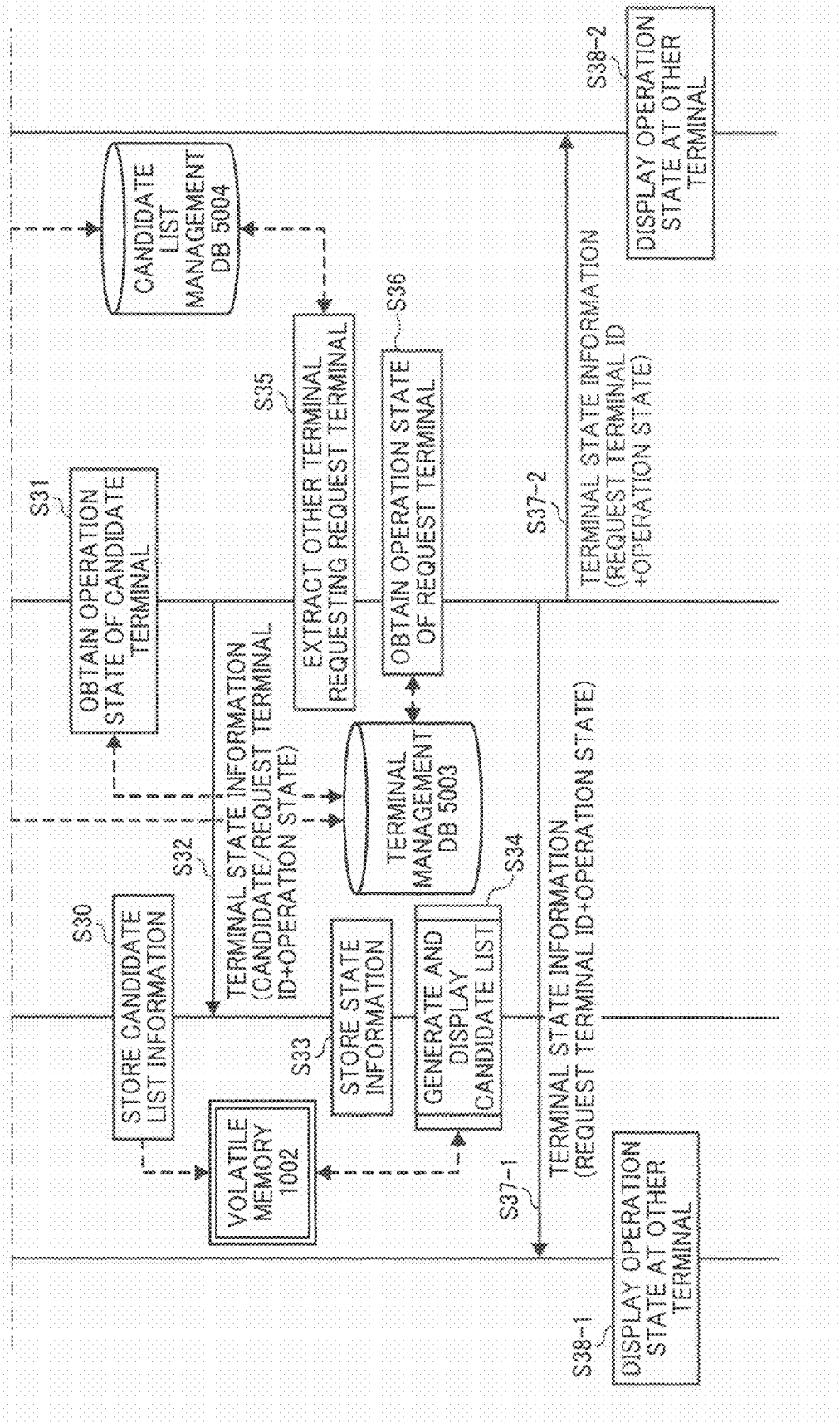

| RELAY TERMINAL ID | ADDRESS PRIORITY POINT | | TRANSMISSION SPEED PRIORITY POINT | TOTAL PRIORITY POINT |
|---|---|---|---|---|
| | FIRST ADDRESS PRIORITY POINT FOR REQUEST | SECOND ADDRESS PRIORITY POINT FOR COUNTERPART TERMINAL | | |
| 111a | 5 | 1 | 3 | 8 |
| 111b | 3 | 1 | 5 | 8 |
| 111c | - | - | - | - |
| 111d | 1 | 5 | 1 | 6 |

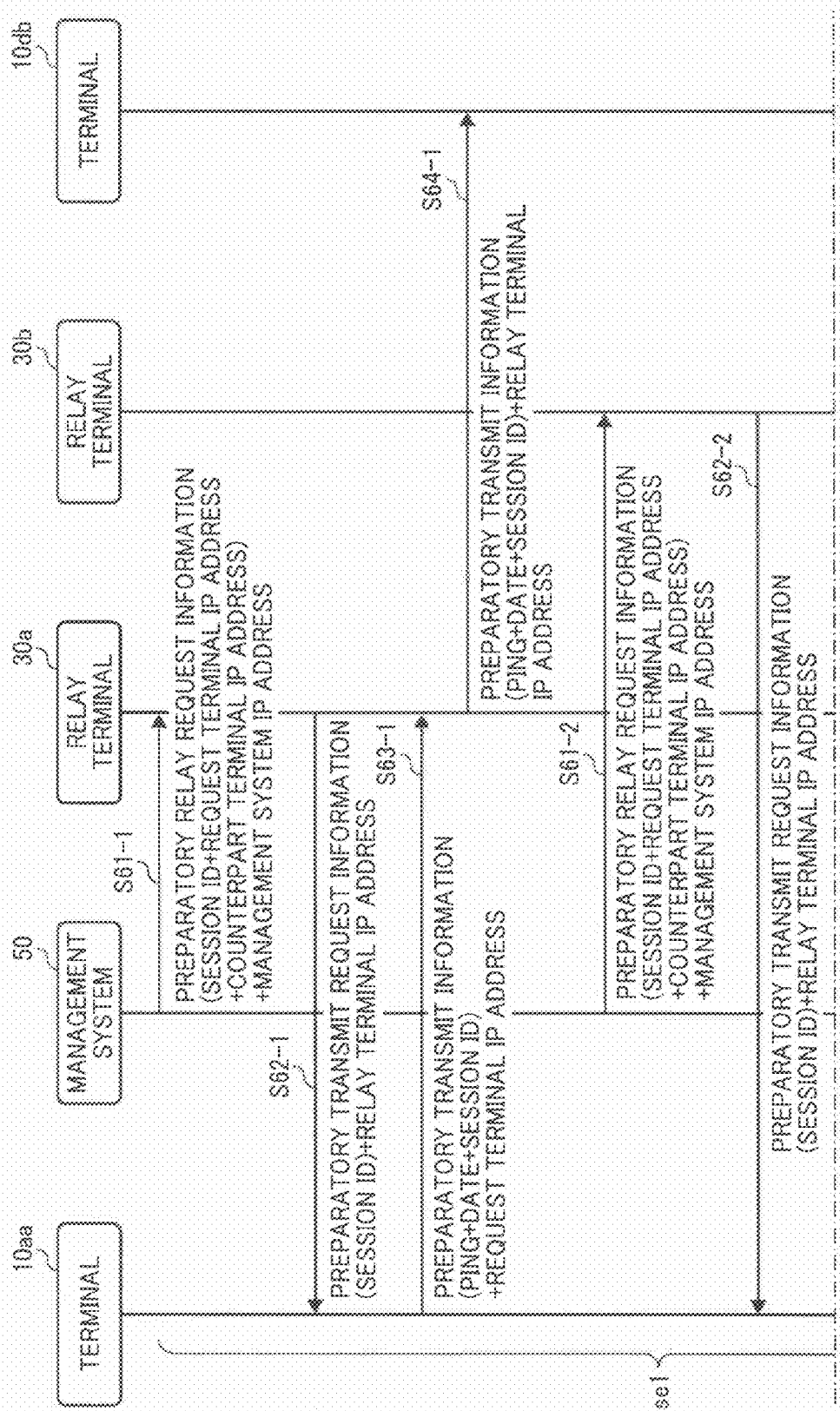

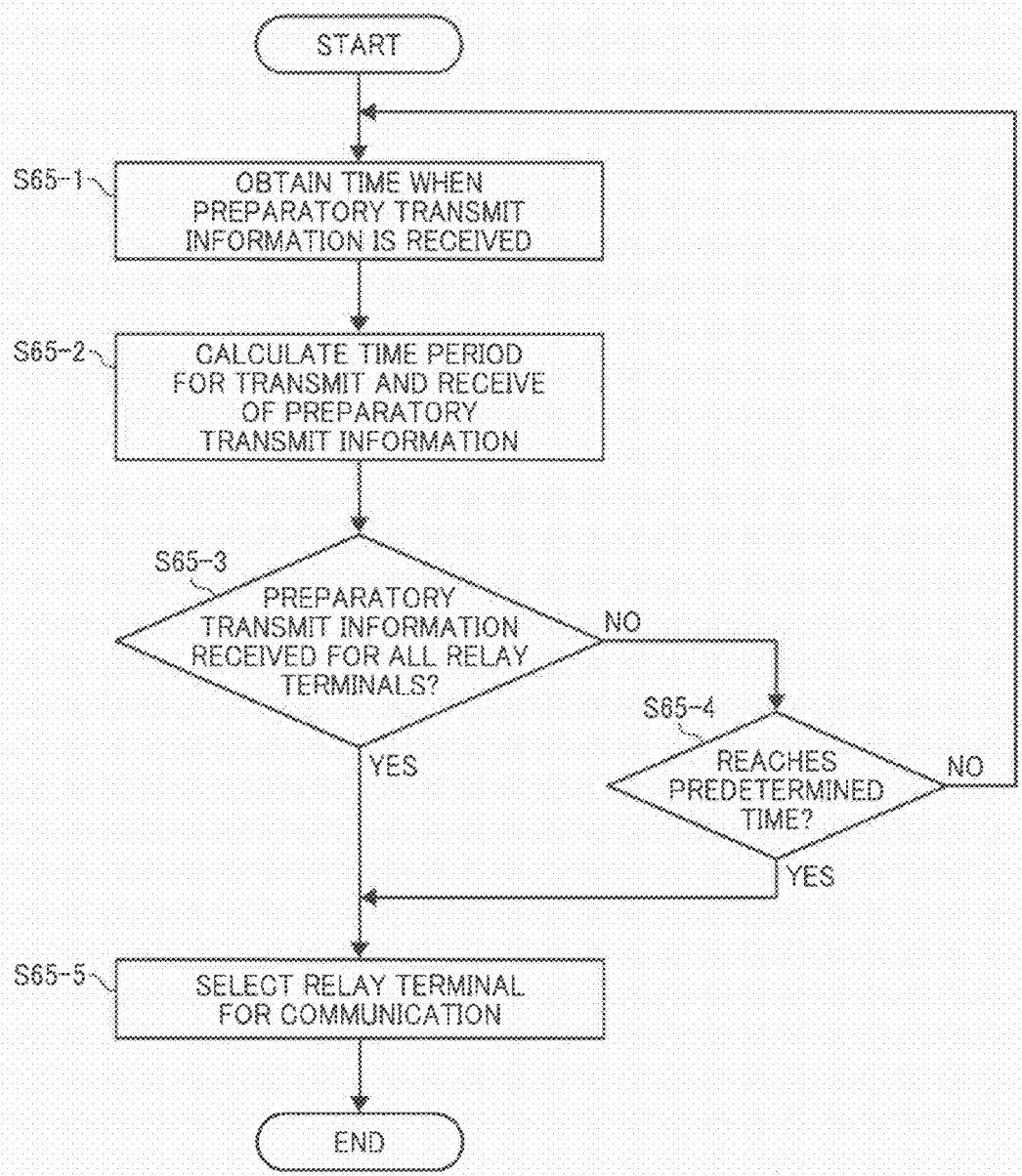

TRANSMISSION TERMINAL, TRANSMISSION METHOD, TRANSMISSION SYSTEM, AND RECORDING MEDIUM STORING TRANSMISSION CONTROL PROGRAM

CROSS-REFERENCE TO RELATED APPLICATIONS

This patent application is based on and claims priority under 35 U.S.C. §119 to Japanese Patent Application Nos. 2010-046755 filed on Mar. 3, 2010, and 2010-244010 filed on Oct. 29, 2010 in the Japanese Patent Office, the entire disclosure of which is hereby incorporated herein by reference.

FIELD OF THE INVENTION

The present invention generally relates to receiving state information of a candidate transmission terminal at a transmission terminal, and displaying information regarding the candidate transmission terminal that is generated based on the received state information before the transmission terminal starts communicating with a transmission terminal selected from the candidate transmission terminal.

BACKGROUND

With the need for reducing costs or times associated with business trips, more companies are moving towards transmission systems to have teleconference or videoconference among remotely located offices via a communication network. The transmission systems allow transmission of image data or voice data among a plurality of transmission terminals that are remotely located from one another through a communication network such as the Internet to facilitate communication among the plurality of transmission terminals.

The recent transmission systems have a function of notifying a user at a request transmission terminal of information indicating the current state of a counterpart transmission terminal before the user at the request transmission terminal starts communication with a user at the counterpart transmission terminal. For example, the transmission system described in U.S. Patent Application Publication No. 2007/0263075 manages user names and associated identities of potential users at transmission terminals such that the stored information regarding the potential users are constantly refreshed as users at transmission terminals log in or out. Before the user at the request transmission terminal initiates videoconference, the user at the request transmission terminal accesses a screen that lists user names and associated identities of potential users that are constantly refreshed. While this prevents the user at the request transmission terminal from initiating videoconference with a user who is not currently logged in, the screen that is accessed by the user is constantly refreshed as the login state of the user is changed, thus causing perception of flicker in screen.

SUMMARY

The inventors of the present invention have realized that the above-described problem of flickering in screen is prevalent especially when the transmission terminal is turned on. In such case, the transmission terminal starts receiving information regarding the login state, one after another, from the other transmission terminals via a server. Accordingly, the screen is constantly updated every few seconds to cause flicker in screen, which is unpleasing to the human eye.

In view of the above, the present invention provides an apparatus, method, system, computer program and product each capable of suppressing a display coupled to a transmission terminal from displaying information of a candidate counterpart transmission terminal. The transmission terminal receives state information of the candidate counterpart transmission terminal through a communication network; suppresses the display from displaying the information of the candidate counterpart transmission terminal until specific state information of a specific transmission terminal is received; and causes the display to display the information of the candidate counterpart transmission terminal in a manner that reflects the state information of the candidate counterpart transmission terminal that is received by the transmission terminal during a display suppressing time in which the display is suppressed from displaying the information of the candidate counterpart transmission terminal.

In addition to the above-described example embodiments, the present invention may be practiced in various other ways.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11 is an example data structure of a data quality management table, managed by the relay terminal of FIG. 7;

FIG. 12 is an example data structure of a relay terminal management table, managed by the transmission management system of FIG. 7;

FIG. 13 is an example data structure of a terminal authentication management table, managed by the transmission management system of FIG. 7;

FIG. 14 is an example data structure of a terminal management table, managed by the transmission management system of FIG. 7;

FIG. 15 is an example data structure of a candidate list management table, managed by the transmission management system of FIG. 7;

FIG. 16 is an example data structure of a session management table, managed by the transmission management system of FIG. 7;

FIG. 17 is an example data structure of an address priority management table, managed by the transmission management system of FIG. 7;

FIG. 18 is an example data structure of a transmission speed priority management table, managed by the transmission management system of FIG. 7;

FIG. 19 is an example data structure of a quality management table, managed by the transmission management system of FIG. 7;

FIGS. 21A and 21B are a data sequence diagram illustrating operation of establishing communication among two or more transmission terminals of the transmission system of FIG. 1, according to an example embodiment of the present invention;

FIG. 26 is an illustration of a candidate list displayed by the transmission terminal of the transmission system of FIG. 1, according to an example embodiment of the present invention;

FIG. 29 is a table storing priority points of the relay terminals that are respectively calculated by the transmission management system of FIG. 1 during the operation of limiting a number of candidate relay terminals;

FIGS. 30A and 30B are a data sequence diagram illustrating operation of selecting a relay terminal, performed by the transmission system of FIG. 1;

FIG. 31 is a flowchart illustrating operation of selecting a relay terminal, performed by the transmission terminal of FIG. 1;

FIG. 34 is an illustration of a candidate list, which is displayed by the transmission terminal of the transmission system of FIG. 1 as the transmission terminal is turned on;

FIG. 35 is an illustration of a candidate list, which is displayed by the transmission terminal of the transmission system of FIG. 1 after display of the candidate list of FIG. 34 when suppressing of the display of the candidate list is not performed; and FIG. 36 is an illustration of a candidate list, which is displayed by the transmission terminal of the transmission system of FIG. 1 after display of the candidate list of FIG. 34 when suppressing of the display of the candidate list is performed.

Figure 1:
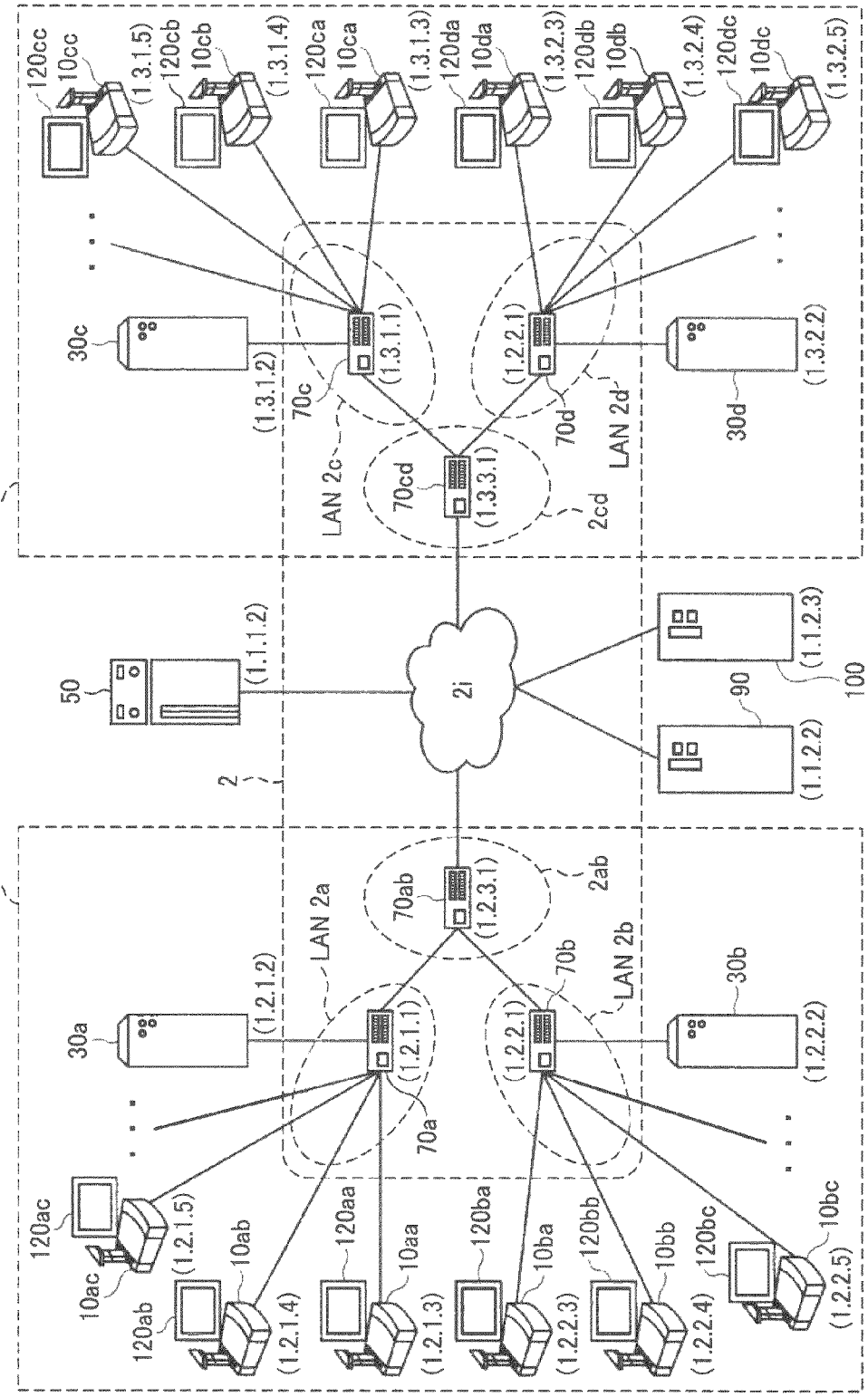
FIG. 1 is a schematic block diagram illustrating a transmission system according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

<Configuration of Transmission System>

Figure 2:
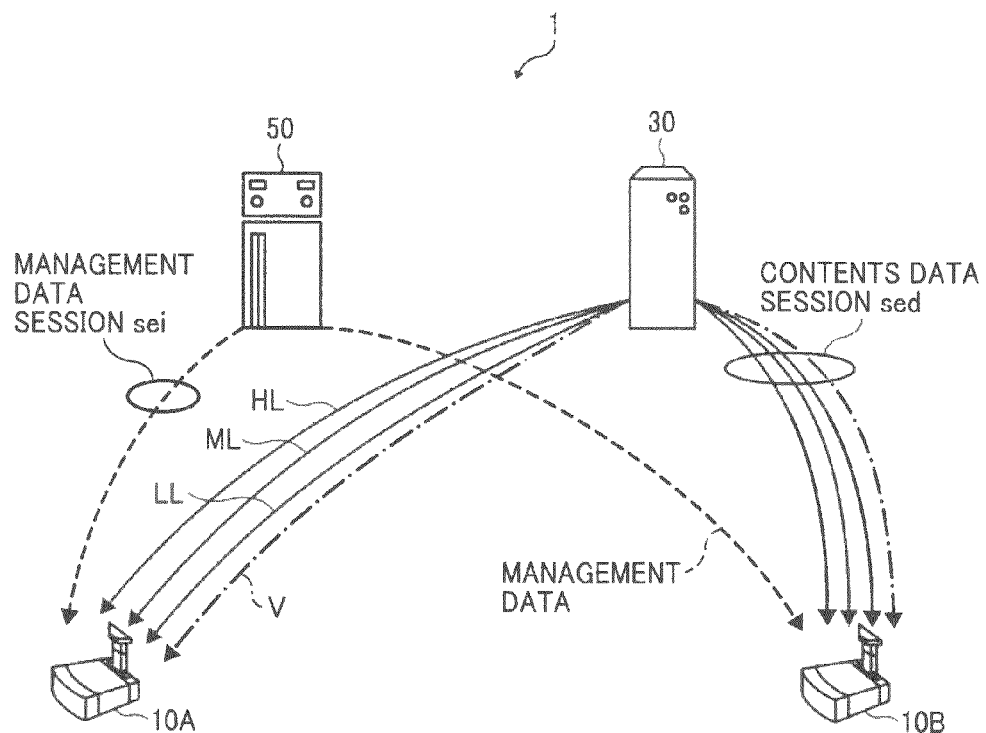
FIG. 2 is an illustration for explaining transmission or reception of data such as image data, voice data, or management data, performed by the transmission system of FIG. 1.
Figure 3A:
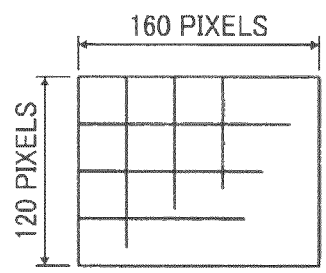
FIGS. 3A to 3C are illustrations for explaining image quality of image data transmitted or received by the transmission system of FIG. 1.
Figure 3B:
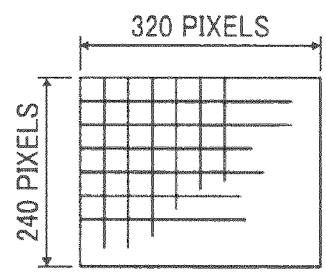
Figure 3C:
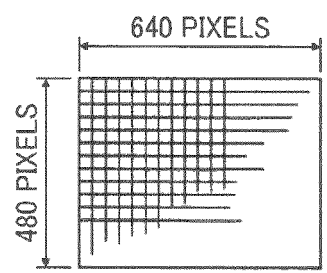

FIG. 1 is a schematic block diagram illustrating a configuration of a transmission system 1 according to an example embodiment of the present invention. FIG. 2 is an illustration for explaining transmission or reception of various data such as image data, voice data, and management data, performed by the transmission system 1 of FIG. 1. FIGS. 3A to 3C are illustrations for explaining quality of image data transmitted by the transmission system 1 of FIG. 1.

Referring to FIG. 1, the transmission system 1 mainly includes a transmission management system 50, and a plurality of transmission terminals 10aa, 10ab, 10ac, 10ba, 10bb, 10bc, 10ca, 10cb, 10cc, 10da, 10db, and 10dc. Any one of the terminals 10 transmits or receives contents data such as image data and/or voice data to or from any other one of the terminals 10.

In one example, the transmission system 1 functions as a data providing system that transmits contents data from one transmission terminal to another transmission terminal in one direction through the transmission management system 50. In another example, the transmission system 1 functions as a two-way communication system that exchanges various information including image data and/or voice data that is used to convey human's feelings between or among two or more of the plurality of transmission terminals 10 each of which functioning as a communication terminal, through the transmission management system 50 that functions as a communication management system. When functioning as the communication system, the transmission system 1 may be implemented as a videoconference system or video teleconference system.

In the following examples, it is assumed that the transmission system 1 of FIG. 1 is implemented as the videoconference system, which is one example structure of the communication system. Based on this assumption, the transmission management system 50 is implemented as the videoconference communication management system, which is one example structure of the communication management system. Further, the transmission terminal 10 is implemented as the videoconference communication terminal, which is one example structure of the communication terminal. However, the use of transmission system 1 is not limited to the following examples such that the transmission system 1 may be implemented as the transmission system or the communication system as described above.

Referring to FIG. 1, the transmission system 1 further includes a plurality of displays 120aa, 120ab, 120ac, 120ba, 120bb, 120bc, 120ca, 120cb, 120cc, 120da, 120db, and 120dc, a plurality of relay terminals 30a, 30b, 30c, and 30d, a program providing system 90, and a maintenance system 100, which are connected through a communication network 2 including the Internet 2i. FIG. 1 also shows a plurality of routers 70a, 70b, 70c, 70d, 70ab, and 70cd.

For the descriptive purposes, in this example, the transmission management system 50 may be referred to as the "management system" 50. Any number of the plurality of terminals 10aa to 10dc may be collectively or each referred to as the terminal 10. Any number of the plurality of displays 120aa to 120dc may be collectively or each referred to as the display 120. Any one of the plurality of relay terminals 30a, 30b, 30c, and 30d may be collectively or each referred to as the relay terminal 30. The terminal 10 that transmits data to another terminal 10 to carry out videoconference is referred to as the request terminal 10A. The terminal 10 that receives data from another terminal 10 to carry out videoconference is referred to as the counterpart terminal 10B. For example, the request terminal 10A includes any terminal 10 that requests another terminal 10 to start videoconference, and the counterpart terminal 10B includes any terminal 10 that is requested by the request terminal 10A to start videoconference.

As illustrated in FIG. 2, in the transmission system 1, the request terminal 10A and the counterpart terminal 10B first establish a management data session sei to start transmission and reception of various types of management data through the management system 50. Further, in this example, the request terminal 10A and the counterpart terminal 10B establish four contents data sessions sed to transmit or receive contents data through the relay terminal 30. The four contents data sessions, which may be referred to as image and/or voice data sessions, include a session "HL" to transmit high-level resolution image data HL, a session "ML" to transmit medium-level resolution image data ML, a session "LL" to transmit low-level resolution image data LL, and a session "V" to transmit voice data V.

Referring now to FIGS. 3A to 3C, various image data having different resolution levels, which are respectively transmitted by the terminal 10 of the transmission system 1, are explained. Referring to FIG. 3A, the low-level resolution image data, which functions as a base image, has 160 pixels in the horizontal direction and 120 pixels in the vertical direction. Referring to FIG. 3B, the medium-level resolution image data has 320 pixels in the horizontal direction and 240 pixels in the vertical direction. Referring to FIG. 3C, the high-level resolution image data has 640 pixels in the horizontal direction and 480 pixels in the vertical direction. In case of communicating with a narrowband signal line, low-quality image data that is generated based on the low-level resolution image data, which is the base image, is transmitted. In case of communicating with a wideband signal line, medium-quality image data that is generated based on the low-level resolution image data and the medium-level resolution image data is transmitted. In case of communicating with a broadband signal line, high-quality image data that is generated based on the low-level resolution image data, the medium-level resolution image data, and the high-level resolution image data is transmitted. Any one of the above-described types of image data may be transmitted together with voice data.

The relay terminal 30 of FIG. 1 relays contents data that is transmitted between the plurality of terminals 10. The management system 50 controls operation of the transmission system 1, for example, by performing authentication of a user at the terminal 10 through the login process, management of operation state of the terminal 10, management of a candidate list, management of operation state of the relay terminal 30, etc. In this example, the image data may be any desired data such as a moving picture and/or a still image.

The plurality of routers 70a to 70cd, which may be collectively or each referred to as the router 70, selects a route that is most suitable for transmitting contents data such as image data and voice data.

The program providing system 90 includes a hard disk device (HD) 204 (FIG. 6), which stores a terminal control program that causes the terminal 10 to perform various functions or operations. For example, the program providing system 90 sends the terminal control program to the terminal 10 through the Internet 2i to cause the terminal 10 to install the terminal control program. Further, the HD 204 of the program providing system 90 may store a relay control program that causes the relay terminal 30 to perform various functions or operations. For example, the program providing system 90 sends the relay control program to the relay terminal 30 through the Internet 2i to cause the relay terminal 30 to install the relay control program. Further, the HD 204 of the program providing system 90 may store a transmission management program that causes the management system 50 to perform various functions or operations. For example, the program providing system 90 sends the transmission management program to the management system 50 to cause the management system 50 to install the transmission management program.

The maintenance system 100 is implemented as a computer capable of maintaining, managing, fixing, or upgrading at least one of the terminal 10, relay terminal 30, management system 50, and program providing system 90. Assuming that the maintenance system 100 is provided within a country, and the terminal 10, the relay terminal 30, the management system 50, and the program providing system 90 are each installed outside the country, the maintenance system 100 maintains, manages, fixes, or upgrades at least one of the terminal 10, relay terminal 30, management system 50, and program providing system 90, remotely through the communication network 2. The maintenance system 100 may manage maintenance of at least one of the terminal 10, relay terminal 30, management system 50, and program providing system 90 without using the communication network 2. For example, a machine type number, a manufacturing number, customer information, maintenance and repair information, and failure log information may be maintained at the maintenance system 100 without using the communication network 2.

Still referring to FIG. 1, the terminals 10aa, 10ab, and 10ac, the relay terminal 30a, and the router 70a are connected to a local area network (LAN) 2a. The terminals 10ba, 10bb, and 10bc, the relay terminal 30b, and the router 70b are connected to a LAN 2b. The LAN 2a and the LAN 2b are connected to a leased line 2ab in which the router 70ab is provided. It is assumed that these devices including the terminals 10aa to 10bc are located in an area A. For example, assuming that the area A is any area in Japan, the LAN 2a could be located within an office in a city such as Tokyo, and the LAN 2b could be located within an office in another city such as Osaka.

The terminals 10ca, 10cb, and 10cc, the relay terminal 30c, and the router 70c are connected to a LAN 2c. The terminals 10da, 10db, and 10dc, the relay terminal 30d, and the router 70d are connected to a LAN 2d. The LAN 2c and the LAN 2d are connected to a leased line 2cd in which the router 70cd is provided. It is assumed that these devices including the terminals 10ca to 10dc are located in an area B apart from the area A. For example, assuming that the area is any area in the United States, the LAN 2c could be located within an office in a city such as New York, and the LAN 2d could be located within an office in another city such as Washington, D.C. The area A and the area B are connected through the Internet 2i, via the routers 70ab and 70cd.

The management system 50 and the program providing system 90 are connected through the Internet 2i to the terminal 10 and the relay terminal 30. Any one of the management system 50 and the program providing system 90 may be located at any location within or outside any one of the area A and the area B.

In this example, the communication network 2 includes the LAN 2a, LAN 2b, leased line 2ab, Internet 2i, leased line 2cd, LAN 2c, and LAN 2d. Any one or any portion of these lines or any other lines that may be included in the communication network 2 may be implemented as wired network or wireless network such as Wireless Fidelity (WiFi) network or Bluetooth network.

As shown in FIG. 1, the terminal 10, the relay terminal 30, the management system 50, the router 70, and the program providing system 90 are each provided with four digit numbers. These four digit numbers separated by dots are the simple expressions of IP addresses respectively assigned to any one of the devices shown in FIG. 1, each of which has a function of communication device. For example, the IP address of the terminal 10aa is "1.2.1.3". For simplicity, it is assumed that the IP address is expressed in IPv4. Alternatively, the IP address may be expressed in IPv6.

Further, in this example, the terminal 10 may be communicated in various ways. For example, at least two different terminals 10 that are located at different rooms in the same office, or at least two different terminals 10 that are located at different offices that are remotely located from one another, may communicate with one another. In another example, at least two different terminals 10 that are located in the same room may communicate with one another. In another example, one terminal 10 that is located indoor and another terminal 10 that is located outdoor, or at least two different terminals 10 that are both located outdoor, may communicate with one another. When the terminal 10 is located outdoor, the terminal 10 communicates with the other terminal 10 through a wireless network such as a wireless network designed for a mobile phone.

<Hardware Structure of Transmission System>

Next, a hardware structure of the transmission system 1 is explained according to an example embodiment of the present invention. In this example, when any delay in data reception is observed at the counterpart terminal 10B or the relay terminal 30, the relay terminal 30 changes resolution of image data to obtain converted image data and sends the converted image data to the counterpart terminal 10B or the request terminal 10A.

Figure 4:
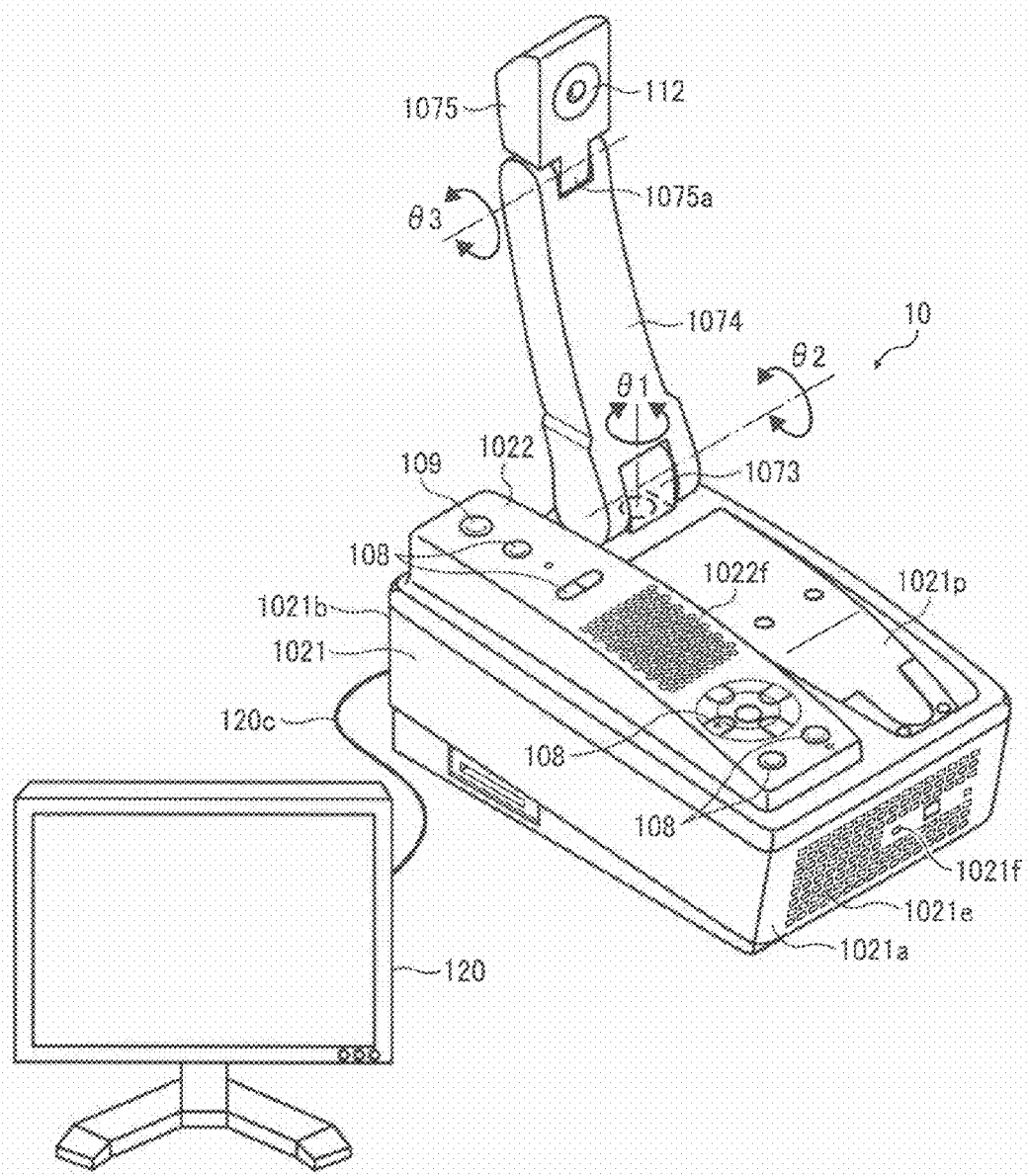
FIG. 4 is a perspective view illustrating the outer appearance of a terminal of the transmission system of FIG. 1, according to an example embodiment of the present invention.

FIG. 4 is a perspective view illustrating the outer appearance of the terminal 10 of the transmission system 1. As illustrated in FIG. 4, the terminal 10 includes a body 1021, an arm 1074, and a camera housing 1075. The body 1021 includes a front side wall 1021a having a plurality of air intake holes 1021e that are formed over the nearly entire surface of the front side wall 1021a. The body 1021 further includes a back side wall 1021b having a plurality of exhaust holes over the nearly entire surface of the back side wall 1021b. When a cooling fan that is provided within the body 1021 is driven, air flows in through the intake holes 1021e of the front side wall 1021a and out through the exhaust holes of the back side wall 1021b. The front side wall 1021a is further provided with a sound pickup hole 1021f, which is formed at a central portion of the front side wall 1021a. Through the sound pickup hole 1021f, a microphone 114 (FIG. 5) of the terminal 10 is able to catch sounds such as human voice or any sound including noise.

The body 1021 has an operation panel 1022, which is provided at the left portion when viewed from the top. The operation panel 1022 includes a plurality of operation buttons 108 ("the operation button 108"), a power switch 109, and a plurality of sound output holes 1022f. Through the sound output holes 1022f, a speaker 115 (FIG. 5) of the terminal 10 is able to output sounds such as sounds generated based on human voice. The body 1021 further includes a holder 1021p, which is provided at the right portion when viewed from the top. The holder 1021p, which has a concave shape, accommodates therein the arm 1074 and the camera housing 1075.

The arm 1074 is fixed to the body 1021 via a torque hinge 1073. With the torque hinge 1073, the arm 1074 can be rotated in all directions of up, down, right, and left, with respect to the top surface of the body 1021, while making a pan angle $\theta1$ that ranges from −180 degrees to +180 degrees and a tilt angle $\theta2$ that ranges from 0 to 90 degrees with the top surface of the body 1021. When the arm 1074 is tilted at a relative tilt angle of 45 degrees, a click sound is generated.

The camera housing 1075 incorporates therein a camera 112 that takes an image of an object. The object may be a part of a user or a room where the terminal 10 is located. The camera housing 1075 is fixed to the arm 1074 through a torque hinge 1075a. With the torque hinge 1075a, the camera housing 1075 can be rotated with respect to the arm 1074, while making a tilt angle θ3 that ranges from about +100 degrees to −90 degrees in the direction toward the front side wall 1021a of the body 1021. The camera housing 1075 makes a tilt angle of 0 degree with respect to the arm 1074 when the camera housing 1075 and the arm 1074 are on the same plane.

Further, as illustrated in FIG. 4, the terminal 10 is connected to the display 120 through a cable 120c.

The relay terminal 30, management system 50, and program providing system 90 are each implemented by a general-purpose computer such as a personal computer or a server computer. For simplicity, explanation of the outer appearance of the computer is omitted.

Figure 5:
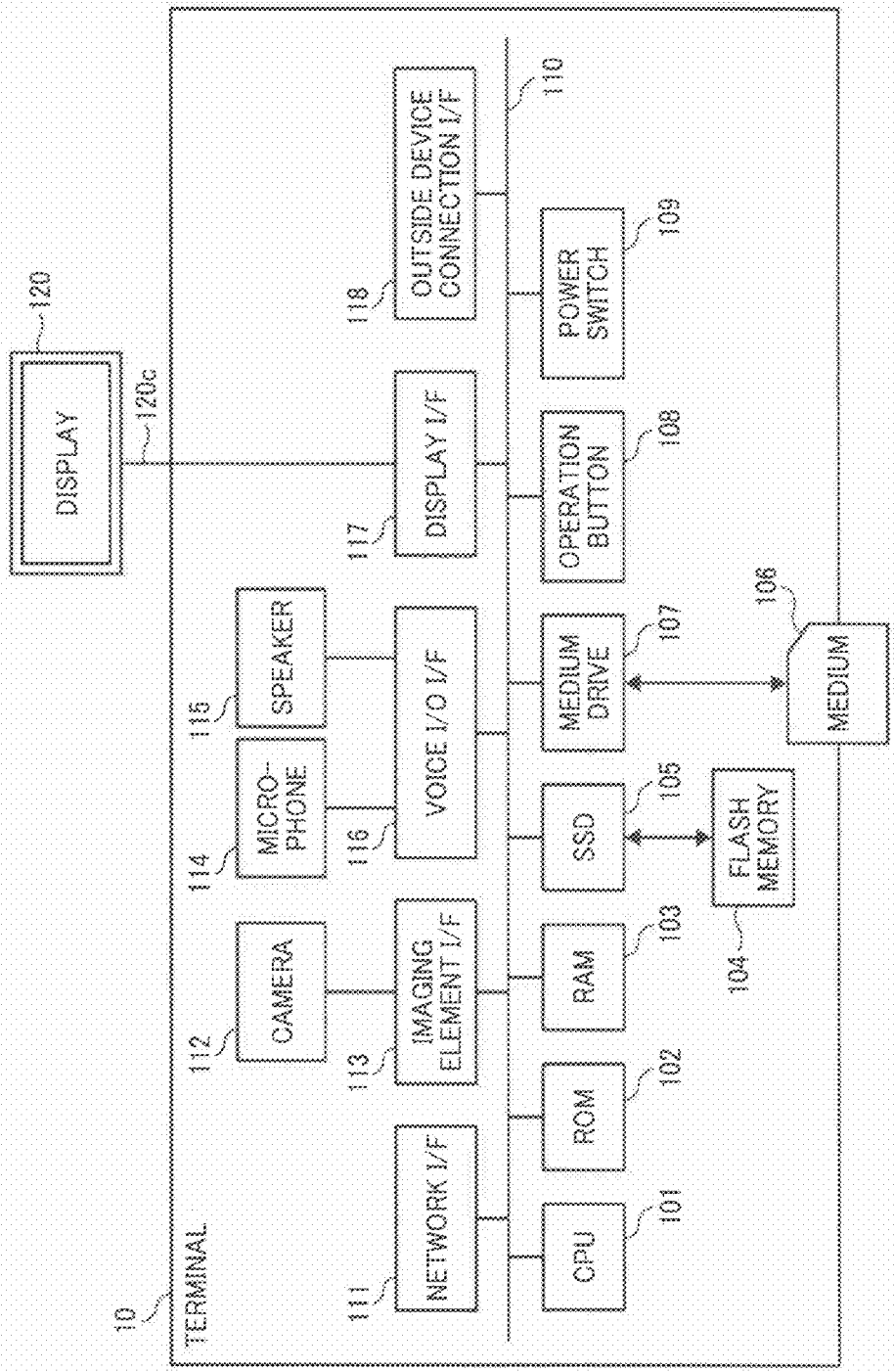
FIG. 5 is a schematic block diagram illustrating a hardware structure of the terminal of the transmission system of FIG. 1.

FIG. 5 illustrates a hardware structure of the terminal 10 according to an example embodiment of the present invention. The terminal 10 includes a central processing unit (CPU) 101, a read only memory (ROM) 102, a random access memory (RAM) 103, a flash memory 104, a solid state drive (SSD) 105, a medium drive 107, the operation button 108, the power switch 109, a network interface (I/F) 111, the camera 112, an imaging element interface (I/F) 113, the microphone 114, the speaker 115, a voice input/output interface (I/O I/F) 116, a display interface (I/F) 117, and an outside device connection interface (I/F) 118, which are electrically connected through a bus 110 such as an address bus or data bus.

The CPU 101 controls entire operation of the terminal 10. The ROM 102 stores therein a control program for execution by the CPU 101, such as an initial program loader (IPL). The RAM 103 functions as a work area of the CPU 101. The flash memory 104 stores therein various data such as the terminal control program, image data, or voice data. The SSD 105 controls reading or writing of various data with respect to the flash memory 104 under control of the CPU 101. The medium drive 107 controls reading or writing of various data with respect to a removable recording medium 106 such as a flash memory. The operation button 108 allows the user to input a user instruction, for example, by allowing the user to select a communication destination such as the counterpart terminal 10B. The power switch 109 allows the user to switch on or off the power of the terminal 10. The network I/F 111 allows the terminal 10 to transmit data through the communication network 2.

The camera 112 takes an image of an object to obtain image data under control of the CPU 101. The imaging element I/F 113 controls operation of the camera 112. The microphone 114 catches sounds such as voice. The speaker 115 outputs sounds such as sounds generated based on voice. The voice I/O I/F 116 controls input or output of sound signals such as voice signals with respect to the microphone 114 and the speaker 115 under control of the CPU 101. The display I/F 117 transmits image data to the display 120 under control of the CPU 101. The outside device connection I/F 118 controls connection of the terminal 10 to various types of outside device.

The display 120 may be implemented by a liquid crystal display (LCD) or an organic light emitting display, which displays various data such as an image of an object or an operation icon. As illustrated in FIGS. 4 and 5, the display 120 is connected to the display I/F 117 through the cable 120c.

The cable 120c may be implemented by an analog RCB (VGA) signal cable, a component video cable, a high-definition multimedia interface (HDMI) signal cable, or a digital video interactive (DVI) signal cable.

The camera 112 includes a plurality of devices such as a lens system, and a solid-state image sensing device that photo-electrically converts a light to generate an image of an object. For example, the solid-state image sensing device includes a complementary metal oxide semiconductor (CMOS) or a charge coupled device (CCD).

The outside device connection I/F 118 may be connected to an outside device such as a camera, microphone, or speaker through a universal serial bus (USB) cable. When the outside camera is connected to the terminal 10, the CPU 101 causes the terminal 10 to capture an image using the outside camera, rather than the camera 112 that is incorporated in the terminal 10. When the outside microphone or the outside speaker is connected to the terminal 10, the CPU 101 causes the terminal 10 to use the outside microphone or the outside speaker in replace of the incorporated microphone 114 or the incorporated speaker 115.

The recording medium 106, which can be freely attached to or detached from the terminal 10, includes any desired type of recording medium. In alternative to the flash memory 104, any nonvolatile memory that is readable and writable under control of the CUP 101 may be used such as Electrically Erasable and Programmable ROM (EEPROM).

The terminal control program may be written onto a recording medium that is readable by a general-purpose computer such as the recording medium 106 in any format that is installable or executable by a general-purpose computer. Once the terminal control program is written onto the recording medium, the recording medium may be distributed. Further, the terminal control program may be stored in any desired memory other than the flash memory 104, such as the ROM 102.

Figure 6:
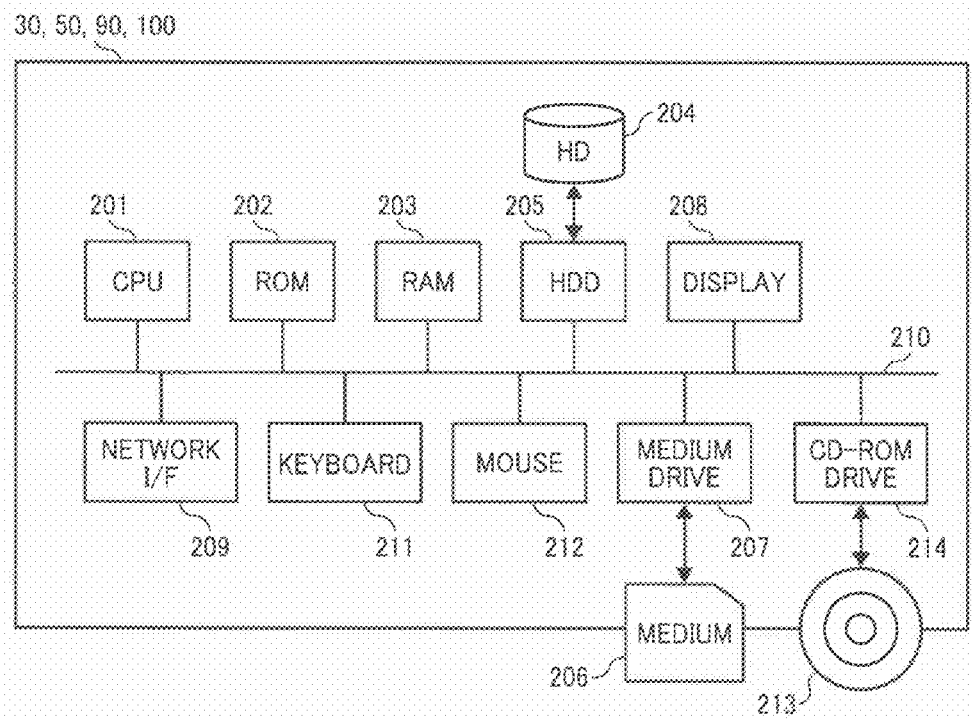
FIG. 6 is a schematic block diagram illustrating a hardware structure of any one of a transmission management system, a relay terminal, and a program providing system of FIG. 1.

FIG. 6 illustrates a hardware structure of the management system 50 of FIG. 1. The management system 50 includes a CPU 201, a ROM 202, a RAM 203, the HD 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus.

The CPU 201 controls entire operation of the management system 50. The ROM 202 stores a control program for execution by the CPU 201, such as the IPL. The RAM 203 functions as a work area of the CPU 201. The HD 204 stores therein various data such as a transmission management program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used.

The transmission management program may be written onto a recording medium that is readable by a general-purpose computer such as the recording medium 206 or the CD-ROM 213 in any format that is installable or executable by the general-purpose computer. Once the transmission management program is written onto the recording medium, the recording medium may be distributed. Further, the transmission management program may be stored in any desired memory other than the HD 204, such as the ROM 202.

The relay terminal 30 is substantially similar in hardware structure to the management system 50 of FIG. 6, except for replacement of the transmission management program with a relay terminal control program that is used for controlling the relay terminal 30. The relay terminal control program may be written onto a recording medium that is readable by a general-purpose computer such as the recording medium 206 or the CD-ROM 213 in any format that is installable or executable by the general-purpose computer. Once the relay terminal control program is written onto the recording medium, the recording medium may be distributed. Further, the relay terminal control program may be stored in any desired memory other than the HD 204, such as the ROM 202.

The program providing system 90 is substantially similar in hardware structure to the management system 50 of FIG. 6, except for replacement of the transmission management program with a program providing program that is used for controlling the program providing system 90. The program providing program may be written onto a recording medium that is readable by a general-purpose computer such as the recording medium 206 or the CD-ROM 213 in any format that is installable or executable by the general-purpose computer. Once the program providing program is written onto the recording medium, the recording medium may be distributed. Further, the program providing program may be stored in any desired memory other than the HD 204, such as the ROM 202.

The maintenance system 100 is substantially similar in hardware structure to the management system 50 of FIG. 6.

Other examples of removable recording medium, which may be used in replace of the CD-ROM 213, include, but not limited to, compact disc recordable (CD-R), digital versatile disk (DVD), and blue ray disc.

<Functional Structure of Transmission System>

Figure 7:
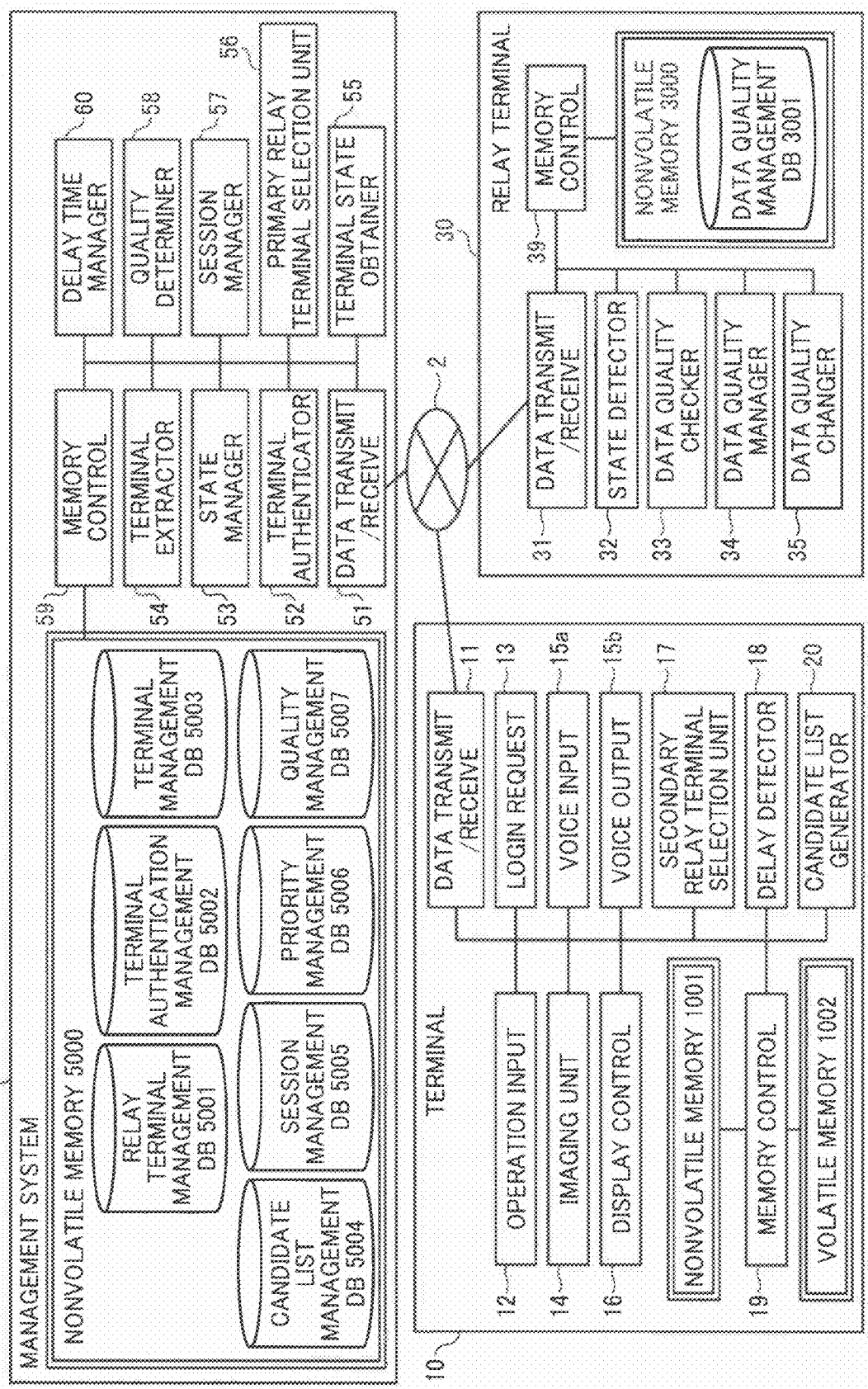
FIG. 7 is a schematic block diagram illustrating functional structures of the transmission management system, the terminal, and the relay terminal, of the transmission system of FIG. 1.

Referring now to FIG. 7, a functional structure of the transmission system 1 of FIG. 1 is explained according to an example embodiment of the present invention. More specifically, FIG. 7 illustrates a functional structure of the management system 50, a functional structure of the terminal 10, and a functional structure of the relay terminal 30. As illustrated in FIG. 1, the terminal 10, the relay terminal 30, and the management system 50 exchange data with one another through the communication network 2. For simplicity, the program providing system 90 of FIG. 1 is not shown in FIG. 7.

<Functional Structure of Terminal>

The terminal 10 includes a data transmit/receive 11, an operation input 12, a login request 13, an imaging unit 14, a voice input 15a, a voice output 15b, a display control 16, a secondary relay terminal selection unit 17, a delay detector 18, a memory control 19, and a candidate list generator 20. These units that are shown in FIG. 7 correspond to a plurality of functions or functional modules, which are executed according to an instruction of the CPU 101 (FIG. 5) that is generated according to the terminal control program being loaded from the flash memory 104 onto the RAM 103.

The terminal 10 further includes a nonvolatile memory 1001 that may be implemented by the RAM 103 (FIG. 5), and a volatile memory 1002 that may be implemented by the flash memory 104 (FIG. 5).

Referring now to FIGS. 5 and 7, a functional structure of the terminal 10 is explained according to an example embodiment of the present invention. More specifically, in this example, the operations or functions that are performed by the terminal 10, which include the operations or functions performed by the units shown in FIG. 7, are performed in relation to one or more hardware devices of the terminal 10 that are shown in FIG. 5.

The operations or functions of the data transmit/receive 11 of the terminal 10 of FIG. 7 are performed by the network I/F 111 of FIG. 5 according to an instruction received from the CPU 101. The data transmit/receive 11 transmits or receives various data or information to or from another terminal, device, or system, through the communication network 2. In this example, the data transmit/receive 11 starts receiving state information that indicates the state of each candidate counterpart terminal 10 from the management system 50, before starting communication with any counterpart terminal 10B. More specifically, as described below, the data transmit/receive 11 sends a candidate list request to the management system 50 to request the management system 50 to send state information of the candidate counterpart terminal 10, for example, at the time when the power of the terminal 10 is turned on. In this example, the candidate counterpart terminal 10, which may be referred to as the candidate terminal 10, is any terminal 10 that is previously determined as a candidate that is most likely to be requested by the request terminal 10A to start videoconference. With the state information of the candidate terminal 10, the user at the request terminal 10A is able to know the operation state of the candidate terminal 10. The operation state of the candidate terminal 10 indicates whether the candidate terminal 10 is on-line or off-line, whether the user at the candidate terminal 10 is having a session, or whether the user at the candidate terminal 10 is available or not available. The state information of the candidate terminal 10 further indicates various other types of information regarding the candidate terminal 10, such as whether the cable 120c is disconnected from the candidate terminal 10, whether the candidate terminal 10 is capable of outputting voice data but not to capable of outputting image data, or whether the candidate terminal 10 operates in MUTE mode in which no sounds are output. For the descriptive purposes, in the following examples, it is assumed that the state information of the candidate terminal 10 at least indicates the operation state of the candidate terminal 10.

The operations or functions of the operation input 12 of the terminal 10 of FIG. 7 are performed by the operation button 108 and the power switch 109 (FIG. 5) according to an instruction received from the CPU 101. The operation input 12 receives a user instruction input by the user through the operation button 108 or the power switch 109. For example, when the user selects "ON" using the power switch 109, the operation input 12 receives a user instruction for turning the power on, and causes the terminal 10 to turn on the power.

The operations or functions of the login request 13 are performed according to an instruction received from the CPU 101. When the power of the terminal 10 is turned on, the login request 13 automatically causes the data transmit/receive 11 to send login request information that requests the login process, and a current IP address of the terminal 10, to the management system 50 through the communication network 2. When the power of the terminal 10 is turned off according to a user instruction received from the user through the power switch 109, the login request 13 causes the data transmit/receive 11 to send current state information of the terminal 10 to the management system 50, which indicates that the power of the terminal 10 is turned off. After the state information is sent, the operation input 12 turns off the power of the terminal 10. As the state information of the terminal 10 is sent every time the power is turned off, the management system 50 is able to know that the terminal 10 is off-line in realtime.

The operations or functions of the imaging unit 14 of the terminal 10 of FIG. 7 are performed by the camera 112 and the imaging element I/F 113 according to an instruction received from the CPU 101. The imaging unit 14 takes an image of an object to output image data of the object.

The operations or functions of the voice input 15a of the terminal 10 of FIG. 7 are performed by the voice input/output I/F 116 according to an instruction received from the CPU 101. After the microphone 114 converts voice of the user at the terminal 10 to a voice signal, the voice input 15a inputs the voice signal in the form of voice data.

The operations or functions of the voice output 15b of the terminal 10 of FIG. 7 are performed by the voice input/output I/F 116 according to an instruction received from the CPU 101. The voice output 15b outputs a voice signal of voice data that is received from another terminal 10 through the speaker 115.

Figure 8:
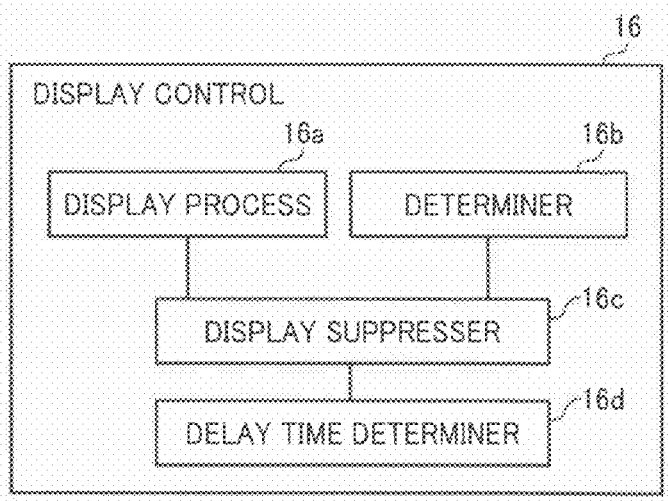
FIG. 8 is a schematic block diagram illustrating a functional structure of a display control of the terminal of FIG. 7.

The operations or functions of the display control 16 of the terminal 10 of FIG. 7 are performed by the display I/F 117 according to an instruction received from the CPU 101. The display control 16 controls transmit of image data to the display 120. Further, as illustrated in FIG. 8, the display control 16 includes a display process 16a, a determiner 16b, a display suppresser 16c, and a delay time determiner 16d.

The display process 16a causes the display 120 that is provided for the request terminal 10A to display a candidate list before the request terminal 10A starts videoconference with a desired counterpart terminal 10B. The candidate list is generated based on the state information of the candidate terminal 10 that is received by the data transmit/receive 11 after the request terminal 10A establishes communication with the management system 50. More specifically, as described above referring to FIG. 7, the data transmit/receive 11 of the request terminal 10A sends a candidate list request to the management system 50, which requests the management system 50 to send state information of the candidate terminal 10, for example, when the power of the request terminal 10A is turned on. In response to the candidate list request, the management system 50 starts sending the state information of the candidate terminal 10, one by one, to the request terminal 10A.

Figure 26:
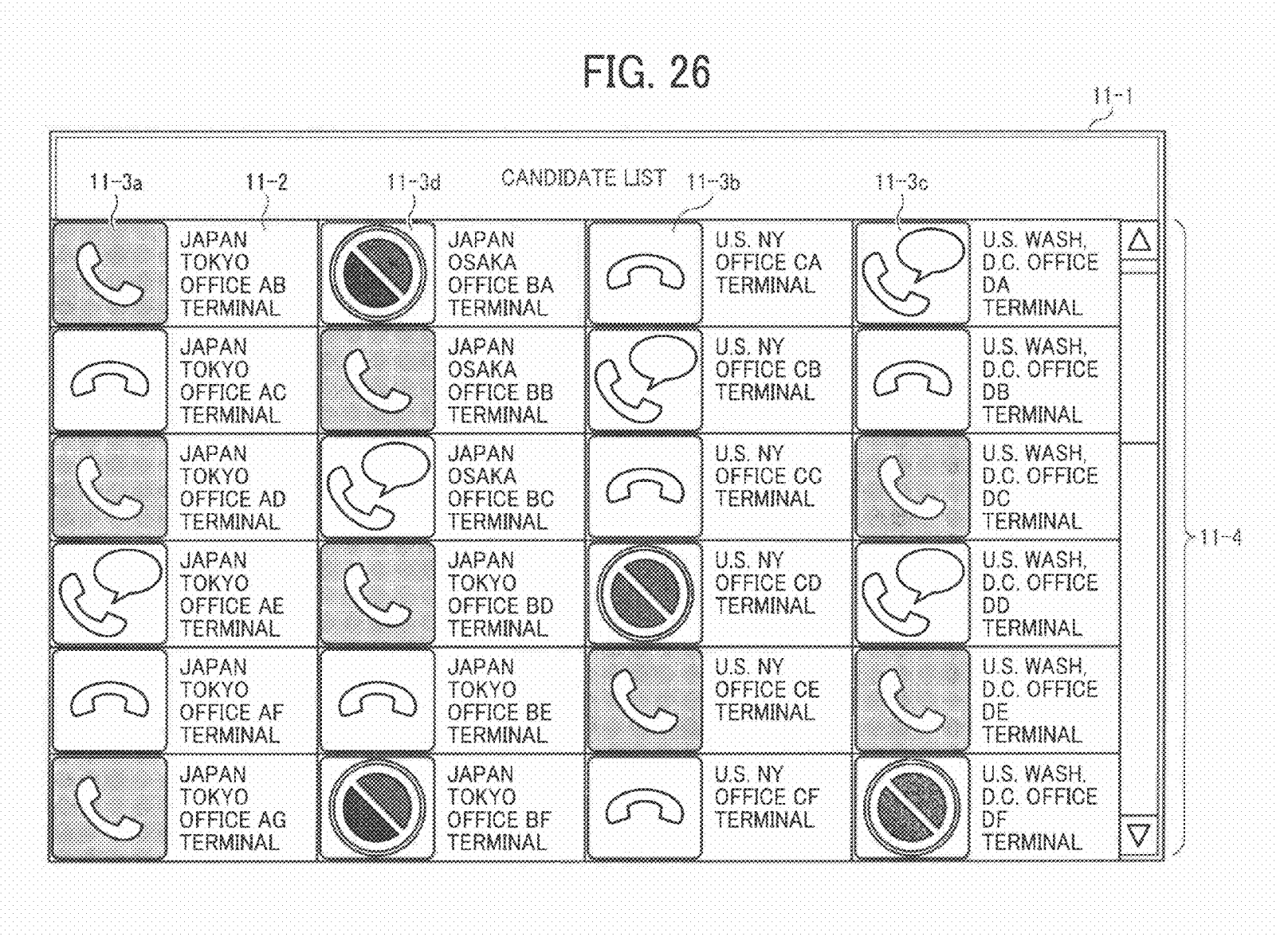

The display process 16a of the request terminal 10A causes the display 120 connected to the request terminal 10A to display a candidate list frame 11-1 as illustrated in FIG. 26. Within the candidate list frame 11-1, the display 120 further displays a terminal name 11-2 of each candidate terminal 10, which may be any type of identification information for identifying each candidate terminal 10. For example, the terminal name 11-2 for the terminal 10ab of FIG. 1 may be expressed as "JAPAN TOKYO OFFICE AB TERMINAL". For each candidate terminal 10, an icon that reflects the operation state of each candidate terminal 10 is displayed side by side with the terminal name 11-2. In this example, four types of icons 11-3a, 11-3b, 11-3c, and 11-3d are displayed depending on the operation state of the candidate terminal 10. The icon 11-3a of FIG. 26 indicates that the candidate terminal 10 is on-line, and is available for videoconference. The icon 11-3b of FIG. 26 indicates that the candidate terminal 10 is off line, and is not available for videoconference. The icon 11-3c of FIG. 26 indicates that the candidate terminal 10 is on-line, but is having videoconference with another terminal 10. In such case, the request terminal 10A may participate in the videoconference that is currently carried out by the candidate terminal 10. The icon 11-3d of FIG. 26 indicates that the candidate terminal 10 is on line and having videoconference with another terminal 10, but is not available at least for temporarily, for example, as the user is not physically present at the candidate terminal 10. In such case, the request terminal 10A cannot participate in the videoconference that is currently carried out by the candidate terminal 10 until the user returns. For the descriptive purposes, any one of the icons 11-3a to 11-3d is referred to as the icon 11-3.

Within the candidate list frame 11-1, the display 120 further displays a scroll bar 11-4 at the right side. According to selection of one of the arrows made by the user at the terminal 10, the display 120 scrolls up or down to show a complete list of terminal names 11-2 of candidate terminals 10 and icons 11-3 each of which reflects the operation state of each candidate terminal 10.

As described above, based on state information that is sent from the management system 50, the display process 16a of the request terminal 10A causes the display 120 to display the candidate list of FIG. 26, which is a list of terminal names 11-2 of candidate terminals 10 and icons 11-3 each of which reflects the operation state of each candidate terminal 10. However, the request terminal 10A receives state information from the plurality of candidate terminals 10 at different times, since the time for login differs among the plurality of candidate terminals 10. Further, even when the plurality of candidate terminals 10 is assumed to login at the same times, the request terminal 10A is most likely to receive state information from the plurality of candidate terminals 10 at different times due to the differences in communication network environments among the plurality of candidate terminals 10.

Figure 34:
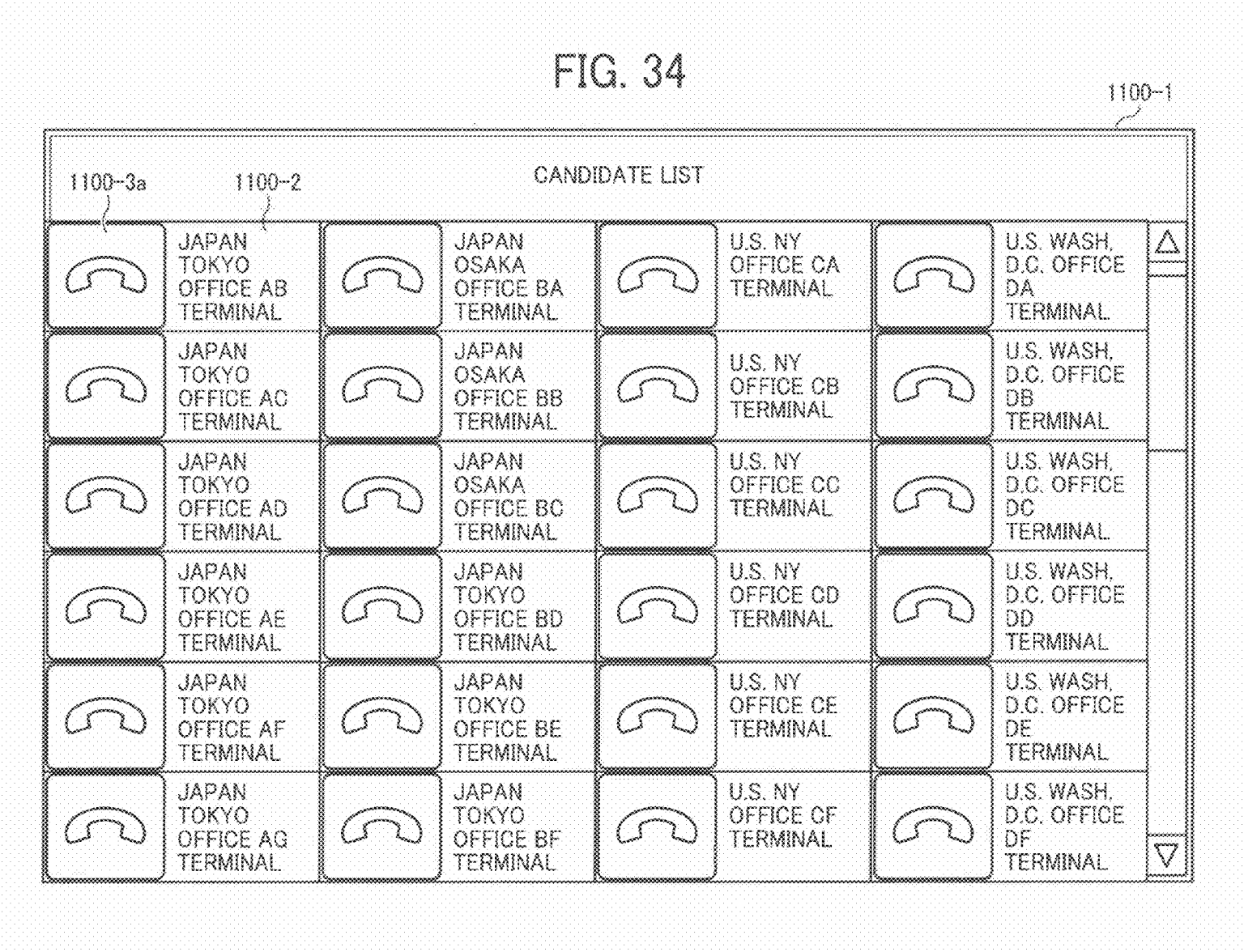

The differences in times at which the request terminal 10A receives state information from the plurality of candidate terminals 10 is more prevalent especially when the request terminal 10A displays a candidate list right after the power is turned on. At the time when the power is turned on, in one example, the request terminal 10A causes the display 120 to display a candidate list of FIG. 34, which indicates that all of the candidate terminals 10 have icons 1100-3a as no state information is received at the request terminal 10A. As the request terminal 10A starts receiving state information from the plurality of candidate terminals 10, one after another, for example, after one second passes from the time when the candidate list of FIG. 34 is displayed, the request terminal 10A causes the display 120 to display a candidate list of FIG. 35 that reflects some of the operation states of the candidate terminals 10 based on the received state information. After one second passes from the time when the candidate list of FIG. 35 is displayed, the request terminal 10A causes the display 120 to display a candidate list of FIG. 36 that reflects more of the operation states of the candidate terminals 10.

Figure 35:
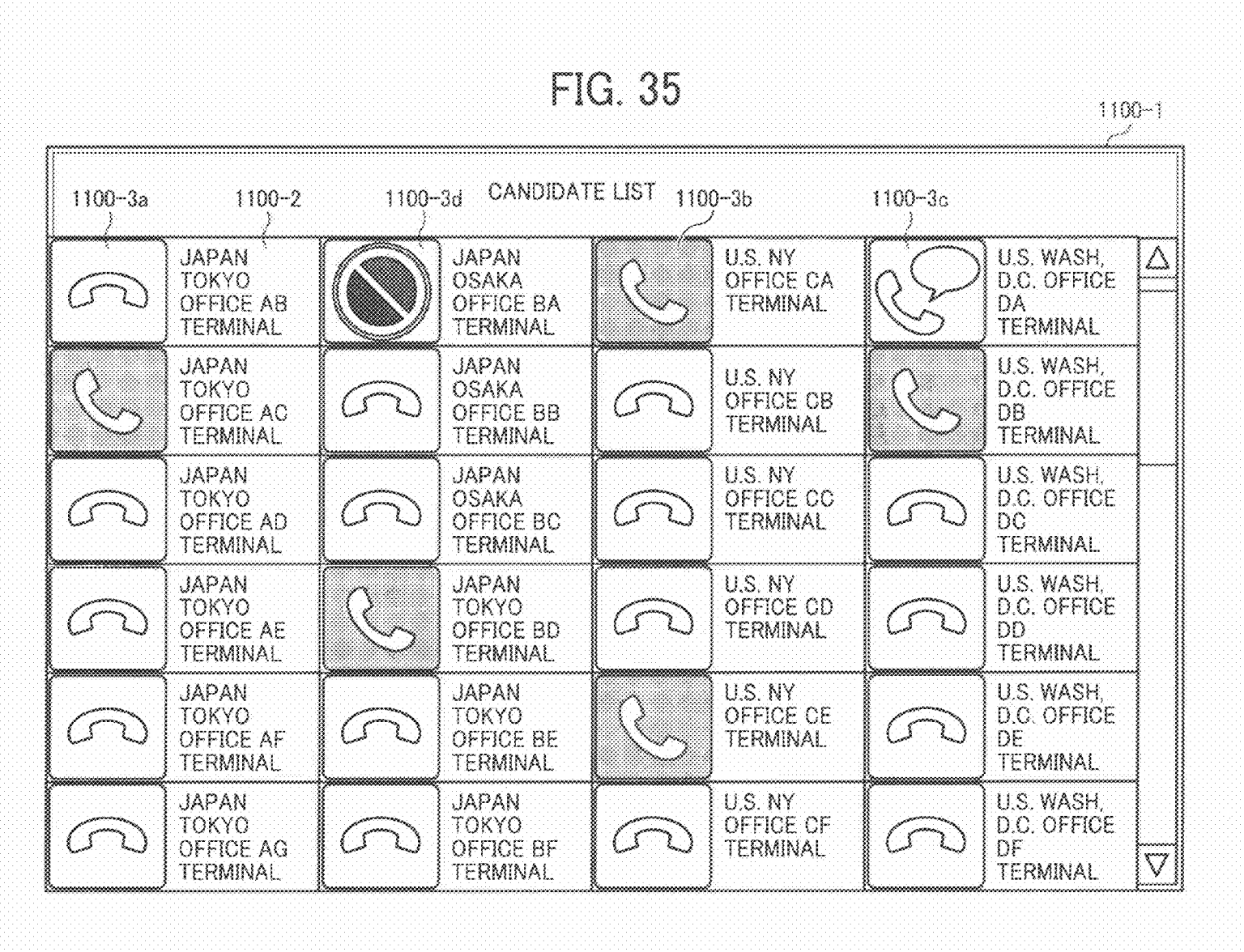
Figure 36:
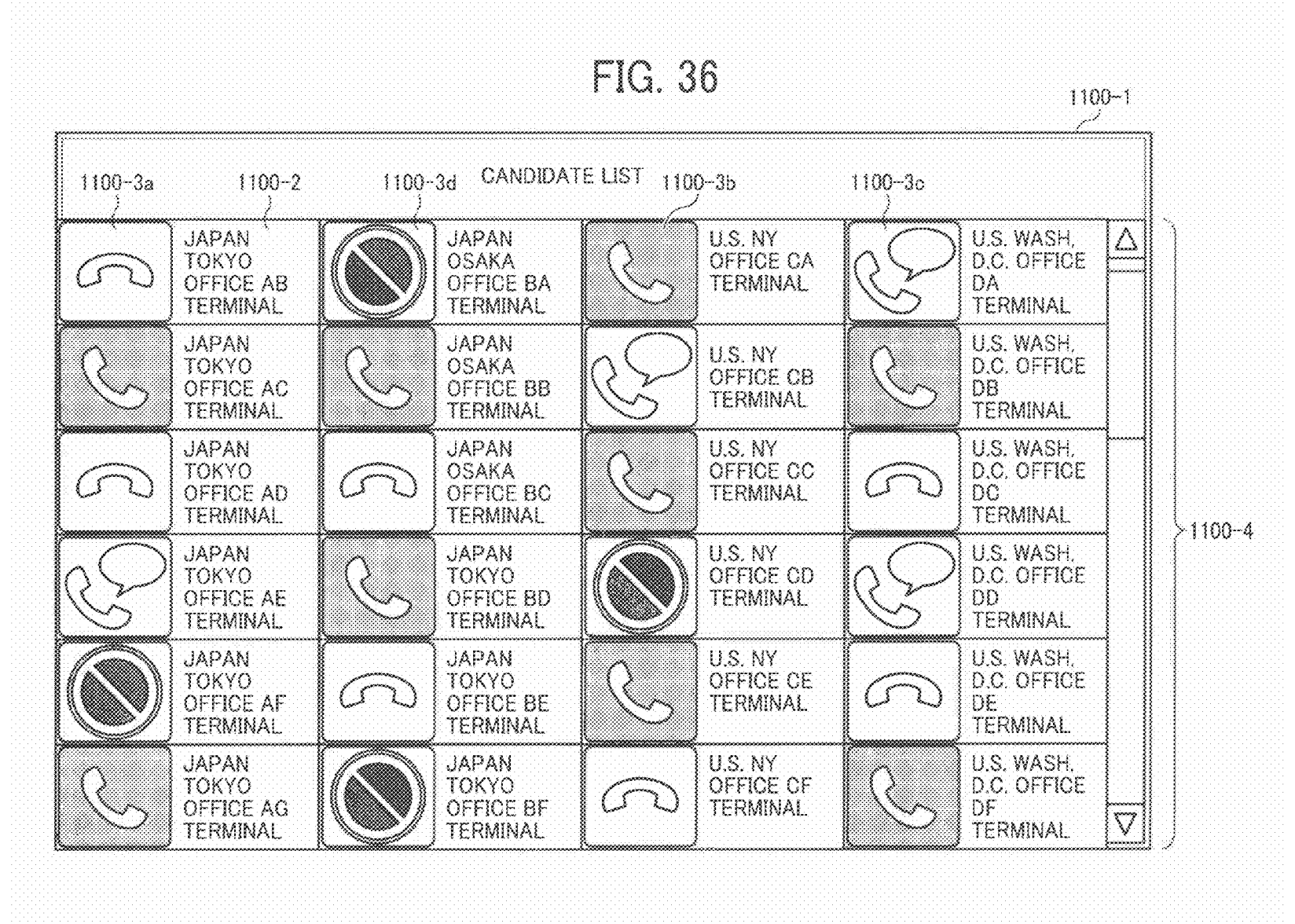

Referring to FIGS. 34 to 36, the candidate list includes a candidate list frame 1100-1, which shows a terminal name for each of the candidate terminals 10 such as the terminal name "JAPAN TOKYO OFFICE AB TERMINAL" 1100-2. For each of the terminal names of the candidate terminals 10, an icon that reflects the operation state of the corresponding candidate terminal 10 is displayed. In this example, four types of icons 1100-3a, 1100-3b, 1100-3c, and 1100-3d are displayed depending on the operation state of the candidate terminal 10. The icon 1100-3a of FIGS. 34 to 36 indicates that the candidate terminal 10 is off-line, and is not available for videoconference. The icon 1100-3b of FIGS. 35 and 36 indicates that the candidate terminal 10 is on-line, and is available for videoconference. The icon 1100-3c of FIGS. 35 and 36 indicates that the candidate terminal 10 is on-line, but is having videoconference with another terminal 10. The icon 1100-3d of FIGS. 35 and 36 indicates that the candidate terminal 10 is on line and having videoconference with another terminal 10, but is not available at least for temporarily, for example, as the user is not physically present at the candidate terminal 10. Within the candidate list frame 1100-1, the display 120 further displays a scroll bar 1100-4 at the right side. According to selection of one of the arrows made by the user at the terminal 10, the display 120 scrolls up or down to show a complete list of terminal names 1100-2 of candidate terminals 10 and icons 1100-3 each of which reflects the operation state of each candidate terminal 10.

As described above referring to FIGS. 34 to 36, as the request terminal 10A receives state information from the plurality of candidate terminals 10, one after another, within a few seconds, the icons 1100-3 constantly change to reflect the operation states of the candidate terminals 10 right after the candidate list frame 1100-1 is displayed. The constant changes in icons within a few seconds may cause flicker in screen, which is unpleasing to the human eye.

In order to solve the problem described above referring to FIGS. 34 to 36, the display control 16 of the terminal 10 of FIG. 7 causes the display 120 to suppress display of the candidate list until it is determined that the refresh rate for screen sufficiently slows down.

Referring back to FIG. 8, the determiner 16b determines whether specific state information i is included in the state information that is received by the data transmit/receive 11. The specific state information i is state information indicating the operation state of a specific terminal 10 that is previously determined by the management system 50. For example, the specific state information i may be state information indicating the operation state of a dummy terminal that is previously determined by the management system 50. The dummy terminal may be any terminal that physically exists but not communicable to another terminal 10 in the transmission system 1, or any terminal that does not physically exist. Alternatively, the specific state information i may be state information indicating the operation state of the request terminal 1 OA itself. The data transmit/receive 11 of the request terminal 10A does not usually receive the state information indicating the operation state of the request terminal 10A itself from the management system 50 as such state information regarding its own terminal 10A is known to the request terminal 10A. However, the management system 50 may send the state information regarding the request terminal 10A to the request terminal 10A as the specific state information i.

For the descriptive purposes, in the following examples, it is assumed that the specific state information i is state information indicating the operation state of the request terminal 10A that requests for videoconference or transmits data to the counterpart terminal 10B.

The display suppresser 16c causes the display process 16a to suppress display of information on the display 120 when it is determined that the data transmit/receive 11 has not received the specific state information i, even after the data transmit/receive 11 starts receiving state information of the other terminal 10 from the management system 50.

In one example, the display suppresser 16c delays the time at which the display 120 displays the candidate list, such as the candidate list of FIG. 26, even after candidate list information is received from the management system 50. In another example, the display suppresser 16c causes the display 120 to instantly display only the candidate list frame 11-1 of FIG. 26 as the candidate list information is received, but delay display of other information such as the terminal name 11-2 and the icon 11-3. In another example, the display suppresser 16c causes the display 120 to instantly display only the candidate list frame 11-1 and the terminal name 11-2 as the candidate list information is received, but delay display of other information such as the icon 11-3.

Further, in alternative to displaying the candidate list as shown in FIG. 26, the display process 16a of the display control 16 may cause the display 120 to firstly display a candidate list in a manner illustrated in FIG. 34. Referring to FIG. 34, in addition to the candidate list frame 1100-1 and the terminal name 1100-2, the display process 16a firstly displays the icon 1100-3a reflecting the "off line" state for all candidate terminals 10 without displaying the icon that actually reflects the current operation state of the candidate terminal 10. After a predetermined time period passes, the display process 16a displays the icon that actually reflects the current operation state of the candidate terminal 10, which is selected based on the state information of the candidate terminal 10 received from the management system 50.

The delay time determiner 16d of the request terminal 10A starts counting a time period from the time when the data transmit/receive 11 of the request terminal 10A sends a candidate list request to the management system 50. When the determiner 16b of the display control 16 determines that the specific state information i is received, the delay time determiner 16d stops counting the time period.

Additionally, the delay time determiner 16d may count a number of items of state information that has been received by the data transmit/receive 11 from the time when the data transmit/receive 11 sends the candidate list request until the determiner 16b of the display control 16 determines that the specific state information i is received. Based on the counted number of state information items, the delay time determiner 16d calculates a delay time t, which is a time period for extending the process of suppressing display of information on the display 120. More specifically, the display suppresser 16c extends a time period for suppressing display of information such as the icon 11-3 by the delay time t that is determined by the delay time determiner 16d.

The determiner 16b determines whether state information of the terminal 10 is received by the data transmit/receive 11 during the delay time t, in addition to the state information of the terminal 10 that has been received before the delay time t. When the determiner 16b determines that the additional state information of the terminal 10 is received, the display control 16 further extends a time period for suppressing display of information to be displayed on the display 120 by the delay time t counted from the time when the additional state information of the terminal 10 is received. The additional state information of the terminal 10 may be any state information of any terminal 10 other than the specific state information i. For example, assuming that the data transmit/receive 11 of the request terminal 10A receives state information of the candidate terminal 10 during a time period between the time when the request terminal 10A sends the candidate list request information to the management system 50 and the time when the delay time t passes, the data transmit/receive 11 of the request terminal 10A determines that it receives the additional state information when the data transmit/receive 11 receives any state information from a terminal 10 that has not sent any state information since the request terminal 10A sends the candidate list request information. In another example, the data transmit/receive 11 of the request terminal 10A determines that it receives the additional state information when the data transmit/receive 11 receives any state information from the terminal 10 that has already sent state information, which is different from the state information that has been previously sent by the terminal 10 before the delay time t. For example, the terminal 10 may send the state information to the management system 50 during the delay time t, when there is any change in operation state of the terminal 10 that is reflected by the state information that is previously sent before the delay time t.

Figure 9:
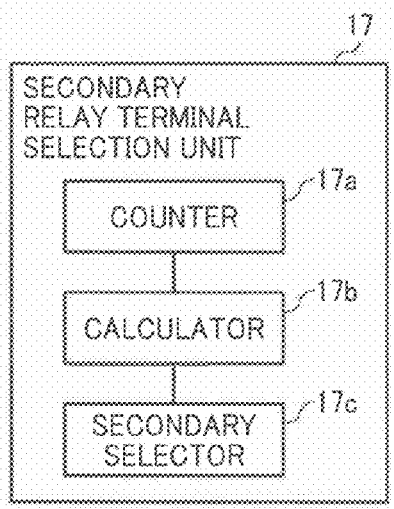
FIG. 9 is a schematic block diagram illustrating a functional structure of a secondary relay terminal selection unit of the terminal of FIG. 7.

The secondary relay terminal selection unit 17 selects one of the relay terminals 30 that is suitable for communication to start videoconference. More specifically, according to an instruction received from the CPU 101 (FIG. 5), the secondary relay terminal selection unit 17 performs selection of the relay terminal 30 using a counter 17a, a calculator 17b, and a secondary selector 17c as illustrated in FIG. 9.

The counter 17a obtains date and time information indicating the date and time at which the data transmit/receive 11 of the terminal 10 receives preparatory transmit information when the preparatory transmit information is transmitted from another terminal 10. The calculator 17b calculates a time period T between the time when the preparatory information is transmitted by another terminal 10 and the time when the preparatory information is received at the terminal 10, based on the difference between the time and date information obtained by the counter 17a and time and date information included in the preparatory transmit information.

The secondary selector 17c selects one of the relay terminals 30 having the minimum value of the time period T calculated by the calculator 17b.

The delay detector 18 detects a delay time ms indicating a time period in which contents data such as image data or voice data sent through the relay terminal 30 from another terminal 10 is delayed, according to an instruction received from the CPU 101 (FIG. 5).

The memory control 19 is implemented by the SSD 105 (FIG. 5) according to an instruction received from the CPU 101. The memory control 19 stores various data in the nonvolatile memory 1001, or read out various data from the nonvolatile memory 1001. The nonvolatile memory 1001 stores therein various data such as terminal identification (ID) information for identifying the terminal 10, and a password for authenticating a user at the terminal 10. The memory control 19 further stores various data in the volatile memory 1002, or read out various data from the volatile memory 1002. The volatile memory 1002 overwrites its memory space to store image data and/or voice data every time the terminal 10 communicates with another terminal 10. Before overwriting image data with new image data, the memory control 19 reads out the image data for display on the display 120, and the voice data for output through the speaker 150.

The candidate list generator 20 generates or updates a candidate list, based on the candidate list information and state information of the candidate terminal 10 that are respectively received from the management system 50. For example, as illustrated in FIG. 26, the candidate list includes the icon 11-3 that reflects the current state of each candidate terminal 10.

In this example, any one of the terminal ID of the terminal 10 and the relay terminal ID of the relay terminal 30 includes any type of identification information that can be expressed by any language, character, symbol, mark, or any combination of language, character, symbol, and mark.

<Functional Structure of Relay Terminal>

Referring to FIG. 7, the relay terminal 30 includes a data transmit/receive 31, a state detector 32, a data quality checker 33, a data quality manager 34, a data quality changer 35, and a memory control 39. Upon execution, the CPU 201 (FIG. 6) loads the relay terminal control program from the HD 204 onto the RAM 203 to cause one or more of the units illustrated in FIG. 6 to perform functions or operations shown in FIG. 7. The relay terminal 30 further includes a nonvolatile memory 3000 that may be implemented by the HD 204 (FIG. 6). Any data stored in the nonvolatile memory 3000 is prevented from being deleted even after the power of the relay terminal 30 is turned off.

The nonvolatile memory 3000 includes a data quality management database (DB) 3001, which stores a data quality management table illustrated in FIG. 11. The data quality management table of FIG. 11 stores an Internet protocol (IP) address of the counterpart terminal 10B to which image data is transmitted through the relay terminal 30, in association with quality of image data to be transmitted through the relay terminal 30 to the counterpart terminal 10B.

(Functional Structure of Relay Terminal)

Next, a functional structure of the relay terminal 30 is explained according to an example embodiment of the present invention. More specifically, in this example, the operations or functions that are performed by the relay terminal 30, which include the operations or functions performed by the units shown in FIG. 7, are performed in relation to one or more hardware devices of the relay terminal 10 that are shown in FIG. 6.

The data transmit/receive 31 of FIG. 7 is implemented by the network I/F 209 of FIG. 6 according to an instruction received from the CPU 201. The data transmit/receive 31 transmits or receives various data to or from another terminal, device, or system through the communication network 2.

The state detector 32, which is implemented by the CPU 201 of FIG. 6, detects an operation state of the relay terminal 30. The operation state includes the on-line state ("ON LINE"), the off-line state ("OFF LINE"), the communicating state, and the holding state. The on-line state is a state in which the relay terminal 30 is turned on and available for data transmission/reception. The off-line state is a state in which the relay terminal 30 is not available for data transmission/reception, for example, as the power is not turned on. The communicating state is a state in which the relay terminal 30 is on-line, but is communicating with another terminal. The holding state is a state in which the relay terminal 30 is on-line, but is not available at least for temporarily.

The data quality checker 33, which is implemented by the CPU 201 of FIG. 6, searches the data quality management DB 3001 (FIG. 11) using the IP address of the counterpart terminal 10B as a search key to extract information regarding the quality of image data suitable to communication with the counterpart terminal 10B. Based on the extracted information regarding the quality of image data, the relay terminal 30 determines the quality of image data to be transmitted to the counterpart terminal 10B.

The data quality manager 34, which may be implemented by the CPU 201 of FIG. 6, changes the contents of the data quality management DB 3001 based on the quality information that is received from the management system 50. For example, assuming that the request terminal 10aa having the terminal ID "01aa" communicates with the counterpart terminal 10db having the terminal ID "01db" to transmit or receive high quality image data during videoconference, transmission of image data may delay for various reasons. For example, if a request terminal 10bb and a counterpart terminal 10ca start videoconference over the communication network 2, transmission of image data from the request terminal 10aa to the counterpart terminal 10db tends to slow down due to the increase in traffic. In such case, the relay terminal 30 changes the quality of image data to be transmitted from high image quality to lower image quality. More specifically, the contents in the data quality management DB 3001 is changed from high-level image quality to medium-level image quality, based on the quality information indicating the use of medium-level image quality.

The data quality changer 35, which may be implemented by the CPU 201 of FIG. 6, changes the quality of image data received from the request terminal 10 to the quality of image data according to the contents of the data quality management DB 3001. The memory control 39 is implemented by the HDD 205 according to an instruction received from the CPU 201. The memory control 39 stores various data in the nonvolatile memory 3000, or reads out various data from the nonvolatile memory 3000.

<Functional Structure of Management System>

The management system 50 includes a data transmit/receive 51, a terminal authenticator 52, a state manager 53, a terminal extractor 54, a terminal state obtainer 55, a primary relay terminal selection unit 56, a session manager 57, a quality determiner 58, a memory control 59, and a delay time manager 60. Upon execution, the CPU 201 (FIG. 6) loads the transmission management program from the HD 204 onto the RAM 203 to cause the units shown in FIG. 6 to perform operations or functions as illustrated in FIG. 7. The management system 50 further includes a nonvolatile memory 5000, which stores various data or information in a manner such that the stored data is prevented from being deleted even after the power of the management system 50 is turned off. The nonvolatile memory 5000 may be implemented by the HD 204 of FIG. 6. Further, in this example, the nonvolatile memory 5000 stores therein information regarding the candidate list frame 11-1 of FIG. 26.

The nonvolatile memory 5000 includes a relay terminal management database (DB) 5001, which stores therein a relay terminal management table of FIG. 12. The relay terminal management table of FIG. 12 stores, for each relay terminal ID of the terminal 30, the operation state of the relay terminal 30, the received date and time at which the management system 50 receives the state information indicating the operation state of the relay terminal 30 from the relay terminal 30, the IP address of the relay terminal 30, and the maximum data transmission speed of the relay terminal 30 in Mbps. For example, for the relay terminal 30a having the relay terminal ID "111a", the relay terminal management table indicates that the operation state is "ON LINE", the received date and time at which the management system 50 receives the state information is "13:00 PM of 11/10/2009", the IP address of the relay terminal 30a is "1.2.1.2", and the maximum data transmission speed of the relay terminal 30a is 100 Mbps.

The nonvolatile memory 5000 further includes a terminal authentication management database (DB) 5002, which stores a terminal authentication management table of FIG. 13. The terminal authentication management table of FIG. 13 stores a plurality of terminal IDs respectively assigned to the terminals 10 that are managed by the management system 50, in association with a plurality of passwords that are previously determined for the respective terminals 10. For example, referring to the terminal authentication management table of FIG. 13, the terminal 10aa having the terminal ID "01aa" is assigned with the password "aaaa".

The nonvolatile memory 5000 further includes a terminal management database (DB) 5003, which stores a terminal management table of FIG. 14. The terminal management table of FIG. 14 stores, for each one of the terminal IDs assigned to the terminals 10, the terminal name to be used for communication with the terminal 10, the operation state of the terminal 10, the received date and time at which the management system 50 receives the login request information from the terminal 10, and the IP address of the terminal 10. For example, for the terminal 10aa having the terminal ID "01aa", the terminal management table of FIG. 14 indicates that the terminal name is "Japan Tokyo Office AA terminal", the operation state is on-line ("ON LINE") and is available for communication ("OK"), the received date and time is "13:40 PM, 11/10/2009", and the IP address of the terminal 10aa is "1.2.1.3".

The nonvolatile memory 5000 further includes a candidate list management database (DB) 5004, which stores a candidate list management table of FIG. 15. The candidate list management table of FIG. 15 stores, for each one of a plurality of request terminals 10A capable of requesting for videoconference communication, the terminal ID of the request terminal 10A, and one or more terminal IDs that are respectively assigned to candidate terminals 10 that are previously registered for the request terminal 10A. In this example, for the request terminal 10A, one or more terminals 10 of the transmission system 1 of FIG. 1 are previously registered as the candidate terminal 10. For example, the candidate list management table of FIG. 15 indicates that the request terminal 10aa having the terminal ID "01aa" is most likely to request for videoconference with respect to the terminal 10ab having the terminal ID "01ab", the terminal 10ba having the terminal ID "01ba", the terminal 10bb having the terminal ID "01bb", etc. The management system 50 manages the candidate list management table of FIG. 15, for example, according to a user instruction received from any one of the terminals 10. For example, in response to a user instruction received from the terminal 10aa, the management system 50 may add or delete the contents of the candidate list management table.

The nonvolatile memory 5000 further includes a session management database (DB) 5005, which stores a session management table of FIG. 16. The session management table of FIG. 16 stores information regarding each of the sessions that are carried out by at least two terminals 10 of the transmission system 1 for the purpose of selecting the relay terminal 30 that is most suitable for communication between at least two terminals 10. More specifically, for each session ID that uniquely identifies each session, the session management table of FIG. 16 stores a relay terminal ID of the relay terminal 30 to be used for transmitting or receiving contents data such as image data and voice data, a terminal ID of the request terminal 10A, a terminal ID of the counterpart terminal 10B, a delay time ms indicating a time period required for receiving contents data at the counterpart terminal 10B, the date and time information indicating the time at which the management system 50 receives delay information from the counterpart terminal 10B. For example, referring to the session management table of FIG. 16, for the session having the session ID "se1", the relay terminal 30a having the relay terminal ID "111a" is selected to relay contents data between the request terminal 10aa having the terminal ID "01aa" and the counterpart terminal 10db having the terminal ID "01db". Further, the management system 50 receives the delay information from the counterpart terminal 10db at 14:00 PM, 11/10/2009. Based on this date and time information, the delay time ms of 200 milliseconds (ms) is obtained. In case of having videoconference between only two terminals 10, the delay time may be determined based on the time when the management system 50 receives the delay information transmitted from the request terminal 10A rather than based on the time when the management system 50 receives the delay information transmitted from the counterpart terminal 10B. In case of having videoconference with more than two terminals 10, the delay information transmitted from the counterpart terminal 10B that receives the contents data is used to manage the date and time at which the delay information is received.

The nonvolatile memory 5000 further includes a priority management database (DB) 5006, which stores an address priority management table of FIG. 17. The address priority management table of FIG. 17 defines a number of address priority points to be assigned to an arbitrary set of terminal 10 and relay terminal 30 based on the degree of similarity between the IP address of the terminal 10 and the IP address of the relay terminal 30. Assuming that the IP address of the terminal 10 and the IP address of the relay terminal 30 are each expressed in the form of four digital numbers as described above referring to FIG. 1, as the degree of similarity between the terminal IP address and the relay terminal IP address increases, a larger number of address priority points is assigned. In FIG. 17, the "S" indicates that one digit of the IP address, which may be referred to as the dot address, is the same for both of the terminal 10 and the relay terminal 30. The "D" indicates that one digit of the IP address, or the dot address, is different between the terminal 10 and the relay terminal 30. More specifically, in this example, when the first to third digits or dot addresses are the same between the terminal 10 and the relay terminal 30, the address priority point is 5. When the first and second digits or dot addresses are the same between the terminal 10 and the relay terminal 30, the address priority point is 3. In such case, the fourth digit or dot address does not affect the address priority point. When the first digit or dot address is the same between the terminal 10 and the relay terminal 30, the address priority point is 1. In such case, the third and fourth digits or dot addresses do not affect the address priority point. When the first digit or dot address is different between the terminal 10 and the relay terminal 30, the address priority point is 0. In such case, the second to fourth digits or dot addresses do not affect the address priority point.

The priority management DB 5006 of the nonvolatile memory 5000 further includes a transmission speed priority management table of FIG. 18. The transmission speed priority management table of FIG. 18 stores a range of the maximum data transmission speeds in association with a transmission speed priority point. More specifically, the transmission speed priority management table of FIG. 18 indicates that the transmission speed priority point increases with the increase in value of the maximum data transmission speeds at the relay terminal 30. For example, referring to FIG. 18, when the maximum data transmission speed at the relay terminal 30 is equal to or greater than 1000 Mbps, the transmission speed priority point of 5 is assigned. For example, when the maximum data transmission speed at the relay terminal 30 is equal to or greater than 100 Mbps but less than 1000 Mbps, the transmission speed priority point of 3 is assigned. When the maximum data transmission speed at the relay terminal 30 is equal to or greater than 10 Mbps but less than 100 Mbps, the transmission speed priority point of 1 is assigned. When the maximum data transmission speed at the relay terminal 30 is less than 10 Mbps, the transmission speed priority point of 0 is assigned.

The nonvolatile memory 5000 further includes a quality management database (DB) 5007, which stores a quality management table of FIG. 19. The quality management table of FIG. 19 stores the delay time ms of image data in association with the quality of image data. More specifically, the quality management table of FIG. 19 indicates that the quality of image data to be processed by the relay terminal 30 is lowered, as the delay time of the image data at the request terminal 10A or the counterpart terminal 10B increases. For example, when the delay time ms is equal to or greater than 0 milliseconds (ms), but less than 100 ms, the image data quality is high. When the delay time ms is equal to or greater than 100 ms but less than 300 ms, the image data quality is medium. When the delay time ms is equal to or greater than 300 but less than 500 ms, the image data quality is low. When the delay time ms is equal to or greater than 500 ms, the management system 50 interrupts operation of transmitting data.

Next, a functional structure of the management system 50 is explained according to an example embodiment of the present invention. In this example, the operations or functions that are performed by the management system 50, which include the operations or functions performed by the units shown in FIG. 7, are performed in relation to one or more hardware devices of the management system 50 that are shown in FIG. 6.

The data transmit/receive 51, which may be implemented by the network I/F 209 (FIG. 6) according to an instruction received from the CPU 201, transmits or receives various data or information to or from another terminal, device, or system through the communication network 2.

Under control of the CPU 201 (FIG. 6), the terminal authenticator 52 obtains a terminal ID and a password from the login request information that is received from the data transmit/receive 51. Using the terminal ID and the password as a search key, the terminal authenticator 52 searches the terminal authentication management DB 5002 to determine whether the obtained set of terminal ID and password is registered. Based on the search result, the terminal authenticator 52 determines whether the user at the terminal 10 or the terminal 10 is allowed for access.

The state manager 53, which operates according to an instruction received from the CPU 201 (FIG. 6), manages the operation state of the request terminal 10A that sends the login request information using the terminal management DB 5003 (FIG. 14). More specifically, the state manager 503 stores the terminal ID of the request terminal 10A, the operation state of the request terminal 10A, the date and time at which the management system 50 receives the login request information from the request terminal 10A, and the IP address of the request terminal 10A. When the power of the terminal 10 is switched from the ON state to the OFF state according to a user instruction received through the power switch 109, the state manager 53 receives the state information of the terminal 10 indicating that the terminal 10 is turned off, from the terminal 10. Based on the state information of the terminal 10, the state manager 53 changes the state information of the terminal 10 that is stored in the terminal management DB 5003 from the on-line state to the off-line state.

The terminal extractor 54, which operates according to an instruction received from the CPU 201 (FIG. 6), searches the candidate list management DB 5004 (FIG. 15) using the terminal ID of the request terminal 10A as a key to obtain a list of terminal IDs each being assigned to a plurality of candidate terminals 10. Additionally, the terminal extractor 54 searches the candidate list management DB 5004 (FIG. 15) using the terminal ID of the request terminal 10A as a key to obtain a terminal ID of another request terminal 10A that registers the request terminal 10A as a candidate terminal for another request terminal 10A.

The terminal state obtainer 55, which operates under control of the CPU 201 (FIG. 6), searches the terminal management DB 5003 (FIG. 14) using the terminal ID of each candidate terminal 10 that is extracted by the terminal extractor 54 as a key to obtain the state information of each candidate terminal 10. Accordingly, the terminal state obtainer 55 obtains the operation state of each of the candidate terminal 10 that is previously determined for the request terminal 10A that sends the login request information. Further, the terminal state obtainer 55 searches the terminal management DB 5003 using the terminal ID extracted by the terminal extractor 54 as a key to obtain the state information of the request terminal 10A that sends the login request information.

Figure 10:
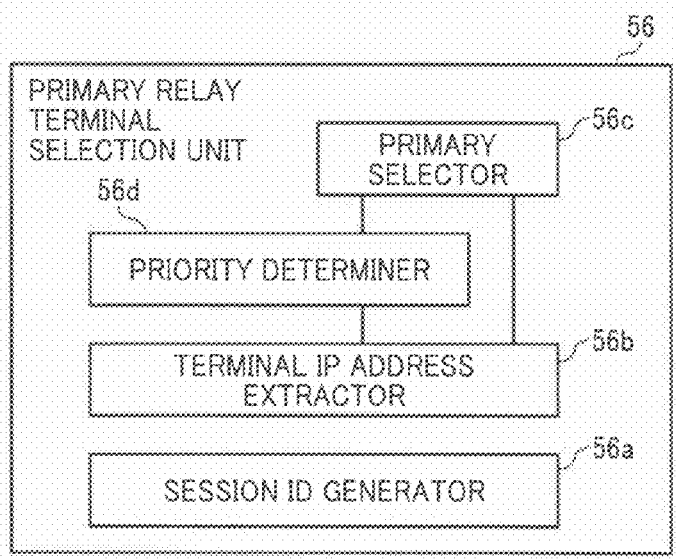
FIG. 10 is a schematic block diagram illustrating a primary relay terminal selection unit of the transmission management system of FIG. 7.

The primary relay terminal selection unit 56, which operates according to an instruction received from the CPU 201 (FIG. 6), limits a number of relay terminals 30 each of which is a candidate relay terminal 30 that may be used for relaying contents data between at least two terminals 10. Based on the result obtained by the primary relay terminal selection unit 56, the secondary relay terminal selection unit 17 of the terminal 10 selects one terminal 30 that is most suitable for communication between at least two terminals 10. As illustrated in FIG. 10, the primary relay terminal selection unit 56 includes a session ID generator 56a, a terminal IP address extractor 56b, a primary selector 56c, and a priority determiner 56d.

The session ID generator 56a of the primary relay terminal selection unit 56 generates a session ID for identifying a session that is used for selecting the relay terminal 30. The terminal IP address extractor 56b extracts the terminal ID of the request terminal 10A and the terminal ID of the counterpart terminal 10B respectively from the session request information received from the request terminal 10A, and searches the terminal management DB 5003 (FIG. 14) to obtain the IP address of the request terminal 10A and the IP address of the counterpart terminal 10B. The primary selector 56c selects one or more relay terminals 30 having the online state from the relay terminal management DB 5001 (FIG. 12) to obtain the relay terminal ID of the selected relay terminal 30. In this example, it is assumed that more than two relay terminals 30 are selected as having the on-line state.

Further, the primary selector 56c obtains the IP address of each of the selected relay terminals 30. Once the IP address of the relay terminal 30 is obtained for each relay terminal 30, the primary selector 56c compares the IP address of the relay terminal 30 with at least one of the IP address of the request terminal 10A and the IP address of the counterpart terminal 10B that are respectively obtained by the terminal IP address extractor 56b to analyze the degree of similarity between the IP address of the terminal 10 and the IP address of the relay terminal 30. More specifically, the primary selector 56c compares between the IP address of the terminal 10 and the IP address of the relay terminal 30, digit by digit, or dot address by dot address, to determine the degree of similarity. Using the address priority management table of FIG. 17, the primary selector 56c obtains the address priority point for each one of the relay terminals 30. Assuming that the primary selector 56c compares the IP address of the terminal 10 with the IP address of the relay terminal 30, respectively for the request terminal 10A and the counterpart terminal 10B, the primary selector 56c obtains two address priority points for each one of the relay terminals 30. In such case, the primary selector 56c selects the highest one of the address priority points as the address priority point for the relay terminal 30.

Additionally, for each of the selected relay terminals 30 having the on-line state, the primary selector 56c obtains the maximum data transmission speed of the relay terminal 30 from the relay terminal management table of FIG. 12. Using the transmission speed priority management table of FIG. 18, the primary selector 56c obtains the transmission speed priority point that corresponds to the maximum data transmission speed of the selected relay terminal 30, for each of the selected relay terminals 30.

For each of the relay terminals 30, the primary selector 56c obtains a total priority point by adding the address priority point and the transmission speed priority point together. In this example, the primary selector 56c selects two relay terminals 30 including the relay terminal 30 having the highest total priority point and the relay terminal 30 having the second highest total priority point.

In this example, a number of relay terminals 30 that is finally selected by the primary selector 56c is not limited to two such that more than two relay terminals 30 may be finally selected for further processing as long as a number of relay terminals 30 is sufficiently reduced.

The priority determiner 56d refers to the priority management DB 5006 (FIG. 17) to determine the address priority point for each one of the relay terminals 30 that is selected by the primary selector 56c. The priority determiner 56d obtains the maximum data transmission speed of the relay terminal 30 from the relay terminal management DB 5001 (FIG. 12), and refers to the priority management DB 5006 (FIG. 18) to obtain the transmission speed priority point of the relay terminal 30 that is selected by the primary selector 56c.

Referring back to FIG. 7, the session manager 57, which operates according to an instruction received from the CPU 201, stores the session ID generated by the session ID generator 56a, the terminal ID of the request terminal 10A, and the terminal ID of the counterpart terminal 10B, in a corresponding manner, in the session management DB 5005 (FIG. 16) of the nonvolatile memory 5000. The session manager 57 further stores the relay terminal ID of the relay terminal 30 that is finally selected by the secondary selector 17c of the terminal 10 for each session ID, in the session management DB 5005 (FIG. 16).

The quality determiner 58, which operates according to an instruction received from the CPU 201 (FIG. 6), searches the quality management DB 5007 (FIG. 19) using the delay time ms obtained for the selected relay terminal 30 to obtain the image data quality that is desirable for communication using the relay terminal 30.

The memory control 59, which operates according to an instruction received from the CPU 201 (FIG. 6) in relation with the HDD 205 (FIG. 6), stores various data in the nonvolatile memory 5000 or read out various data from the nonvolatile memory 5000.

The delay time manager 60 searches the terminal management DB 5003 (FIG. 14) using the IP address of the counterpart terminal 10B to obtain the terminal ID of the counterpart terminal 10B. The delay time manager 60 further manages the session management table of FIG. 16 stored in the session management DB 5005 so as to keep updated the value stored in the "delay time" field for the obtained terminal ID of the counterpart terminal 10B.

<Operation of Transmission System>

Figure 20:
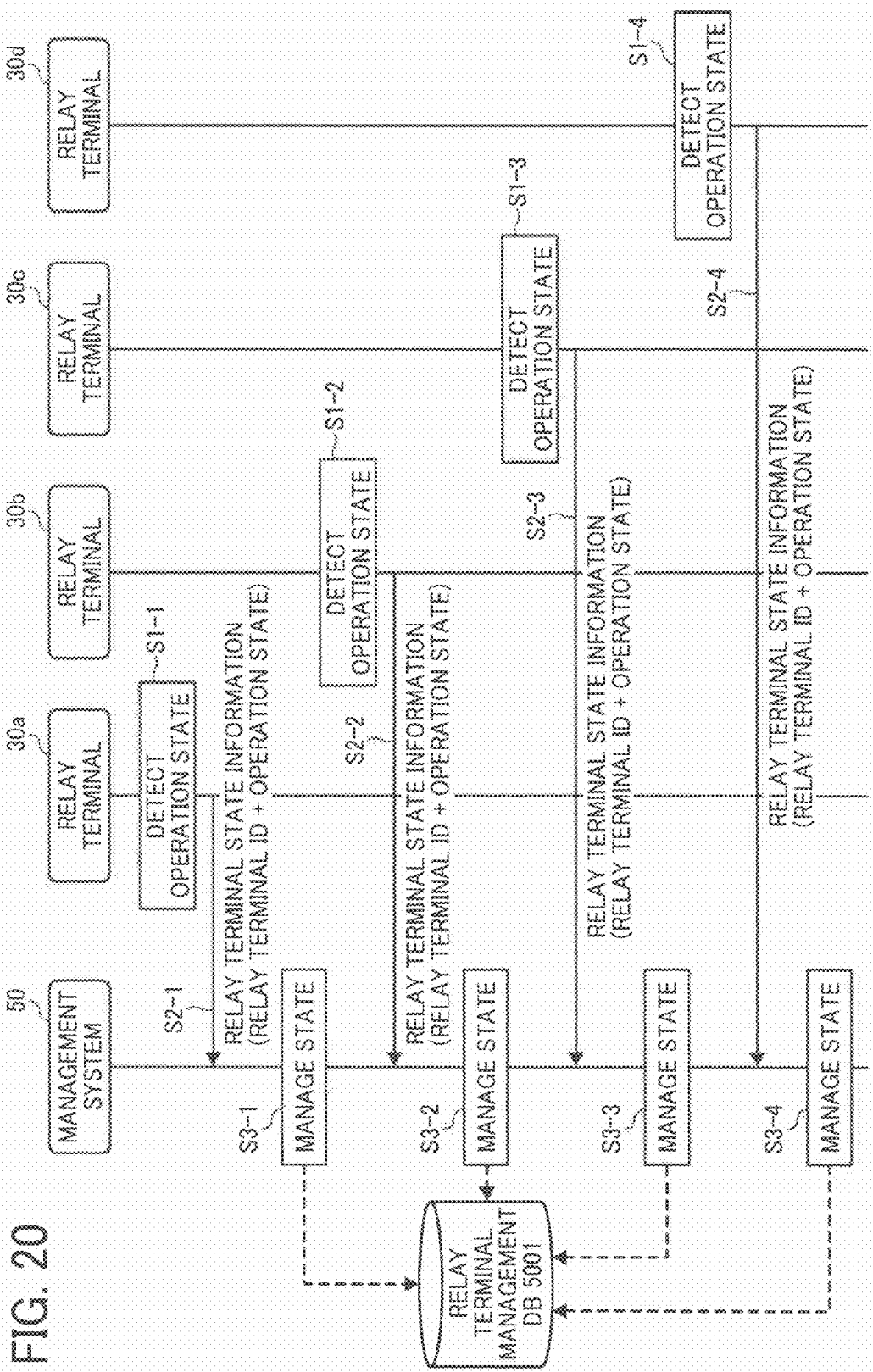
FIG. 20 is a data sequence diagram illustrating operation of managing state information indicating an operation state of the relay terminal of the transmission system of FIG. 1, according to an example embodiment of the present invention.
Figure 22:
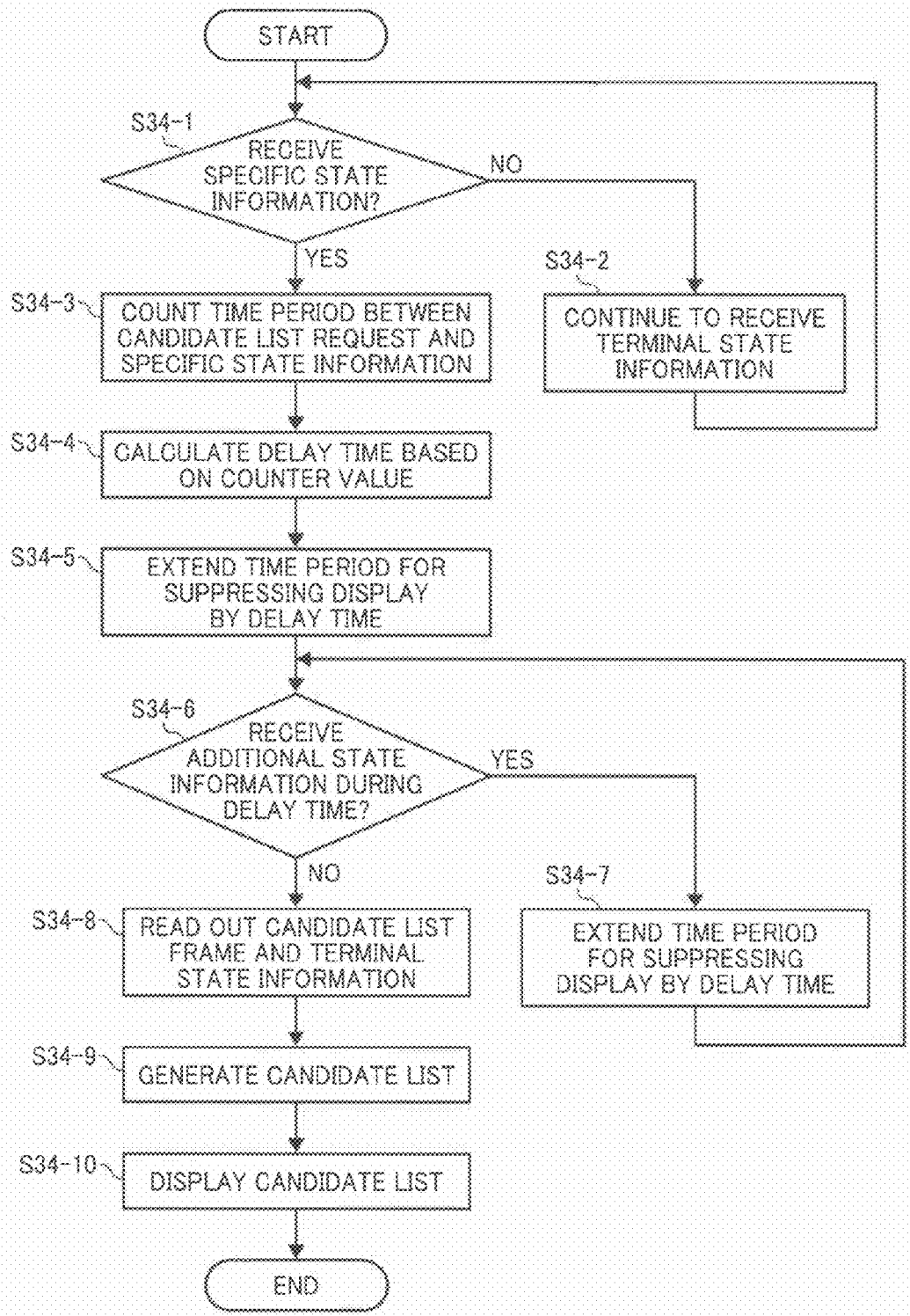
FIG. 22 is a flow chart illustrating operation of displaying a candidate list, performed by the transmission terminal of FIG. 1.
Figure 27:
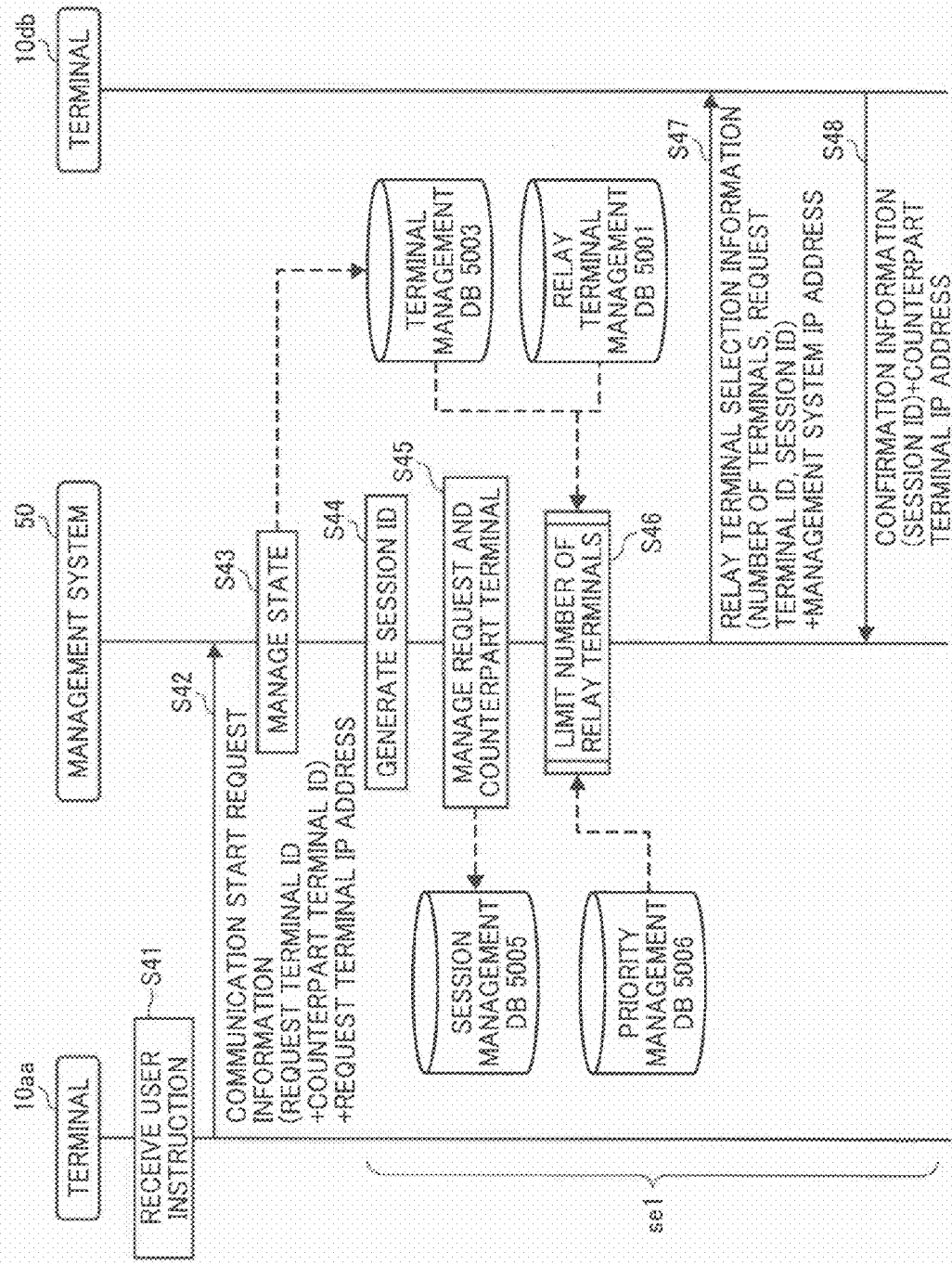
FIG. 27 is a data sequence diagram illustrating operation of limiting a number of candidate relay terminals, performed by the transmission system of FIG. 1.
Figure 28:
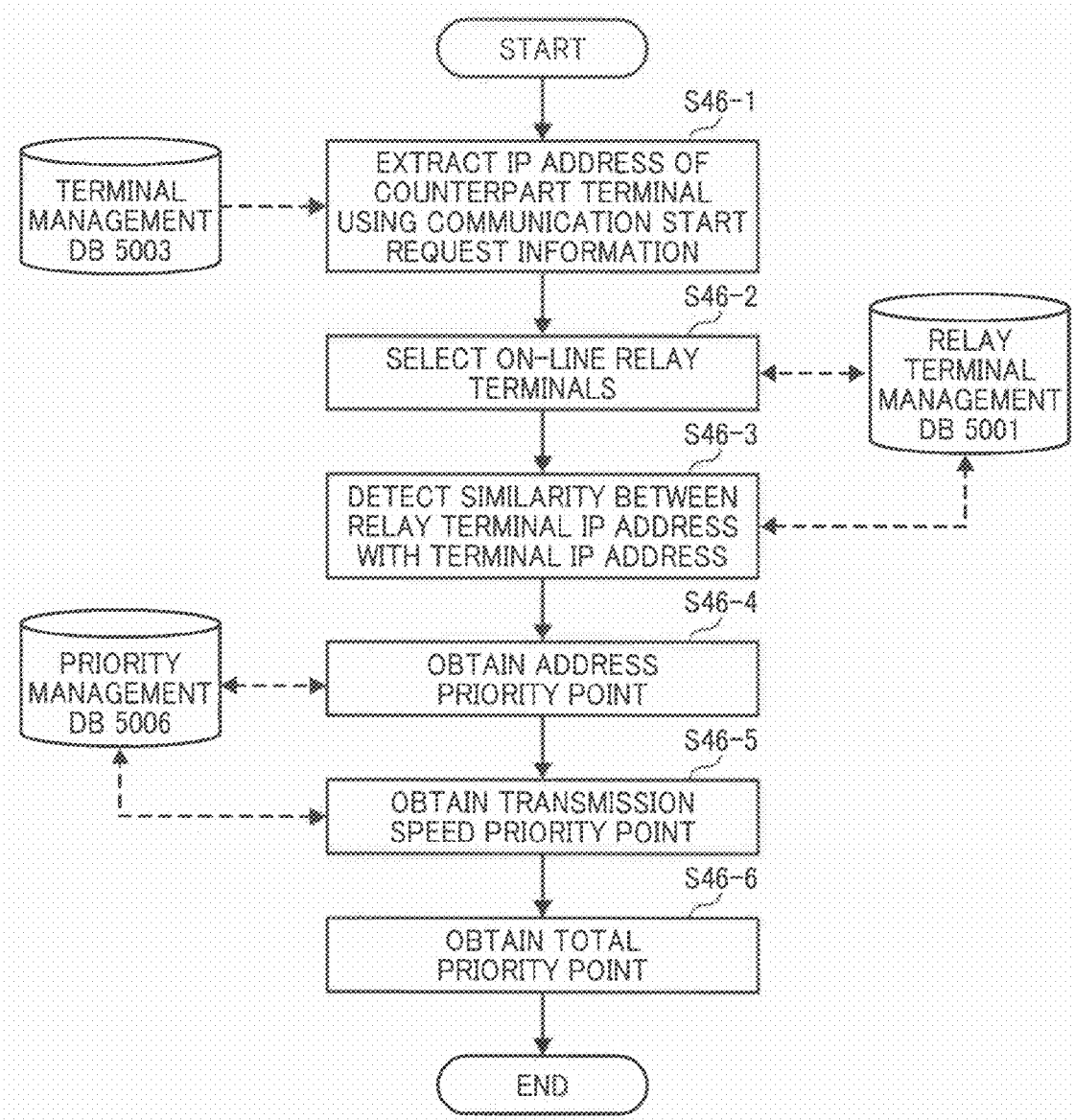
FIG. 28 is a flowchart illustrating operation of limiting a number of candidate relay terminals, performed by the transmission management system of FIG. 1.
Figure 30B:
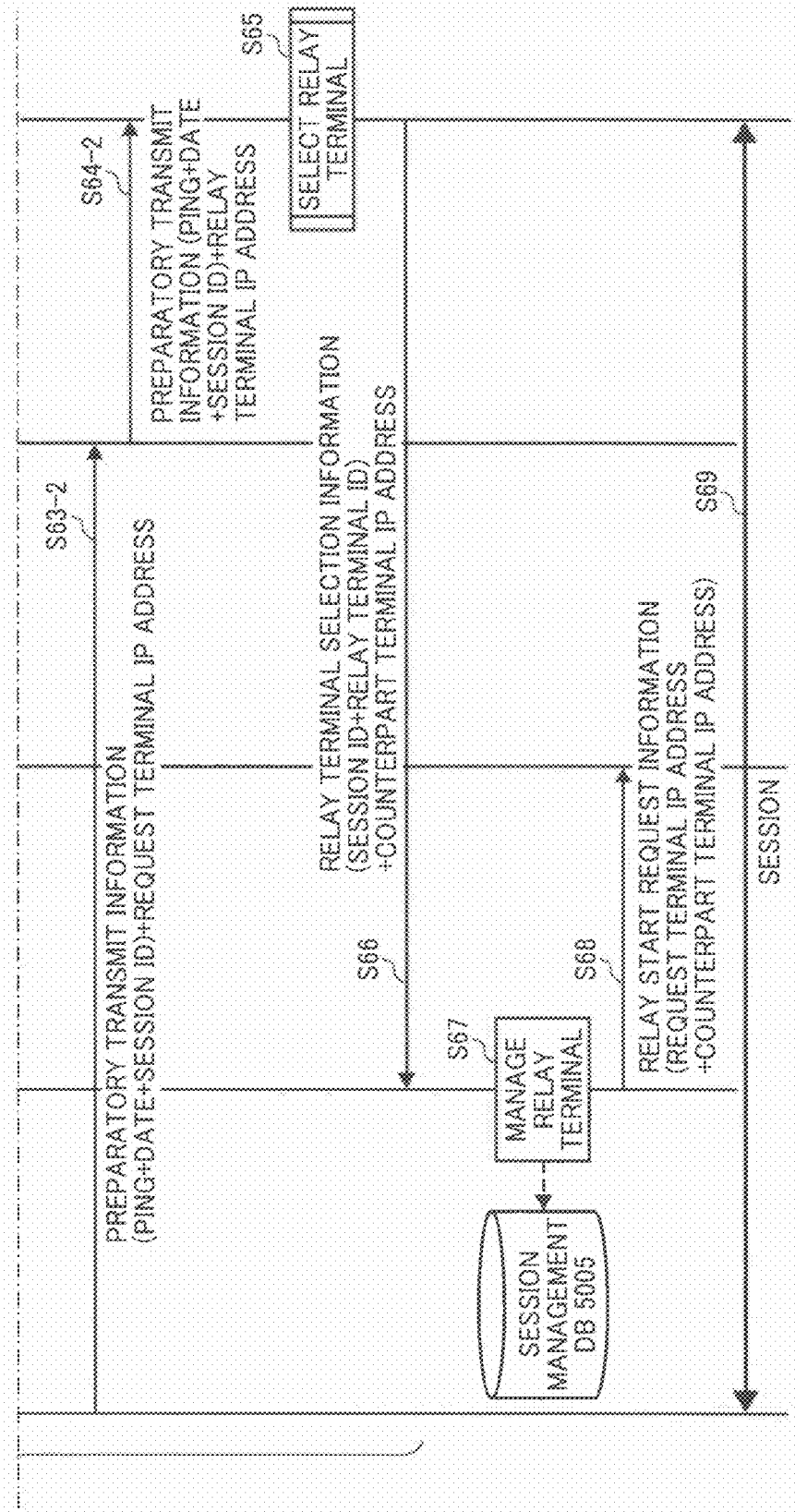
Figure 32:
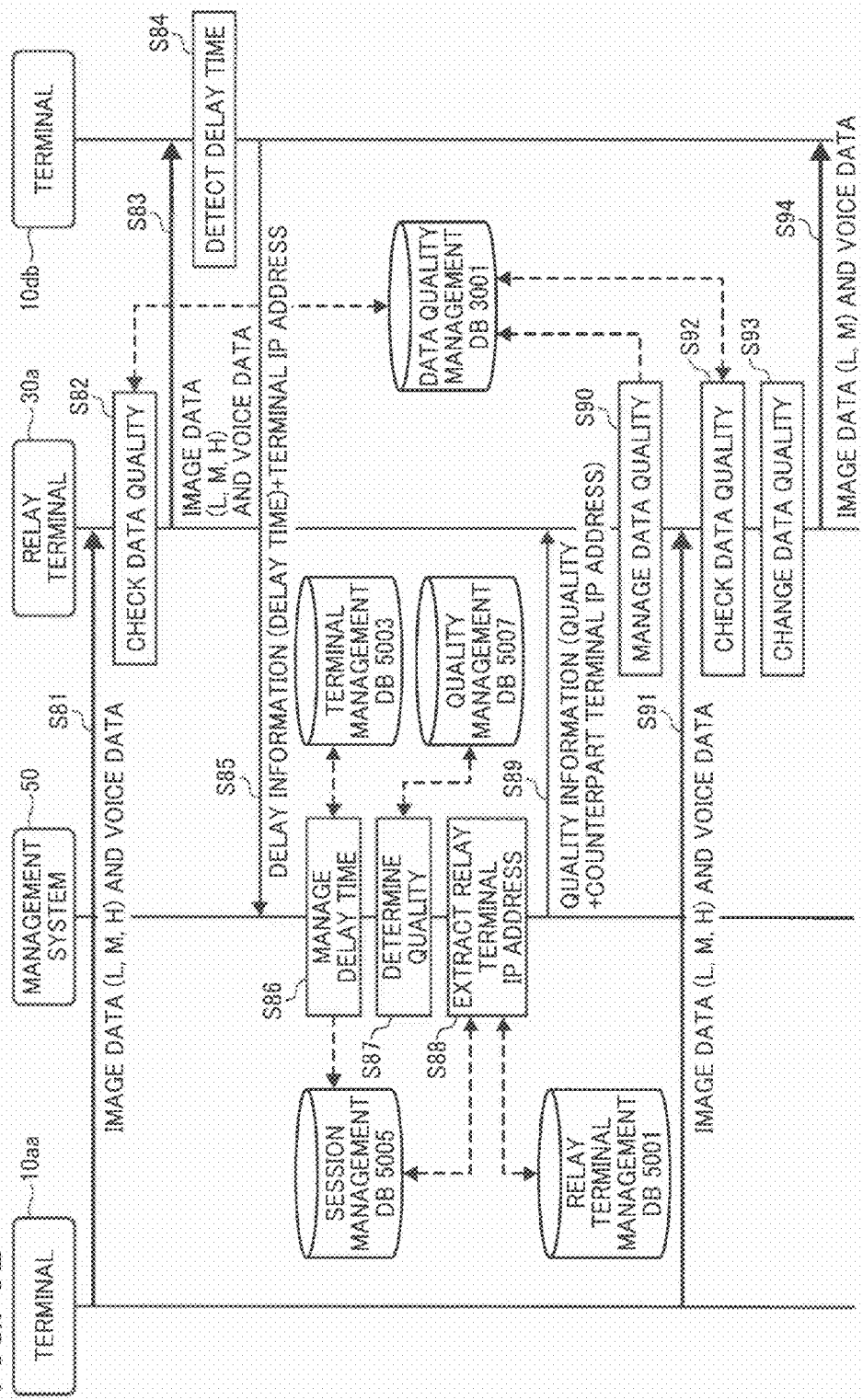
FIG. 32 is a data sequence diagram illustrating operation of transmitting or receiving data such as image data and voice data, performed by two or more transmission terminals of the transmission system of FIG. 1.

Referring now to FIGS. 20 to 32, operation performed by the transmission system 1 is explained according to an example embodiment of the present invention. FIG. 20 is a data sequence diagram illustrating operation of managing state information indicating the operation state of the relay terminal 30, which is sent from the relay terminal 30 to the management system 50, according to an example embodiment of the present invention. FIGS. 21A and 21B are a data sequence diagram illustrating operation of preparing for communication to be established between or among two or more of terminals 10. FIG. 22 is a flowchart illustrating operation of displaying a candidate list. FIGS. 23A, 23B, 23C, 23D, 24, 25A, 25B, 25C, and 25D each illustrate a timing chart for explaining a time period for suppressing display of the candidate list. FIG. 26 is an illustration for explaining the candidate list being displayed. FIG. 27 is a data sequence diagram illustrating operation of selecting the relay terminal 30. FIG. 28 is a flowchart illustrating operation of selecting the relay terminal 30. FIG. 29 is a table for explaining operation of calculating a total priority point to be used for operation of selecting the relay terminal 30. FIGS. 30A and 30B are a data sequence diagram illustrating operation of selecting the relay terminal 30. FIG. 31 is a flowchart illustrating operation of selecting the relay terminal 30, performed by the terminal 10. FIG. 32 is a data sequence diagram illustrating operation of transmitting or receiving contents data such as image data and/or voice data to or from one terminal to another terminal.

Referring now to FIG. 20, operation of managing state information of the terminal 30, which is sent from each terminal 30 to the management system 50, performed by the transmission system 1 is explained according to an example embodiment of the present invention. In this example, it is assumed that the relay terminals 30a, 30b, 30c, and 30d, which may be each or collectively referred to as the relay terminal 30, exit in the transmission system 1.

At S1-1, S1-2, S1-3, and S1-4, the relay terminals 30a, 30b, 30c, and 30d each periodically monitors the operation state of the relay terminal 30. This monitoring is performed by the state detector 32 (FIG. 7) of the relay terminal 30.

At S2-1, S2-2, S2-3, and S2-4, the data transmit/receive 31 of the relay terminal 30 periodically transmits state information of the relay terminal 30 to the management system 50 through the communication network 2. With the state information of the relay terminal 30 that is periodically received, the management system 50 is able to manage the operation state of the relay terminal 30 in realtime. The state information of the relay terminal 30 includes an operation state of the relay terminal 30 that is detected by the state detector 32 of the relay terminal 30, which is sent together with a relay terminal ID that uniquely identifies each relay terminal 30. For the descriptive purposes, in this example, it is assumed that the relay terminals 30a, 30b, and 30d each have the on-line state, and the relay terminal 30c has the off-line state due to the failure in relay control program of the relay terminal 30c.

At S3-1, S3-2, S3-3, and S3-4, the management system 50 receives the state information from the relay terminal 30 at the data transmit/receive 51, and stores the received state information of the relay terminal 30 in the nonvolatile memory 5000 through the memory control 59. More specifically, the memory control 59 stores the state information of each relay terminal 30 in association with the relay terminal ID of the corresponding relay terminal 30 in the relay terminal management DB 5001 (FIG. 12).

For example, referring to FIG. 12, the management system 50 stores the state information of the relay terminal 30 indicating whether the relay terminal 30 is on-line, off-line, or in trouble, etc., in association with the relay terminal ID of the relay terminal 30. Additionally, the management system 50 stores the date and time information indicating the time when the management system 50 receives the state information of the relay terminal 30 in association with the relay terminal ID of the relay terminal 30. When the management system 50 does not receive any state information from the relay terminal 30, the relay terminal management table of FIG. 12 has an empty value for the "operation state" field and the "date and time" field for the subjected relay terminal 30. Alternatively, the value of the "operation state" field and the value of the "date and time" field may reflect the state information that is previously sent by the subjected relay terminal 30 to the management system 50 it the relay terminal management table of FIG. 12 retains such value.

Referring to FIGS. 21A and 21B, operation of transmitting and receiving various management data before starting videoconference between the request terminal 10aa and the counterpart terminal 10db is explained, according to an example embodiment of the present invention. More specifically, the operation of FIGS. 21A and 21B is performed during a management data session sei in which various management data is exchanged.

At S21, the user at the request terminal 10aa turns on the power of the request terminal 10aa through the power switch 109 (FIG. 5). The operation input 12 of the request terminal 10aa (FIG. 7) turns on the power of the request terminal 10aa.

At S22, as the power of the request terminal 10aa is turned on, the login request 13 of the request terminal 10aa automatically causes the data transmit/receive 11 to send the login request information that requests the login process to the management system 50 through the communication network 2. The login request information includes a terminal ID that identifies the request terminal 10aa, and a password assigned to the request terminal 10aa. The terminal ID and the password may be obtained by the memory control 19 from the nonvolatile memory 1001, and sent to the data transmit/receive 11. At the time of sending the login request information from the request terminal 10aa to the management system 50, the request terminal 10aa sends an IP address of the request terminal 10aa such that the management system 50 knows the IP address of the request terminal 10aa.

At S23, the terminal authenticator 52 of the management system 50 searches the terminal authentication management DB 5002 (FIG. 13) stored in the nonvolatile memory 5000 using the terminal ID and the password of the login request information received through the data transmit/receive 51. When it is determined that the terminal ID and the password of the login request information is stored in the terminal authentication management DB 5002, the terminal authenticator 52 determines that the terminal 10aa is authenticated.

At S24, when the terminal authenticator 52 authenticates that the login request information is received from the authenticated terminal 10, the state manager 53 of the management system 50 stores the operation state, the date and time at which the login request information is received, and the IP address of the terminal 10aa, with respect to the terminal ID and the terminal name of the terminal 10aa in the terminal management DB 5003 (FIG. 14) to create a record of the terminal 10aa. Using the terminal management table of FIG. 14, which stores the operations state of online, the date and time of "13:40, 11/10/2009", and the terminal IP address of "1.2.1.3" in association with the terminal ID "01aa", various information regarding the terminal 10aa can be managed.

At S25, the data transmit/receive 41 of the management system 50 sends the authentication result obtained by the terminal authenticator 52 to the request terminal 10aa that has sent the login request information through the communication network 2. As described above, in this example, it is assumed that the terminal authenticator 52 determines that the terminal 10aa is an authenticated terminal.

When the request terminal 10aa receives the authentication result indicating that the terminal 10aa is authenticated, at S26, the data transmit/receive 11 sends the candidate list request information that requests for a candidate list to the management system 50 through the communication network 2. The data transmit/receive 51 of the management system 50 receives the candidate list request information.

At S27, the terminal extractor 54 of the management system 50 searches the candidate list management DB 5004 (FIG. 15) using the terminal ID "01aa" of the request terminal 10aa that has sent the login request information and the candidate list request information to extract a terminal ID and a terminal name for each of candidate terminals 10 that are previously registered for the request terminal 10aa. More specifically, referring to FIGS. 14 and 15, the terminal extractor 54 extracts terminal IDs including "01ab", "01ba", "01db", etc. of terminals 10*ab*, 10*ba*, 10*db*, etc., and terminal names including "Japan Tokyo Office AB Terminal", "Japan Osaka Office BA Terminal", "U.S. Washington, D.C. Office, DB Terminal", etc. to obtain information regarding candidate terminals for the request terminal 10*aa*.

At S28, the data transmit/receive 51 of the management system 50 reads out the candidate list frame data such as the candidate list frame 11-1 of FIG. 26 from the nonvolatile memory 5000.

At S29, the data transmit/receive 51 of the management system 50 sends the candidate list information including the candidate list frame data obtained at S28, and the terminal ID and the terminal name of the candidate terminal obtained at S27, to the request terminal 10*aa*.

At S30, the request terminal 10*aa* receives the candidate list information at the data transmit/receive 11, and stores the candidate list information in the nonvolatile memory 1001 through the memory control 19.

As described above, in this example, in alternative to managing the candidate list information by each terminal 10, the management system 50 centrally manages the candidate list information for all terminals 10. As the candidate list information is centrally managed at the management system 50, any change in the transmission system 1 can be easily reflected in a timely manner without requiring the user at the terminal 10 to change any settings. For example, the management system 50 is able to update the candidate list information to reflect when a new terminal 10 is added to the transmission system 1, when a new type of terminal 10 is introduced to the transmission system 1, or when the design for the candidate list frame is changed.

At S31, the terminal state obtainer 55 of the management system 50 searches the terminal management DB 5003 (FIG. 14) using the terminal ID ("01ab", "01ba", and "01db", etc.) of the candidate terminal extracted by the terminal extractor 54 as a key to obtain the operation state for each one of the candidate terminals 10*ab*, 10*ba*, 10*db*, etc.

At S32, the data transmit/receive 51 of the management system 50 sends the state information for each one of the candidate terminals 10*ab*, 10*ba*, 10*db*, etc. to the request terminal 10*aa* through the communication network 2. More specifically, the data transmit/receive 51 of the management system 50 sends the state information of the candidate terminal 10*ab*, together with the terminal ID "01ab" of the candidate terminal 10*ab*, as the terminal state information. In this example, the terminal ID "01ab" of the candidate terminal 10*ab* has been extracted by the terminal extractor 54. Using the terminal ID "01ab" as a search key, the operation state of the candidate terminal 10*ab*, which is the on-line state and available for communication, is obtained. Similarly, the data transmit/receive 51 of the management system 50 sends the terminal state information of the candidate terminal 10*ba*, which includes the terminal ID "01ba" used as a search key at S27, and the operation state of the candidate terminal 10*ba* indicating the on-line state but not available for communication. This process of sending the terminal state information is repeated until the terminal state information is sent for all of the candidate terminals 10.

Further, at S32, the management system 50 sends the terminal state information for the request terminal 10*aa*, which includes the terminal ID "01aa" of the request terminal 10*aa* and the operation state of the request terminal 10*aa*. In this example, the request terminal 10*aa* receives the state information indicating the operation state of the request terminal 10*aa* from the management system 50 as the specific state information i. After the specific state information i is received at the terminal 10, the operation proceeds to S34. More specifically, in this example, the management system 50 does not send the state information of the candidate terminal 10 to the request terminal 10*aa* unless the operation state of the candidate terminal 10 is obtained. However, the management system 50 is programmed to send the state information of the request terminal 10*aa* even when the management system 50 does not receive the operation state of the request terminal 10*aa*. In alternative to sending the state information of the request terminal 10*aa* as the specific state information i, the management system 50 may send the state information of a dummy terminal 10 indicating the operation state of the dummy terminal 10 that is previously determined.

At S33, the memory control 19 of the request terminal 10*aa* stores the terminal state information that is received from the management system 50 in the nonvolatile memory 1002. As described above, with the terminal state information of each candidate terminal, the request terminal 10*aa* is able to know the current operation state of the candidate terminal 10 that is previously registered for the request terminal 10*aa*.

Further, the terminal state obtainer 55 of the management system 50 receives the operation state of the request terminal 10*aa* at S31, and the data transmit/receive 51 of the management system 50 sends the terminal state information of the request terminal 10*aa* that includes the terminal ID "01aa" and the operation state of the request terminal 10*aa* to the request terminal 10*aa* at S32.

At S34, the candidate list generator 20 of the request terminal 10*aa* generates a candidate list that reflects the operation state of the candidate terminal 10, based on the candidate list information including the operation state of the candidate terminal 10 that is stored in the nonvolatile memory 1002. Further, the display control 16 of the request terminal 10*aa* controls the time for displaying the candidate list on the display 120 (FIG. 5).

Referring now to FIGS. 22, and 23A to 23D, operation of generating and displaying a candidate list, performed at S34 of FIG. 21B, is explained according to an example embodiment of the present invention. In this example, even when the data transmit/receive 11 of the request terminal 10*aa* receives the candidate list information at S29 for at least one of the candidate terminals 10, the display suppressor 16*c* of the display control 16 causes the display processor 16*a* to suppress the display of the candidate list that reflects the operation state of the candidate terminal 10. It is to be noted that the examples illustrated in FIGS. 23A to 23D are given for the descriptive purposes such that the examples of the present invention are not limited to the following examples.

Figure 23A:
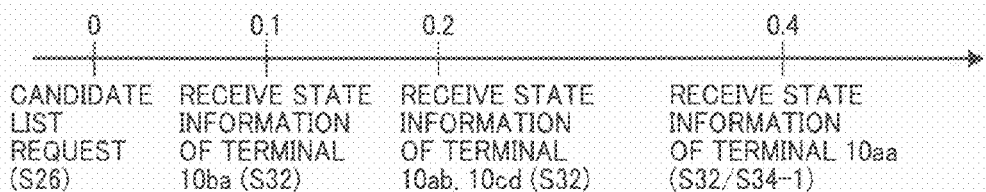
FIG. 23A is a timing chart illustrating time for suppressing display of the candidate list, performed by the transmission terminal of FIG. 1, according to an example embodiment of the present invention.

Referring to FIG. 23A, the request terminal 10*aa* starts counting a time period at the time when the request terminal 10*aa* sends the candidate list request information to the management system 50 at S26 (FIG. 21A) to obtain a counter value. When the counter value reaches 0.1 seconds, the request terminal 10*aa* receives the terminal state information of the candidate terminal 10*ba* at S32 (FIG. 21B). When the counter value reaches 0.2 seconds, the request terminal 10*aa* receives the terminal state information of the candidate terminal 10*ab* and the terminal state information of the candidate terminal 10*cb* at S32 (FIG. 21B). When the counter value reaches 0.4 seconds, the request terminal 10*aa* receives the terminal state information of the request terminal 10*aa* including the state information of the request terminal 10*aa*, which functions as the specific state information i, at S32 (FIG. 21B).

At S34-1 of FIG. 22, the determiner 16*b* of the terminal 10*aa* determines whether the specific state information i is received by the data transmit/receive 11, for example, by determining whether the terminal state information that is received by the data transmit/receive 11 includes the specific state information i. When it is determined that the specific state information i is not received ("NO" at S34-1), the operation proceeds to S34-2 to cause the data transmit/receive 11 to continue receiving the terminal state information of the candidate terminal 10 while keeping counting the counter value, and repeats S34-1.

When it is determined that the specific state information i is received ("YES" at S34-1), the operation proceeds to S34-3. At S34-3, the delay time determiner 16d of the display control 16 counts a time period between the time when the data transmit/receive 11 sends the candidate list request information to the management system 50 and the time when the specific state information i is received at the data transmit/receive 11. More specifically, as described above referring to FIG. 23A, the request terminal 10aa counts a time period between the time when counting is started and the time when the specific state information i is received to obtain a counter value of 0.4 seconds. In alternative to starting counting a counter value at the time when the candidate list request information is sent, the counting may be started at the time when the power of request terminal 10aa is turned on.

At S34-4 of FIG. 22, the delay time determiner 16d counts a number of items of the terminal state information that has been received between the time when the request terminal 10aa sends the candidate list request information at S26 and the time when the data transmit/receive 11 receives the specific state information i. Based on the obtained number of information items, the delay time determiner 16d calculates a delay time t, which is a value for extending the time for suppressing the display of the candidate list using the display suppressor 16c. More specifically, the delay time t is determined based on S34-3 and S34-4. For example, as described above referring to FIG. 23A, the request terminal 10aa receives four items of terminal state information for the candidate terminals 10ba, 10ab, and 10cb and the request terminal 10aa during a time period until the specific state information i is received. Accordingly, the delay time t is 0.1 seconds, which is obtained by 0.4 seconds/4.

Figure 23B:
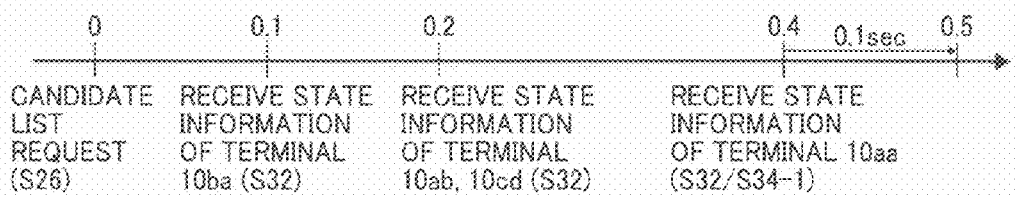
FIG. 23B is a timing chart illustrating time for suppressing display of the candidate list, performed by the transmission terminal of FIG. 1, according to an example embodiment of the present invention.

At S34-5, the display suppressor 16c extends a time period for suppressing the display of the candidate list such as the icon 11-3 by the delay time t that is determined by the delay time determiner 16d. In this example, the display suppressor 16c extends the time period for suppressing the display of the candidate list by 0.1 seconds, as illustrated in FIG. 23B.

At S34-6, the determiner 16b determines whether the data transmit/receive 11 receives additional state information of the terminal 10 during the delay time t. When it is determined that the determiner 16b determines that the additional state information is received ("YES" at S34-6), the operation proceeds to S34-7. At S34-7, the display suppressor 16c extends the time period for suppressing the display of the candidate list by another delay time t from the time when the additional state information is received. Accordingly, the request terminal 10aa has more time to receive the terminal request information before the candidate list is displayed. After S34-7, the operation returns to S34-6.

Figure 23C:
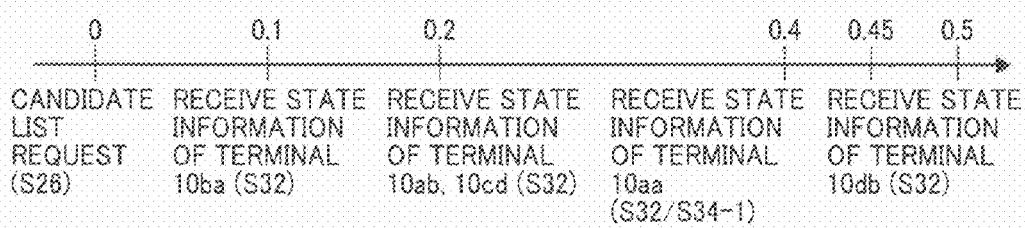
FIG. 23C is a timing chart illustrating time for suppressing display of the candidate list, performed by the transmission terminal of FIG. 1, according to an example embodiment of the present invention.
Figure 23D:
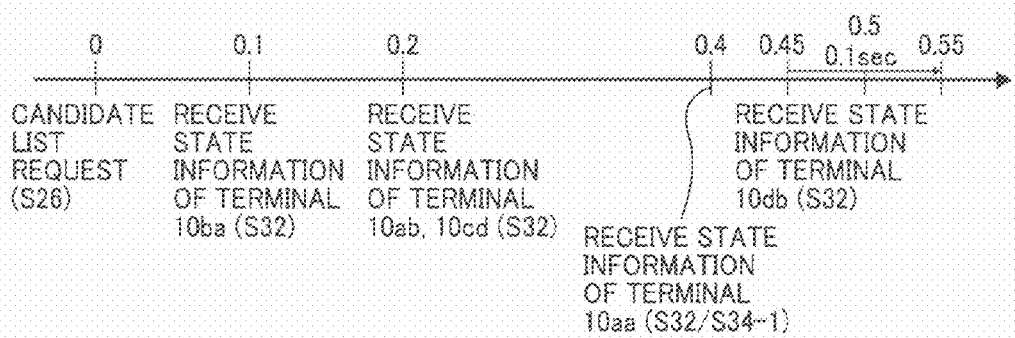
FIG. 23D is a timing chart illustrating time for suppressing display of the candidate list, performed by the transmission terminal of FIG. 1, according to an example embodiment of the present invention.

More specifically, referring to FIG. 23C, when the request terminal 10aa receives the additional state information, which is the terminal state information of the candidate terminal 10db, at S32 during the delay time t or when the counter value reaches 0.45 seconds, the request terminal 10aa extends the time period for suppressing the display of the candidate list by the delay time t of 0.1 seconds from the time when the additional state information of the candidate terminal 10db is received as illustrated in FIG. 23D.

Referring back to FIG. 22, when the determiner 16b determines that the additional state information of the candidate terminal 10 is not received ("NO" at S34-6), the operation proceeds to S34-8. At S34-8, the memory control 19 reads out the candidate list frame as well as the terminal state information that has been received, from the nonvolatile memory 1001.

At S34-9, the candidate list generator 20 generates a candidate list, such as the candidate list of FIG. 26, based on the candidate list frame and the terminal state information that are read out at S34-8. For the candidate terminal 10 having no state information stored in the nonvolatile memory 1001, the candidate list generator 20 assigns the icon 11-3b indicating the offline state.

At S34-10, the display processor 16a causes the display 120 to display the candidate list generated at S34-9, and the operation ends.

Figure 24:
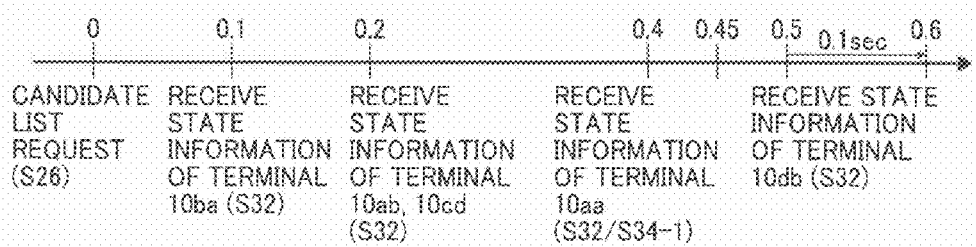
FIG. 24 is a timing chart illustrating time for suppressing display of the candidate list, performed by the transmission terminal of FIG. 1, according to an example embodiment of the present invention.

The operation of FIG. 22 may be performed in various other ways. For example, as illustrated in FIG. 24, in case of receiving the additional state information of the terminal 10db at S32 when the counter value reaches 0.45 seconds, the request terminal 10aa may extend the time period for suppressing the display of candidate list from the time when the delay time t ends, which has the counter value of 0.5 seconds, in alternative to extending the time period from the time when the additional information is received.

Figure 25A:
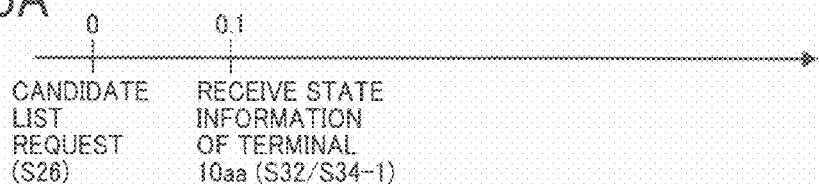
FIG. 25A is a timing chart illustrating time for suppressing display of the candidate list, performed by the transmission terminal of FIG. 1, according to an example embodiment of the present invention.
Figure 25B:
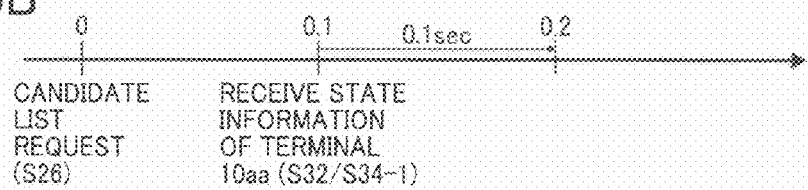
FIG. 25B is a timing chart illustrating time for suppressing display of the candidate list, performed by the transmission terminal of FIG. 1, according to an example embodiment of the present invention.
Figure 25C:
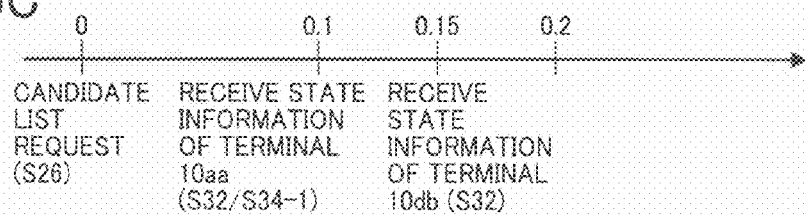
FIG. 25C is a timing chart illustrating time for suppressing display of the candidate list, performed by the transmission terminal of FIG. 1, according to an example embodiment of the present invention.
Figure 25D:
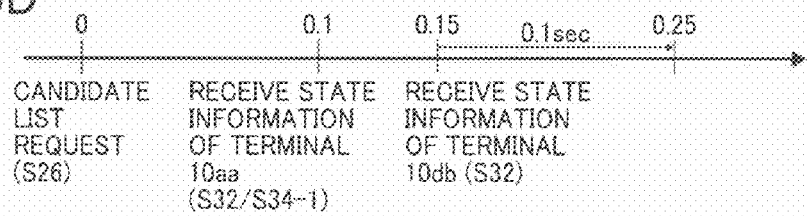
FIG. 25D is a timing chart illustrating time for suppressing display of the candidate list, performed by the transmission terminal of FIG. 1, according to an example embodiment of the present invention.

FIGS. 25A to 25D illustrate another example, which is different from the example described above referring to FIGS. 23A to 23D. Referring to FIG. 25A, the request terminal 10aa firstly receives the specific state information i after the time when the request terminal 10aa sends the candidate list request information to the management system 50. In such case, the delay time t is 0.1 seconds, which is obtained by 0.1 seconds/1, as the number of items of terminal state information that has been received is 1. Further, as illustrated in FIG. 25B, the request terminal 10aa extends the time period for suppressing the display of candidate list by the delay time t of 0.1 seconds. Further, as illustrated in FIG. 25C, when the request terminal 10aa receives the terminal state information of the candidate terminal 10db as the additional state information during the delay time t, specifically when the counter value reaches 0.15 seconds, the request terminal 10aa further extends the time for suppressing the display of the candidate list by the delay time t of 0.1 seconds from the time when the additional state information is received as illustrated in FIG. 25D.

Alternatively, the request terminal 10aa may extend the time period for suppressing the display of the candidate list by the delay time t from the time when the delay time t ends.

As described above, as long as the request terminal 10aa does not receive the additional state information during the delay time t, the request terminal 10aa determines that the terminal state information is not most likely to be received at least for a sufficient time. As illustrated in FIG. 26, the request terminal 10aa causes the display 120aa to display the candidate list that shows the terminal name 11-2 and the icon 11-3 that reflects the operation state of the terminal, in the candidate list frame 11-1.

Referring back to FIG. 21B, at S35, the terminal extractor 54 of the management system 50 searches the candidate list management DB 5004 (FIG. 15) using the terminal ID "01aa" of the request terminal 10aa that has sent the login request information to extract the terminal ID of one or more terminals 10 each of which registers the request terminal 10aa as one of its candidate terminals 10. The candidate list management table of FIG. 15 indicates that the terminal ID of the terminal 10 having the request terminal 10aa as a candidate terminal is "01ab", "01ba", and "01db".

At S36 of FIG. 21B, the terminal state manager 55 of the management system 50 searches the terminal management DB 5003 (FIG. 14) using the terminal ID "01aa" of the request terminal that has sent the login request information as a search key to obtain the operation state of the request terminal 10aa.

At S37-1 and S37-2, the data transmit/receive 51 of the management system 50 sends the terminal ID "01aa" and the operation state of the request terminal 10aa, that are respectively obtained at S36, to the terminals 10ab, 10ba, and 10db each having the request terminal 10aa as a candidate terminal that is obtained at S35. In this example, the management system 50 sends the terminal state information of the request terminal 10aa to only the terminals 10ba and 10db each having the on-line state as shown in FIG. 14.

More specifically, in this example, the data transmit/receive 51 refers to the terminal management table of FIG. 14 to obtain the IP address of each of the terminals 10ba and 10db. Using the obtained IP addresses, the management system 50 is able to send the terminal state information of the request terminal 10aa to the terminals 10ba and 10db each of which lists the request terminal 10aa as a candidate terminal.

At S38-1, the terminal 10ba displays the operation state of the candidate terminal including the operation state of the request terminal 10aa through the display 120ba. At S38-2, the terminal 10db displays the operation state of the candidate terminal including the operation state of the request terminal 10aa through the display 120db.

The above-described operation of S22 to S38 is performed by any desired terminal 10 as the power of the terminal 10 is turned on through the power switch 109 (FIG. 6).

Referring now to FIG. 27, operation of limiting a number of candidate relay terminals 30 is explained according to an example embodiment of the present invention. The operation of FIG. 27 is performed during a management data session sei (FIG. 2), which transmits or receives various management data in the transmission system 1. Further, in this example, the request terminal 10aa can start communication with at least one of the terminals 10ba and 10db each having the on-line state as indicated by the terminal state information received at S32 of FIG. 21B. For the descriptive purposes, it is assumed that the user at the request terminal 10aa starts communication with the counterpart terminal 10db.

At S41, the user at the request terminal 10aa operates the operation button 108 to select the terminal 10db as a counterpart terminal. Upon selection, the operation input 12 (FIG. 7) of the request terminal 10aa receives a user instruction for starting communication with the counterpart terminal 10db.

At S42, the data transmit/receive 11 of the request terminal 10aa sends the communication start request information that requests the management system 50 to start communication with the counterpart terminal 10db to the management system 50. The communication start request information at least includes identification information such as the terminal ID "01aa" of the request terminal 10aa and the terminal ID "01db" of the counterpart terminal 10db.

At the time of receiving the communication start request information, the data transmit/receive 51 of the management system 50 obtains the IP address "1.2.1.3" of the request terminal 10aa.

At S43, the state manager 53 looks for records in the terminal management DB 5003 (FIG. 14) based on the terminal ID "01 aa" of the request terminal 10aa and the terminal ID "01db" of the counterpart terminal 10db, which are included in the communication start request information. The state manager 53 changes each of the operation states of the request terminal 10aa and the counterpart terminal 10db in the records, from the online state to the communicating state.

At this time, the request terminal 10aa and the counterpart terminal 10db has not started communication, but the request terminal 10aa and the counterpart terminal 10db each have the communicating state. In case another terminal 10 tries to communicate with the request terminal 10aa or the counterpart terminal 10db, the management system 50 causes the another terminal 10 to output voice or display indicating that the request terminal 10aa or the counterpart terminal 10db is in the communicating state.

At S44, the management system 50 prepares for a session that is performed for selecting the relay terminal 30 for communication between the request terminal 10aa and the counterpart terminal 10db. More specifically, at S44, the session ID generator 56a (FIG. 10) of the management system 50 generates a session ID for a session that is to be performed for selection of the relay terminal 30.

At S45, the session manager 57 stores the session ID "se1" generated at S44, the terminal ID "01aa" of the request terminal 10aa, and the terminal ID "01db" of the counterpart terminal 10db, in the session management DB 5005 (FIG. 16) stored in the nonvolatile memory 5000.

At S46, the primary relay terminal selection unit 56 of the management system 50 limits a number of candidate relay terminals 30 from which one relay terminal 30 to be used for communication between the request terminal 10aa and the counterpart terminal 10db is selected, using the relay terminal management DB 5001, the terminal management DB 5003, and the priority management DB 5006.

Referring now to FIG. 10 and FIG. 28, operation performed at S46 of FIG. 27 is explained in detail.

At S46-1 of FIG. 28, the terminal IP address extractor 56b of the management system 50 searches the terminal management DB 5003 (FIG. 14) using the terminal ID "01aa" of the request terminal 10aa and the terminal ID "01db" of the counterpart terminal 10db included in the communication start request information sent from the request terminal 10aa as a key to obtain the IP addresses of the terminals 10aa and 10db, i.e., the IP address "1.2.1.3" and the IP address "1.3.2.4".

At S46-2, the primary selector 56c refers to the relay terminal management DB 5001 (FIG. 12) to select one or more relay terminals 30 having the on-line operation state, and obtains the relay terminal ID of the selected relay terminal 30. More specifically, in this example, the primary selector 56c obtains the relay terminal IDs 111a, 111b, and 111d of the relay terminals 30a, 30b, and 30d.

At S46-3, the primary selector 56c searches the relay terminal management DB 5001 (FIG. 12) to obtain the IP address of each of the relay terminals 30a, 30b, and 30d, using the relay terminal IDs 111a, 111b, and 111d obtained at S46-2. Further, the primary selector 56c compares each one of the IP addresses "1.2.1.2", "1.2.2.2", and "1.3.2.2" of the relay terminals 30a, 30b, and 30d, with each one of the IP addresses "1.2.1.3" and "1.3.2.4" obtained at S46-1, dot address by dot address, to determine the degree of similarity between the relay terminal IP address and the terminal IP address.

At S46-4, the priority determiner 56d refers to the priority management DB 5006 (FIG. 17) to determine a value of address priority point for each one of the relay terminals 30a, 30b, and 30d. In this example, as illustrated in FIG. 29, for each one of the relay terminals 30a, 30b, and 30d, the priority determiner 56d obtains an address priority point with respect to the request terminal 10*aa* and an address priority point with respect to the counterpart terminal 10*db*.

FIG. 29 illustrates a table storing a calculation result of a priority point, which is used for limiting a number of candidate relay terminals 30. The table of FIG. 29 stores an address priority point, a transmission speed priority point, and a total priority point, for each one of the relay terminals IDs of the relay terminals 30. The address priority point includes a first address priority point with respect to the request terminal 10*aa*, and a second address priority point with respect to the counterpart terminal 10*db*. The total priority point is obtained by adding the highest one of the first and second address priority points with the transmission speed priority point.

In this example, based on comparison between the IP address "1.2.1.2" of the relay terminal 30*a* and the IP address "1.2.1.3" of the request terminal 10*aa*, the degree of similarity is "S.S.S.D" such that the address priority point of 5 is obtained. Similarly, based on comparison between the IP address "1.2.1.2" of the relay terminal 30*a* and the IP address "1.3.2.4" of the counterpart terminal 10*db*, the degree of similarity is "S.D.D.D" such that the address priority point of 1 is obtained.

Based on comparison between the IP address "1.2.2.2" of the relay terminal 30*b* and the IP address "1.2.1.3" of the request terminal 10*aa*, the degree of similarity is "S.S.D.D" such that the address priority point of 3 is obtained. Similarly, based on comparison between the IP address "1.2.2.2" of the relay terminal 30*b* and the IP address "1.3.2.4" of the counterpart terminal 10*db*, the degree of similarity is "S.D.S.D" such that the address priority point of 1 is obtained.

Based on comparison between the IP address "1.3.2.2" of the relay terminal 30*d* and the IP address "1.2.1.3" of the request terminal 10*aa*, the degree of similarity is "S.D.D.D" such that the address priority point of 1 is obtained. Similarly, based on comparison between the IP address "1.3.2.2" of the relay terminal 30*a* and the IP address "1.3.2.4" of the counterpart terminal 10*db*, the degree of similarity is "S.S.S.D" such that the address priority point of 5 is obtained.

Referring back to FIG. 28, at S46-5, the priority determiner 56*d* searches the priority management DB 5006 (FIG. 18) using the maximum data transmission speed of the relay terminal 30 that is stored in the relay terminal management DB 5001 (FIG. 12) to determine a transmission priority point for each one of the relay terminals 30*a*, 30*b*, and 30*d* that are selected at S46-2.

In this example, referring to FIG. 12 and FIG. 18, the relay terminal 30*a* having the maximum data transmission speed of 100 Mbps is assigned with the transmission priority point of 3. Similarly, the relay terminal 30*b* having the maximum data transmission speed of 1000 Mbps is assigned with the transmission priority point of 5. Similarly, the relay terminal 30*d* having the maximum data transmission speed of 10 Mbps is assigned with the transmission priority point of 1. Accordingly, the priority determiner 56*d* stores the transmission priority point for each one of the relay terminals 30*a*, 30*b*, and 30*d* in the table of FIG. 29.

At S46-6, for each one of the relay terminals 30*a*, 30*b*, and 30*d*, the primary selector 56*c* adds the highest one of the first and second address priority points with the transmission speed priority point to obtain a total priority point. The primary selector 56*c* selects the total of two relay terminals 30 having the highest priority point. For example, the primary selector 56*c* selects the relay terminal 30 having the highest total priority point and the relay terminal 30 having the second highest total priority point as a candidate relay terminal 30 for further processing. In this example, referring to FIG. 29, the relay terminals 30*a*, 30*b*, and 30*d* having the relay terminal IDs 111*a*, 111*b*, and 111*d* respectively have the total priority points of 8, 8, and 6. Accordingly, the primary selector 56*c* selects the relay terminal 30*a* having the relay terminal ID 111*a*, and the relay terminal 30*b* having the relay terminal ID 111*b*.

After the operation of S46 illustrated in FIG. 28 completes, at S47 of FIG. 27, the data transmit/receive 51 (FIG. 7) of the management system 50 sends the relay terminal selection information to the counterpart terminal 10*db* through the communication network 2. The relay terminal selection information includes a number of candidate relay terminals 30, which is "2", the terminal ID "01aa" of the request terminal 10*aa*, and the session ID "se1" for relay terminal selection. With this relay terminal selection information, the counterpart terminal 10*db* is able to obtain information including the number of candidate relay terminals 30, the request terminal 10*aa* that requests for videoconference, and the session ID "se1" of the session for relay terminal selection. In addition, the counterpart terminal 10*db* obtains the IP address "1.1.1.2" of the management system 50 that has sent the relay terminal selection information.

At S48, the data transmit/receive 11 of the counterpart terminal 10*db* sends confirmation information indicating that the relay terminal selection information is received, to the management system 50 through the communication network 2, with the IP address of the counterpart terminal 10*db*. The confirmation information includes the session ID "se1". With this confirmation information, the management system 50 is able to know that the counterpart terminal 10*db* is notified with the number of candidate relay terminals 30 obtained during the session se1, and the IP address "1.3.2.4" of the counterpart terminal 10*db*.

Referring now to FIGS. 30A, 30B, and 31, operation of selecting the relay terminal 30, performed by the counterpart terminal 10*db*, is explained according to an example embodiment of the present invention. The operation of FIGS. 30A and 30B is performed during the management data session sei of FIG. 2, which transmits or receives various management data in the transmission system 1.

Before starting videoconference, at S61-1 and S61-2, the management system 50 sends preparatory relay request information, respectively, to the relay terminals 30*a* and 30*b*, which are selected by the management system 50 at S46 as candidate relay terminals. The preparatory relay request information requests the relay terminal 30 to perform relay processing before starting the videoconference. More specifically, the preparatory relay request information includes the session ID "se1", the IP address "1.2.1.3" of the request terminal 10*aa*, and the IP address "1.3.2.4" of the counterpart terminal 10*db*, and is transmitted with the IP address of the management system 50. With this preparatory relay request information, the relay terminals 30*a* and 30*b* are each able to obtain information including the session, the request terminal, the counterpart terminal, and the IP address "1.1.1.2" of the management system 50 that has sent the preparatory relay request information.

At S62-1 and S62-2, the relay terminals 30*a* and 30*b* each cause the data transmit/receive 31 to send preparatory transmit request information to the request terminal 10*aa* through the communication network 2. The preparatory transmit request information requests the request terminal 10*aa* to send preparatory transmit information including the Packet Internet Grouper (PING) to each one of the relay terminals 30*a* and 30*b* before starting the videoconference. More specifically, the preparatory transmit request information includes the session ID "se1", and is transmitted with the IP addresses of the relay terminals 30*a* and 30*b*. With this preparatory transmit request information, the request terminal 10*aa* is able to know that the preparatory transmit information is to be sent during the session with the session ID "se1", as well as the IP addresses "1.2.1.2" and "1.2.2.2" of the relay terminals 30*a* and 30*b*.

As described above, the management system 50 does not directly send the IP address of the counterpart terminal 10*db* to the request terminal 10*aa*. Instead, as described above referring to S61-1 and S61-2, the management system 50 sends the IP address of the counterpart terminal 10*db* respectively to the relay terminal 30*a* and the relay terminal 30*b*. As described above referring to S62-1, the relay terminal 30*aa* requests the request terminal 10*aa* to send the preparatory transmit information to the relay terminal 30*aa*. In this manner, the management system 50 prevents the terminal 10 from obtaining the IP address of another terminal 10, thus improving the security.

At S63-1 and S63-2, the request terminal 10*aa* causes the data transmit/receive 11 to send the preparatory transmit information, respectively, to the relay terminals 30*a* and 30*b* through the communication network 2. The preparatory transmit information is sent to the counterpart terminal 10*db* through each one of the relay terminals 30*a* and 30*b* before the contents data such as the image data and the voice data is transmitted. By sending the preparatory transmit information in replace of the contents data, the management system 50 is able to calculate a time period required for transmitting the contents data from the request terminal 10*aa* to the counterpart terminal 10*db* through each one of the relay terminals 30*a* and 30*b*. Further, the preparatory transmit information includes PING information used for checking whether the request terminal 10*aa*, the relay terminal 30*a* or 30*b*, and the counterpart terminal 10*db* are each connected to allow communication, the date and time of which the request terminal 10*aa* sends the preparatory transmit information, and the session ID "se1". With this preparatory transmit information, each of the relay terminals 30*a* and 30*b* knows that the preparatory transmit information is transmitted in the session with the session ID "se1", and the IP address "1.2.1.3" of the request terminal 10*aa* that has sent the preparatory transmit information.

At S64-1 and S64-2, the relay terminals 30*a* and 30*b* each transmit the preparatory transmit information to the counterpart terminal 10*db* having the IP address "1.3.2.4", which is obtained from the preparatory transmit information. With the preparatory transmit information, the counterpart terminal 10*db* is able to know that the preparatory transmit information is transmitted during the session with the session ID "se1", and the IP addresses "1.2.1.2" and "1.2.2.2" of the relay terminals 30*a* and 30*b* that respectively send the preparatory transmit information.

At S65, the secondary relay terminal selection unit 17 of the counterpart terminal 10*db* selects one of the relay terminals 30*a* and 30*b* to be used for videoconference, based on the preparatory transmit information.

Referring now to FIG. 9 and FIG. 31, operation of selecting the relay terminal 30 for videoconference, which is performed at S65 of FIG. 30B, is explained.

At S65-1, the counter 17*a* of the secondary relay terminal selection unit 17 (FIG. 9) obtains the date and time at which the data transmit/receive 11 of the counterpart terminal 10*db* receives the preparatory transmit information for each one of the relay terminals 30*a* and 30*b*.

At S65-2, the calculator 17*b* calculates, for each one of the relay terminals 30*a* and 30*b*, a time period between the time when the preparatory transmit information is transmitted by the request terminal 10*aa* and the time when the preparatory transmit information is received by the counterpart terminal 10*db*. The date and time at which the preparatory information is transmitted by the request terminal 10*aa* is obtainable from the preparatory transmit information. The date and time of which the preparatory transmit information is received at the counterpart terminal 10*db* is obtained by the counter 17*a*.

At S65-3, the secondary selector 17*c* determines whether all items of preparatory transmit information is received for all of candidate relay terminals, during the session with the session ID "se1". In this example, the secondary selector 17 counts a total number of items of preparatory transmit information that have been received, and compares with the total number of candidate relay terminals 30 of "2".

When it is determined that the preparatory transmit information has not been received for at least one relay terminal 30 ("NO" at S65-3), the operation proceeds to S65-4. When it is determined that the preparatory transmit information has been received for all of the candidate relay terminals 30 ("YES" at S65-3), the operation proceeds to S65-5.

At S65-4, the secondary selector 17*c* determines whether a predetermined time period passes after the preparatory transmit information is received at the counterpart terminal 10*db*. In this example, the predetermined time period is set to one minute. When it is determined that the predetermined time period has not passed ("NO" at S65-4), the operation returns to S65-1. When it is determined that the predetermined time period has passed ("YES" at S65-4), the operation proceeds to S65-5.

At S65-5, the secondary selector 17*c* selects one of the relay terminals 30, which has the least value of the time period required for transmitting the preparatory transmit information based on the calculation of the calculator 17*b*.

In this example, it is assumed that the relay terminal 30*a* is selected as a time period for transmitting the preparatory transmit information that is relayed through the relay terminal 30*a* has a value less than the value of the time period for transmitting the preparatory transmit information that is relayed through the relay terminal 30*b*.

Referring back to FIG. 30B, at S66, the data transmit/receive 11 of the counterpart terminal 10*db* sends the relay terminal selection information to the management system 50 through the communication network 2. In this example, the relay terminal selection information indicates that the relay terminal 30*a* is selected. More specifically, the relay terminal selection information includes the session ID "se1", and the relay terminal ID "111a" of the selected relay terminal 30*a*, and is transmitted with the terminal IP address of the counterpart terminal 10*db*. With the relay terminal selection information, the management system 50 is able to know that the relay terminal 30*a* has been selected during the session with the session ID "se1", and the IP address "1.3.2.4" of the counterpart terminal 10*db* that has sent the relay terminal selection information.

At S67, the session manager 57 of the management system 50 stores, in the session management table of FIG. 16 stored in the session management DB 5005, the relay terminal ID "111a" of the relay terminal 30*a*, which is finally selected for communication, in the "relay terminal ID" field of a record provided for the session with the session ID "se1".

At S68, the data transmit/receive 51 of the management system 50 sends the relay start request information to the relay terminal 30*a* through the communication network 2. The relay start request information requests the relay terminal 30*a* to start relay operation. More specifically, the relay start request information includes the IP address "1.2.1.3" of the request terminal 10*aa*, and the IP address "1.3.2.4" of the counterpart terminal 10*db*.

At S69, the relay terminal 30a establishes four sessions between the request terminal 10aa and the counterpart terminal 10db including a session for transmission of low-level resolution image data, a session for transmission of medium-level resolution image data, a session for transmission of high-level resolution image data, and a session for transmission of voice data. Once these sessions are established, the request terminal 10aa is able to start videoconference with the counterpart terminal 10db.

In the above-described example, the management system 50 sends the relay terminal selection information to the counterpart terminal 10db at S47 (FIG. 27), and the counterpart terminal 10db performs operation of S48, S64-1 (FIG. 30A), S64-2 (FIG. 30B), and S65 (FIG. 30B) to select the relay terminal 30. In alternative to this example, the management system 50 may send the relay terminal selection information to the request terminal 10aa to cause the request terminal 10aa to perform selection of the relay terminal 30. In such case, the request terminal 10aa performs operation of S48, S64-1 (FIG. 30A), S64-2 (FIG. 30B), and S65 (FIG. 30B) in a substantially similar manner as described above. Further, at S66, the request terminal 10aa sends the relay terminal selection information to the management system 50.

Referring now to FIG. 7 and FIG. 32, operation of transmitting and receiving contents data such as image data and voice data between the request terminal and the counterpart terminal to carry out videoconference, performed by the transmission system 1, is explained according to an example embodiment of the present invention.

In this example, the contents data such as the image data and the voice data flows in a direction from the request terminal 10aa to the counterpart terminal 10db, or in another direction from the counterpart terminal 10db to the request terminal 10aa. Since operation such as transmission and reception of the contents data or detection of delay time is the same for both of the directions, the following example focuses on communication in which data flows from the request terminal 10aa to the counterpart terminal 10db.

Referring to FIG. 32, at S81, the data transmit/receive 11 of the request terminal 10aa sends the contents data to the relay terminal 30a through the communication network 2 in the contents data session "sed". The contents data includes image data such as image data of an object captured by the imaging unit 14a and voice data that is input through the voice input 15a. In this example, it is assumed that the high-quality image data based on the low-level resolution image data, the medium-level resolution image data, and the high-level resolution image data, and the voice data, are transmitted. Accordingly, the data transmit/receive 31 of the relay terminal 30a receives the image data of three different resolution levels, and the voice data.

At S82, the data quality checker 33 searches the data quality management DB 3001 (FIG. 11) using the IP address "1.3.2.4" of the counterpart terminal 10db as a key to obtain the quality of the image data to be transmitted to the relay terminal 30a.

In this example, the quality of image data to be transmitted to the relay terminal 30a is the high-quality image data. Since the image data that is received at the data transmit/receive 31 has the quality that is the same as the quality of the image data obtained from the data quality management DB 3001, at S83, the relay terminal 30a sends the high-quality image data and the voice data to the counterpart terminal 10db in the contents data session "sed", without applying further image processing.

The counterpart terminal 10db receives the high quality image data that is generated based on the low-level resolution image data, medium-level resolution image data, and high-level resolution image data, and the voice data, at the data transmit/receive 11. The display control 16 combines the image data of three different resolution levels into the high quality image data for display onto the display 120. Further, the voice output 15b outputs the voice sound based on the voice data.

At S84, the delay detector 18 of the counterpart terminal 10db periodically detects a delay time indicating the time at which the image data is received at the data transmit/receive 11, for example, every one second. In this example, it is assumed that the delay time of 200 ms is obtained.

At S85, the data transmit/receive 11 of the counterpart terminal 10db sends the delay time information indicating the delay time of 200 ms to the management system 50 through the communication network 2, during the management data session "sei". With the delay time information, the management system 50 is notified of the delay time, and the IP address "1.3.2.4" of the counterpart terminal 10db that has sent the delay time information.

At S86, the delay time manager 60 of the management system 50 searches the terminal management DB 5003 (FIG. 14) using the IP address "1.3.2.4" of the counterpart terminal 10db as a search key to extract the terminal ID "01db" of the counterpart terminal 10db. The delay time manager 60 stores the delay time of 200 ms obtained from the delay time information in a "delay time" field of the record of the terminal ID "01db" of the session management table stored in the session management DB 5005 (FIG. 16).

At S87, the quality determiner 58 searches the quality management DB 5007 (FIG. 19) using the delay time of 200 ms to extract the image data quality of "MEDIUM". Based on the extracted image data quality, the quality determiner 58 determines that the quality of image data suitable for the delay time of 200 ms is medium.

At S88, the data transmit/receive 51 searches the relay terminal management DB 5001 (FIG. 12) using the relay terminal ID "111a", which is stored in the session management DB (FIG. 16) in association with the counterpart terminal ID "01db", to extract the IP address "1.2.1.2" of the relay terminal 30a.

At S89, the data transmit/receive 51 sends the quality information indicating that the image data quality that has been determined at S87 is medium-level, to the relay terminal 30a through the communication network 2 during the management data session "sei". The image quality information is transmitted with the IP address "1.3.2.4" of the counterpart terminal 10db, which was used as a search key at S86.

At S90, the change quality manager 34 of the relay terminal 30a stores the IP address "1.3.2.4" of the counterpart terminal 10db in association with the "medium-level" quality image data to be relayed by the counterpart terminal 10db, in the data quality management DB 3001 (FIG. 11).

At S91, the request terminal 10aa transmits the high quality image data including the low-level resolution image data, the medium-level resolution image data, and the high-level resolution image data, and the voice data, to the relay terminal 30a during the contents data session "sed", in a substantially similar manner as described above referring to S81.

At S92, the data quality checker 33 of the relay terminal 30a searches the data quality management DB 3001 (FIG. 11) using the IP address "1.3.2.4" of the counterpart terminal 10db as a search key to extract the quality of the image data suitable for the counterpart terminal 10db, in a substantially similar manner as described above referring to S82.

At S93, since the image data quality that is stored for the counterpart terminal 10db is the medium-level, which is lower than the quality of the image data that is received at the data transmit/receive 31, the data quality changer 35 changes the quality of the image data from the high-level to the medium level. In this example, the quality of the voice data remains the same.

At S94, the data transmit/receive 31 of the relay terminal 30 sends the image data having the quality that is lowered to the medium-level, and the voice data, to the counterpart terminal 10db through the communication network 2, during the contents data session "sed". The data transmit/receive 11 of the counterpart terminal 10db receives the medium-quality image data that is generated based on the low-level resolution image data and the medium-level resolution image data, and the voice data. The display control 16 of the counterpart terminal 10db combines the image data of two different resolution levels to generate the medium-level image data for display on the display 120. Further, the voice output 15db outputs the voice sound generated based on the voice data.

As described above, when any delay in receiving the image data at the counterpart terminal 10db is observed, the relay terminal 30a changes the quality of image data by lowering the quality of image data. Accordingly, the users participating the videoconference are able to carry out communication more smoothly.

As described above, in this example, even when the terminal 10 starts receiving state information of a plurality of candidate terminals 10 from an external system such as the management system 50, one after another, the terminal 10 suppresses the display of candidate list information that is generated based on the state information of at least one of the plurality of candidate terminals 10 that has been received. The candidate list information of at least one of the plurality of candidate terminals 10 may be a candidate list including at least one terminal name of at least one of the plurality of candidate terminals 10 and information reflecting the operation state of the at least one of the plurality of candidate terminals 10. After the terminal 10 quits suppressing of the display of the candidate list information, the terminal 10 generates candidate list information based on state information of at least one of the plurality of candidate terminals 10 that has been received from the external system during a time when the display of the candidate list information is suppressed, and displays the candidate list information. This suppresses the terminal 10 to frequently update and display the candidate list information that is otherwise caused every time the terminal 10 receives the state information of one of the plurality of candidate terminals. This further suppresses the perception of flicker in screen being displayed by the terminal 10 through the display. Accordingly, the terminal 10 is able to display the candidate list information in a manner more pleasing to the human eye.

Further, the time at which the process of suppressing the display of the candidate list information ends is determined based on a time when the terminal 10 receives specific state information i from the management system 50 through a communication network. Since the terminal 10 receives the specific state information i from the management system 50 in a substantially similar manner as it receives the state information of the candidate terminal, the time for ending the process of suppressing the display of candidate list information, which is determined based on the time when the specific state information i is received at the terminal 10, reflects the communication system of the terminal 10 such as the communication network 2 with improved accuracy.

Further, since the management system 50 is programmed to send the specific state information i to the terminal 10 at a predetermined time after the request for the candidate list information is received from the terminal 10, the terminal 10 is able to always perform the process of generating and displaying the candidate list information no matter whether the terminal 10 receives the state information of at least one of the plurality of candidate terminals.

Further, even after receiving the specific state information i, the terminal 10 may extend the time period for suppressing the display of the candidate list information by a predetermined delay time t. When the terminal 10 receives additional state information of at least one of the plurality of candidate terminals during the predetermined delay time t, the terminal 10 further extends the time period for suppressing the display of the candidate list information by the predetermined delay time t. When the terminal 10 determines that no additional state information of at least one of the plurality of candidate terminals is received during the predetermined delay time t, the terminal 10 determines that the terminal 10 is not most likely to receive additional state information at least for a sufficiently long period of time. This suppresses the terminal 10 to frequently update and display the candidate list information that is otherwise caused every time the terminal 10 receives the state information of one of the plurality of candidate terminals even after the specific state information i is received. This further suppresses the perception of flicker in screen being displayed by the terminal 10 through the display. Accordingly, the terminal 10 is able to display the candidate list information in a manner more pleasing to the human eye.

In order to suppress the display of the candidate list information, in one example, the terminal 10 displays only the candidate list frame 11-1 of FIG. 26, without displaying the terminal name 11-2 of the candidate terminal and the icon 11-3 reflecting the operation state of the candidate terminal. After the time for suppressing the display of the candidate list information ends, the terminal 10 causes the display 120 to display the candidate list information as illustrated in FIG. 26 including the candidate list frame 11-1, the terminal name 11-2 of the candidate terminal, and the icon 11-3 reflecting the operation state of the candidate terminal.

Further, as described above, the transmission system is provided with a function of selecting one of a plurality of relay terminals 30 that is suitable for communication between a request terminal and a counterpart terminal. While it may be difficult to obtain information regarding the entire network such as the Internet, the transmission system 1 is able to identify the relay terminal that is suitable for communication using information available from the communication network such as information regarding the LAN at which the relay terminal is located.

More specifically, the management system 50 selects a small number of relay terminals 30 out of a large number of relay terminals 30 for further processing. Preferably, the small number of relay terminals 30 is equal to or more than two. Before sending contents data from the request terminal 10 to the counterpart terminal 10, the management system 50 causes the request terminal 10 to send preparatory transmit information to the counterpart terminal 10 via each one of the selected relay terminals 30 to obtain information regarding a time required for transmitting the preparatory transmit information for each one of the selected relay terminals 30. Based on this obtained information, the relay terminal 30 that is most suitable for communication between the request terminal and the counterpart terminal is selected.

In one example, the management system 50 selects a small number of relay terminals 30 each having the IP address that is similar to at least one of the IP address of the request terminal and the IP address of the counterpart terminal. Once the relay terminals 30 are selected, the management system 50 causes the request terminal 10 to send preparatory transmit information to the counterpart terminal 10 via each one of the selected relay terminals 30 to obtain a time required for transmitting the preparatory transmit information for each one of the selected relay terminals 30. The relay terminal 30 with a smallest value of the time for transmitting the preparatory transmit information is selected. Since the relay terminal 30 is selected based on information obtained using the actual communication network, the request terminal and the counterpart terminal are able to exchange high-quality image data and voice data with relatively high transmission speeds.

Additionally or alternatively, in order to select a small number of relay terminals 30, the maximum data transmission speed of the relay terminal 30 may be taken into account. Once the relay terminals 30 are selected, the management system 50 causes the request terminal 10A to send preparatory transmit information to the counterpart terminal 10B via each one of the selected relay terminals 30 to obtain a time required for transmitting the preparatory transmit information for each one of the selected relay terminals 30. The relay terminal 30 with a smallest value of the time for transmitting the preparatory transmit information is selected. Since the relay terminal 30 is selected based on information obtained using the actual communication network, the request terminal 10A and the counterpart terminal 10B are able to exchange high-quality image data and voice data with relatively high transmission speeds.

Additionally or alternatively, in order to select a small number of relay terminals 30, whether the relay terminal 30 is in the on-line state or not may be taken into account. Since the relay terminal 30 is selected based on the current operation state of the relay terminal 30, the relay terminal 30 is selected with improved accuracy.

Referring to FIG. 26, the display of the terminal 10 may display the candidate list frame 11-1 with the candidate terminal name 11-2 and the icon 11-3 indicating the operation state of the candidate terminal, as the candidate list information. Alternatively, the candidate list information may be displayed in various other ways. For example, referring to FIG. 26, only the candidate terminal name 11-2 and the icon 11-3 may be displayed without the candidate list frame 11-1.

The relay terminal 30, the management system 50, the program providing system 90, and the maintenance system 100 may be each implemented by a single computer. Alternatively, any number of parts, functions, or modules of the relay terminal 30, the management system 50, the program providing system 90, and the maintenance system 100 may be classified into a desired number of groups to be carried out by a plurality of computers. In case the program providing system 90 is implemented by the single computer, the program to be provided by the program providing system 90 may be transmitted, one module by one module, after dividing into a plurality of modules, or may be transmitted at once. In case the program providing system 90 is implemented as a plurality of computers, each computer may transmit each module that is stored in its memory, after the program is divided into a plurality of modules.

A recording medium storing any one of the terminal control program, relay control program, and transmission management program, or a storage device such as the HDD 204 that stores any one of the terminal control program, relay control program, and transmission management program, or the program providing system 90 provided with the HD 204 storing any one of the terminal control program, relay control program, and transmission management program, may be distributed within the country or to another country as a computer program product.

In the above-described examples, the quality of image data to be processed by the relay terminal 30, which is determined based on information obtainable from any one of the data quality management table of FIG. 11 and the quality management table of FIG. 19 is analyzed in terms of image resolution. Alternatively, any other criteria may be used to analyze quality of image data including, for example, depth of image, sampling frequency in case of voice data, and bit length in case of voice data.

Further, the date and time information stored in the relay terminal management table of FIG. 12 or the terminal management table of FIG. 14, or the delay time information stored in the session management table of FIG. 16, is expressed in terms of date and time. Alternatively, the date and time information or the delay time information may be expressed only in terms of time such as the time at which information is received.

Further, in the above-described examples, the relay terminal IP address of the relay terminal 30 and the terminal IP address of the terminal 10 are respectively managed using the relay terminal management table of FIG. 12 and the terminal management table of FIG. 14. Alternatively, the relay terminal 30 and the terminal 10 may each be managed using any other identification information or using any other tables. For example, when the relay terminal 30 or the terminal 10 needs to be identified on the communication network 2, the relay terminal 30 or the terminal 10 may be managed using Fully Qualified Domain Name (FQDN). In such case, the transmission system 10 is provided with a domain name system (DNS) server that obtains the IP address that corresponds to the FQDN of the relay terminal 30 or the terminal 10. In view of this, identification information for identifying the relay terminal 30 on the communication network 2 may not only include the identification information that identifies the relay terminal 30 on the communication network 2, but also identification information that identifies a node on the communication network 2 to which the relay terminal 30 is connected, or identification information that identifies a node on the communication network 2 from which the relay terminal 30 is connected. Similarly, identification information for identifying the terminal 10 on the communication network 2 may not only include the identification information that identifies the terminal 10 on the communication network 2, but also identification information that identifies a node on the communication network 2 to which the terminal 10 is connected, or identification information that identifies a node on the communication network 2 from which the terminal 10 is connected.

In the above-described examples, the transmission system 1 of FIG. 1 is treated as a videoconference system. Alternatively, the transmission system 1 of FIG. 1 may be implemented as a teleconference system such as the IP teleconference system or the Internet teleconference system. Alternatively, the transmission system 1 of FIG. 1 may be implemented as a car navigation system. For example, the request terminal 10 may be implemented as a car navigation system that is installed onto an automobile. The counterpart terminal 10 may be implemented as a management terminal or server at a management center that manages the car navigation system or a car navigation system that is installed onto another automobile.

Figure 33:
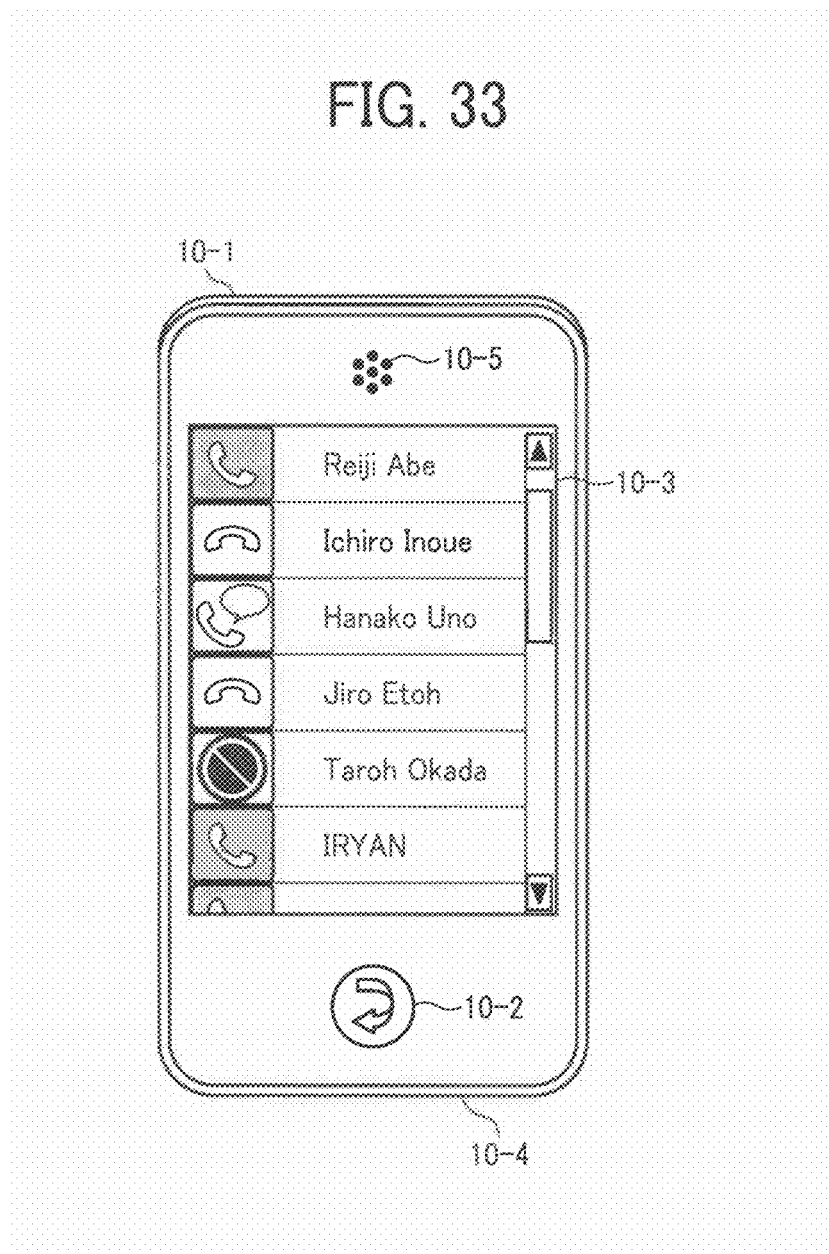
FIG. 33 is an illustration of a candidate list displayed by the transmission terminal of the transmission system of FIG. 1, according to an example embodiment of the present invention.

In another example, the transmission system 1 of FIG. 1 may be implemented as a communication system having a portable phone. In such case, the terminal 10 is implemented as the portable phone, for example, as illustrated in FIG. 33. The terminal 10, or the portable phone 10, includes a body 10-1, a menu screen display button 10-2, a display section 10-3, a microphone 10-4 provided at a lower portion of the body 10-1, and a speaker 10-5 provided at an upper portion of the body 10-1. When selected, the menu screen display button 10-2 causes the display section 10-3 to display a menu screen in which various icons each indicating a specific application program are displayed. In the example illustrated in FIG. 33, the display section 10-3 displays a candidate terminal list that lists a plurality of terminal names together with a plurality of icons each reflecting the operation state of each candidate terminal. Since the terminal 10 in this example is implemented as a portable phone, the name of a user who owns the specific terminal, or a nickname of the user, is displayed as the terminal name. The display section 10-3 is a touch panel screen, which allows the user to select one of the plurality of terminal names being displayed by the display section 10-3. When a specific terminal name, or a user name, is selected, the portable phone of FIG. 33 starts communication with the specific terminal that is selected in a substantially similar manner as described above.

In the above-described examples, the contents data is assumed to include image data and voice data. Alternatively, the contents data may include any other type of data that affects human senses of sight in alternative to image data, or any other type of data that affects human senses of hearing in alternative to voice data. Alternatively, the contents data may include any other type of data that affects human senses of sight, smell, taste, touch, and hearing. In case the contents data that affects human senses of touch, the terminal 10 may convey the contents data that reflects senses of touch that is felt by a user at the terminal 10 to another terminal 10 through the communication network 2. In case the contents data that affects human senses of smell, the terminal 10 may convey the contents data that affects senses of smell felt by a user at the terminal 10 to another terminal 10 through the communication network 2. In case the contents data that affects human senses of taste, the terminal 10 may convey the contents data that affects senses of taste felt by a user at the terminal 10 to another terminal 10 through the communication network 2.

Further, the contents data may only include one type of contents data selected from sight data such as image data, hearing data such as voice data, touch data, smell data, and taste data.

Further, in the above-described examples, the transmissions system 1 is implemented as a videoconference system for use at offices. Other examples of use of the transmission system 1 include, but not limited to, meetings, casual conversation among family members or friends, and distribution of information in one direction.

In the above-described examples, the counterpart terminal 10B reduces a number of candidate terminals 30. Alternatively, the request terminal 10A or the management system 50 may reduce a number of candidate terminals 30. In such case, the counterpart terminal 10B sends time information indicating a time period between the time when the preparatory transmit information is transmitted at the request terminal 10A and the time when the preparatory transmit information is received at the counterpart terminal 10B, to either one of the request terminal 10A or the management system 50.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in a transmission terminal including: a receive unit to start the process of receiving state information indicating at least an operation state of a candidate transmission terminal from an outside system through a communication network before starting communication with a desired counterpart transmission terminal; a display process unit to cause a display to display information of the candidate transmission terminal in a manner that reflects the state information of the candidate transmission terminal before starting communication with the desired counterpart transmission terminal; and a display suppressor unit to suppress display of information of the candidate transmission terminal by the display until specific state information indicating a state of a specific transmission terminal is determined to be received by the receive unit. The display process unit causes the display to display the information of the candidate transmission terminal in a manner that reflects the state information of the candidate transmission terminal that is received during a display suppressing time in which the display suppresser unit suppresses the display from displaying the information of the candidate transmission terminal.

The transmission terminal of the above-described example further includes a determiner unit to determine an extended time period for extending the display suppressing time based on a number of items of state information that are received by the receive unit until the specific state information is received. The display suppressor unit extends the display suppressing time by the extended time period determined by the determiner unit.

When additional state information is received during the extended time period, the display suppressor unit further extends the display suppressing time by the extend time period from a time when the additional state information is received. Accordingly, the process of extending the display suppressing time is repeated until no more additional state information is received during the extended time period.

When additional state information is received during the extended time period, the display suppressor unit further extends the display suppressing time by the extend time period from a time when the extended time period ends. Accordingly, the process of extending the display suppressing time is repeated until no more additional state information is received during the extended time period.

In any one of the above-described examples, the transmission terminal further includes a request unit to request the outside system for the information of the candidate transmission terminal. The receive unit receives the identification information of the candidate transmission terminal and the state information of the candidate transmission terminal from the outside system in response to the request before starting communication with the desired counterpart transmission terminal. The display process unit causes the display to display the information of the candidate transmission terminal in a manner that reflects the state information received by the receive unit before starting communication with the desired counterpart transmission terminal.

The determiner unit that determines the extended time period counts a time period between a time when the request unit requests for the information of the candidate transmission terminal and a time when the specific state information is received to obtain a counter value, and calculates a value of the extended time period by dividing the counter value with a total number of items of state information that are received by the receive unit during the time period counted by the determiner unit. The items of state information include the specific state information.

In any one of the above-described examples, the transmission terminal further includes a storage unit to store the identification information of the candidate transmission terminal and the state information of the candidate transmission terminal; and a read unit to read the identification information of the candidate transmission terminal and the state information of the candidate transmission terminal from the storage unit. The display process unit causes the display to display the information of the candidate transmission terminal in a manner that reflects the state information.

In any one of the above-described examples, the transmission terminal further includes a determiner unit to determine whether the state information that is received by the receive unit includes the specific state information to generate a determination result. When the determination result indicates that the specific state information is included, the display suppressor unit suppresses the display from displaying the information of the candidate transmission terminal.

In another example, the present invention may reside in a method of displaying information of a candidate counterpart transmission terminal through a display coupled to a transmission terminal. The method includes: starting the process of receiving state information indicating at least an operation state of a candidate transmission terminal from an outside system through a communication network before starting communication with a desired counterpart transmission terminal; causing a display to display information of the candidate transmission terminal in a manner that reflects the state information of the candidate transmission terminal before starting communication with the desired counterpart transmission terminal; and suppressing display of information of the candidate transmission terminal by the display until specific state information indicating a state of a specific transmission terminal is determined to be received. The transmission terminal causes the display to display the information of the candidate transmission terminal in a manner that reflects the state information of the candidate transmission terminal that is received during a display suppressing time in which the display is suppressed from displaying the information of the candidate transmission terminal.

In another example, the present invention may reside in a method of displaying information of a candidate counterpart transmission terminal through a display coupled to a transmission terminal. The method includes: receiving state information of the candidate counterpart transmission terminal through a communication network, the state information of the candidate counterpart transmission terminal indicating at least an operation state of the candidate counterpart transmission terminal; suppressing the display from displaying the information of the candidate counterpart transmission terminal until specific state information of a specific transmission terminal is received; causing the display to display the information of the candidate counterpart transmission terminal in a manner that reflects the state information of the candidate counterpart transmission terminal that is received by the transmission terminal during a display suppressing time in which the display is suppressed from displaying the information of the candidate counterpart transmission terminal; and allowing a user to select a desired counterpart transmission terminal from the candidate counterpart transmission terminal using the information of the candidate counterpart transmission terminal that is displayed by the display.

In another example, the above-described method further includes: determining an extended time period for extending the display suppressing time based on a number of items of state information that are received by the transmission terminal until the time when the specific state information is received; and extending the display suppressing time by the extended time period.

In another example, the method further includes: determining whether additional state information is received by the transmission terminal during the extended time period; and further extending the display suppressing time by the extended time period from one of the time when the additional state information is received and a time when the extended time period ends to continue suppressing the display from displaying the information of the candidate counterpart transmission terminal until no more additional state information is received during the extended time period.

In another example, the present invention may reside in a transmission control program, which causes a processor to perform any one of the above-described example methods.

In another example, the present invention may reside in a recording medium storing a plurality of instructions which, when executed, cause a processor to performed any one of the above-described example methods.

As described above, the transmission terminal suppresses the display from displaying the information of a candidate transmission terminal in a manner that reflects the state information that has been received from the transmission management system. The transmission terminal displays the information of the candidate terminal in a manner that reflects all of the state information that has been received during a time for suppressing the display. With this function, the information of each candidate terminal, such as the icon of each candidate terminal that reflects the state information, is displayed to a user only after the transmission terminal has received a sufficient number of state information. This suppresses flicker in screen, which may be unpleasing to the human eye.

Further, the time for ending suppressing of the display is determined based on the time when the specific state information is received from the outside system through the communication network. Since the transmission management system sends the specific state information in a substantially similar manner as it sends the state information of the candidate terminal, the time for ending suppressing of the display is determined while reflecting the actual communication network environments.

What is claimed is:

1. A transmission terminal coupled to a display that displays information of one or more candidate counterpart transmission terminals configured to communicate with the transmission terminal through a communication network, the transmission terminal comprising:

a receiver that receives state information of the one or more candidate counterpart transmission terminals through the communication network, the state information of the one or more candidate counterpart transmission terminals indicating at least an operation state of the one or more candidate counterpart transmission terminals; and circuitry configured to:

suppress the display from displaying newly received state information of the one or more candidate counterpart transmission terminals until the receiver receives specific state information of a predetermined specific transmission terminal that is different than the one or more candidate counterpart transmission terminals;

cause the display to display the information of the one or more candidate counterpart transmission terminals in a manner that reflects the newly received state information of the one or more candidate counterpart transmission terminals that is received by the receiver during a display suppressing time in which the display suppressor unit suppresses the display from displaying the newly received state information of the one or more candidate counterpart transmission terminals when the receiver receives the specific state information of the predetermined specific transmission terminal; and allow a user to select a desired counterpart transmission terminal from the one or more candidate counterpart transmission terminals using the information of the one or more candidate counterpart transmission terminals that is displayed by the display.

2. The transmission terminal of claim 1, the circuitry further configured to:

determine an extended time period for extending the display suppressing time based on a number of items of state information that are received by the receive unit until the time when the receive unit receives the specific state information, wherein the circuitry extends the display suppressing time by the determined extended time period.

3. The transmission terminal of claim 2, wherein:

the circuitry determines whether additional state information is received during the extended time period, and further extends the display suppressing time by the extended time period from one of the time when the additional state information is received and a time when the extended time period ends to continue suppressing the display from displaying the information of the candidate counterpart transmission terminal until no more additional state information is received during the extended time period.

4. The transmission terminal of claim 3, the circuitry further configured to request an outside system to send the information of the one or more candidate counterpart transmission terminals through the communication network, wherein:

the receiver receives identification information of the one or more candidate counterpart transmission terminals and the state information of the one or more candidate counterpart transmission terminals that are respectively sent by the outside system in response to the request.

5. The transmission terminal of claim 4, further comprising:

a memory that stores the identification information of the one or more candidate counterpart transmission terminals and the state information of the one or more candidate counterpart transmission terminals that are respectively received by the receiver from the outside system through the communication network; and a reader that reads the identification information of the one or more candidate counterpart transmission terminals and the state information of the one or more candidate counterpart transmission terminals from the memory, wherein the information of the one or more candidate counterpart transmission terminals is generated based on the identification information of the one or more candidate counterpart transmission terminals in a manner that reflects the state information of the one or more candidate counterpart transmission terminals.

6. The transmission terminal of claim 5, the circuitry further configured to count a time period between the time when the information request unit requests the outside system to send the information of the one or more candidate counterpart transmission terminals and the time when the receiver receives the specific state information to obtain a counter value; and obtain a value of the extended time period by dividing the counter value by the number of items of state information that are received by the receiver during the time period counted, the items of state information including the specific state information.

7. The transmission terminal of claim 1, wherein the specific state information of the specific transmission terminal indicates an operation state of the transmission terminal that receives the state information of the one or more candidate counterpart transmission terminals through the communication network.

8. A transmission system, comprising:

a transmission manager; and a transmission terminal connected to the transmission manager through a communication network and coupled to a display that displays information of one or more candidate counterpart transmission terminals configured to communicate with the transmission terminal through a communication network, the transmission terminal including circuitry configured to:

receive state information of the one or more candidate counterpart transmission terminals from the transmission manager through the communication network, the state information of the one or more candidate counterpart transmission terminals indicating at least an operation state of the one or more candidate counterpart transmission terminals;

suppress the display from displaying newly received information of the one or more candidate counterpart transmission terminals until specific state information of a predetermined specific transmission terminal, that is different than the one or more candidate counterpart transmission terminals, is received;

cause the display to display the information of the one or more candidate counterpart transmission terminals in a manner that reflects the newly received state information of the one or more candidate counterpart transmission terminals that is received by the transmission terminal during a display suppressing time in which the display is suppressed from displaying the newly received state information of the one or more candidate counterpart transmission terminals; and allow a user to select a desired counterpart transmission terminal from the one or more candidate counterpart transmission terminals using the information of the one or more candidate counterpart transmission terminals that is displayed by the display.

9. The transmission system of claim 8, wherein the circuitry of the transmission terminal is further configured to:

determine an extended time period for extending the display suppressing time based on a number of items of state information that are received by the transmission terminal until the time when the specific state information is received; and extend the display suppressing time by the extended time period.

10. The transmission system of claim 9, wherein the circuitry of the transmission terminal is further configured to:

determine whether additional state information is received by the transmission terminal during the extended time period, and further extend the display suppressing time by the extended time period from one of the time when the additional state information is received and a time when the extended time period ends to continue suppressing the display from displaying the information of the one or more candidate counterpart transmission terminals until no more additional state information is received during the extended time period.

11. A method of displaying information of one or more candidate counterpart transmission terminals, the one or more candidate counterpart transmission terminals configured to communicate with the transmission terminal through a communication network, through a display coupled to a transmission terminal, the method comprising:

receiving state information of the one or more candidate counterpart transmission terminals through a communication network, the state information of the one or more candidate counterpart transmission terminals indicating at least an operation state of the one or more candidate counterpart transmission terminals;

suppressing the display from displaying newly received state information of the one or more candidate counterpart transmission terminals until specific state information of a predetermined specific transmission terminal, that is different than the one or more candidate counterpart transmission terminals, is received;

causing the display to display the information of the one or more candidate counterpart transmission terminals in a manner that reflects the newly received state information of the one or more candidate counterpart transmission terminals that is received by the transmission terminal during a display suppressing time in which the display is suppressed from displaying the newly received state information of the one or more candidate counterpart transmission terminals; and allowing a user to select a desired counterpart transmission terminal from the one or more candidate counterpart transmission terminals using the information of the one or more candidate counterpart transmission terminals that is displayed by the display.

12. The method of claim 11, further comprising:

determining an extended time period for extending the display suppressing time based on a number of items of state information that are received by the transmission terminal until the time when the specific state information is received; and extending the display suppressing time by the extended time period.

13. The method of claim 12, further comprising:

determining whether additional state information is received by the transmission terminal during the extended time period; and further extending the display suppressing time by the extended time period from one of the time when the additional state information is received and a time when the extended time period ends to continue suppressing the display from displaying the information of the one or more candidate counterpart transmission terminals until no more additional state information is received during the extended time period.

* * * * *